(12) United States Patent
Rubin et al.

(10) Patent No.: US 9,008,958 B2
(45) Date of Patent: Apr. 14, 2015

(54) EXTRA-VEHICULAR ANTI-COLLISION SYSTEM

(75) Inventors: Kim T Rubin, Menlo Pacrk, CA (US); Jonathan Betts-Lacroix, Belmont, CA (US)

(73) Assignee: Zetta Research and Development LLC, Wilmington, DE (US)

( * ) Notice: Subject to any disclaimer, the term of this patent is extended or adjusted under 35 U.S.C. 154(b) by 384 days.

(21) Appl. No.: 13/559,519

(22) Filed: Jul. 26, 2012

(65) Prior Publication Data

US 2013/0282267 A1    Oct. 24, 2013

Related U.S. Application Data

(60) Provisional application No. 61/637,588, filed on Apr. 24, 2012.

(51) Int. Cl.
| | |
|---|---|
| *G06F 17/10* | (2006.01) |
| *G08G 1/14* | (2006.01) |
| *G08G 9/02* | (2006.01) |
| *G08G 1/09* | (2006.01) |
| *G08G 1/16* | (2006.01) |

(Continued)

(52) U.S. Cl.
CPC ............... *G08G 1/142* (2013.01); *G08G 9/02* (2013.01); *G08G 1/09* (2013.01); *H04W 64/006* (2013.01); *H04W 76/002* (2013.01); *G08G 1/161* (2013.01); *H04W 76/023* (2013.01); *H04W 4/046* (2013.01); *H04W 4/06* (2013.01)

(58) Field of Classification Search
CPC . G01S 13/931; G01S 2013/9353; G08G 1/16; B60T 7/22; B60W 30/09; B60W 2550/402; B60W 50/14; B60W 10/06; B60W 10/18; B60W 10/20

USPC ............. 701/70, 2, 301, 300, 302, 1, 469; 340/435, 903, 905, 995.1; 342/357.25; 700/255; 307/10.6

See application file for complete search history.

(56) References Cited

U.S. PATENT DOCUMENTS

| | | | |
|---|---|---|---|
| 7,518,489 B2 * | 4/2009 | Nelson et al. | ............ 340/426.11 |
| 8,280,583 B2 | 10/2012 | Stahlin et al. | |

(Continued)

OTHER PUBLICATIONS

Efficient Angular Routing Protocol Vehicular Networks; Dhurandher, S.; Apr. 30, 2010; IEEE Xplore V. 4 Issue 7; Abstract.

(Continued)

*Primary Examiner* — Behrang Badii
(74) *Attorney, Agent, or Firm* — Kim Rubin

(57) ABSTRACT

Device, system and method, in a vehicle communication system using a first protocol, of implementing a gateway using a distinct second protocol. Embodiments include a first protocol transmitting in a government set vehicle safety band, and a second protocol in the set of: WiFi, Bluetooth, cellular phone and cellular data. An embodiment uses a validity-testing module to prevent insecure messages on the second protocol from interfering with the first protocol. Both one-way and two-way inter-protocol message transfers are described. Embodiments use the gateway to communicate from a vehicle using the first protocol to pedestrians, bicyclists, and equipped animals using the second protocol. Embodiments use a computed and transmitted risk-of-collision value. Embodiments include a driver or operator warning responsive to the transmitted risk value. Embodiments include computation of likely future position.

10 Claims, 22 Drawing Sheets

(51) Int. Cl.
*H04W 4/04* (2009.01)
*H04W 4/06* (2009.01)
*H04W 64/00* (2009.01)
*H04W 76/00* (2009.01)
*H04W 76/02* (2009.01)

(56) References Cited

U.S. PATENT DOCUMENTS

| | | | |
|---|---|---|---|
| 8,504,864 B2 * | 8/2013 | Menon et al. | 713/401 |
| 2008/0097700 A1 * | 4/2008 | Grimm | 701/301 |
| 2010/0106413 A1 * | 4/2010 | Mudalige | 701/213 |
| 2010/0188265 A1 * | 7/2010 | Hill et al. | 340/905 |
| 2010/0303048 A1 | 12/2010 | Stühlin et al. | |
| 2011/0205943 A1 * | 8/2011 | Grimm et al. | 370/310 |
| 2012/0016581 A1 * | 1/2012 | Mochizuki et al. | 701/301 |
| 2012/0025965 A1 * | 2/2012 | Mochizuki et al. | 340/435 |
| 2012/0089273 A1 | 4/2012 | Seder et al. | |
| 2012/0306663 A1 * | 12/2012 | Mudalige | 340/903 |

OTHER PUBLICATIONS

Development of Pedestrian-To-Vehicle Comm System Both Wide-Area and Direct; Sugimoto, Chika; Mar. 28, 2008; IEEE Xplore Conf. Pub. pp. 64-69; Abstract.

One Step Closer to Kitt: Cars That Talk to Each Other; Sherwood, C.; Aug. 28, 2012; CNET Interview; 6 pages; p. 4.

The Internet of Multi-Car Real Time Location and Communication App; downloaded Mar. 12, 2012; hhnet.com; V2V app for Android devices; Description.

* cited by examiner

PRIOR ART

Fig. 10
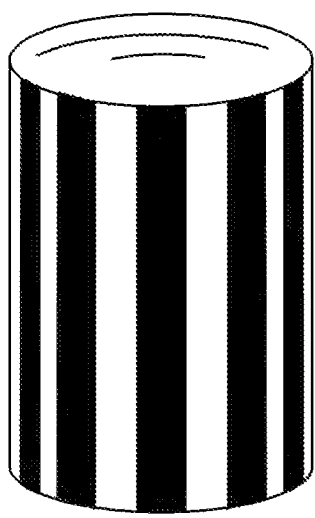 

Fig. 11A
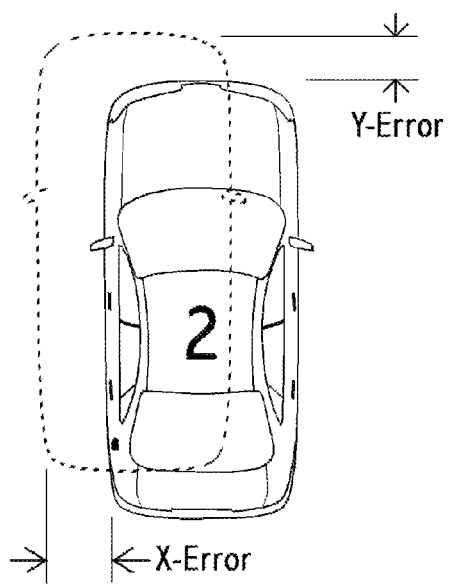
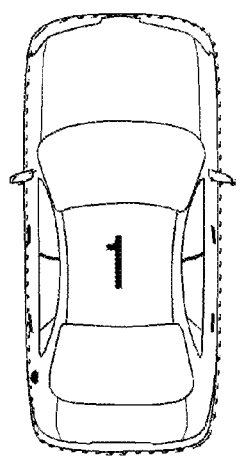
Fig. 11B
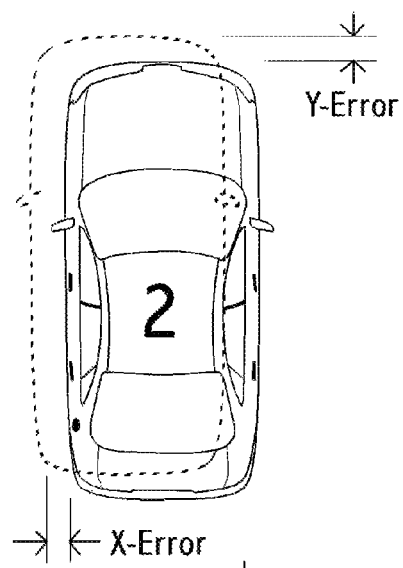
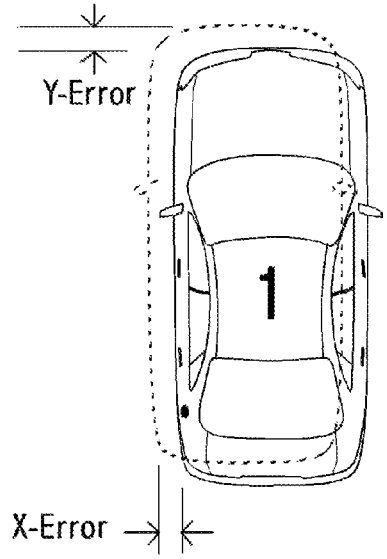

Fig. 14

Final Risk Value Table

| | |
|---|---|
| 10 | An accident has just occurred (any vehicle), or air bags have deployed. |
| 9 | An accident is predicted; accident mitigation should automatically engage immediately. |
| 8 | Very high risk; drives should immediately initiate defensive driving; automatic mitigation measures optional. |
| 5 | Definite risk; drivers should modify behavior. |
| 4 | Significant potential risk; drivers should be aware of the specific condition. |
| 3 | Less than ideal driving condition; some caution advised. |
| 2 | Zero or minimal risk. |
| 1 | No risk behavior identified. |
| 0 | No risk value in this message. |

Fig. 15

Vehicle Behavior Sub-risk Value Table

| Sub-risk Value | Vehicle Behavior |
|---|---|
| 5 | Extremely unsafe |
| 4 | Very unsafe |
| 3 | Definitely unsafe |
| 2 | Somewhat unsafe |
| 1 | Slightly unsafe |
| 0 | Safe |

Fig. 16

Weather and Road Condition Sub-risk Value Table

| Sub-risk Value | Weather and Road Condition |
|---|---|
| 5 | Extremely hazardous driving condition; such as dense fog or icy road |
| 4 | Very poor visibility; or slippery road surface |
| 3 | Poor visibility or safety problems with road surface |
| 2 | Noticeably poor weather or road conditions |
| 1 | Slight compromise of ideal visibility or road surface |
| 0 | Clear, excellent visibility and road surface |

Fig. 17
Braking Sub-risk Table

| Braking | Light Traffic | Moderate Traffic | Aggressive or Challenging Traffic |
|---|---|---|---|
| Emergency | 5 | 5 | 4 |
| Severe | 5 | 4 | 3 |
| Strong | 3 | 2 | 1 |
| Normal | 1 | 0 | 0 |
| Light | 0 | 0 | 0 |

Fig. 18
Turning Sub-risk Table

| Turning | Light Traffic | Moderate Traffic | Aggressive or Challenging Traffic |
|---|---|---|---|
| Emergency | 5 | 5 | 5 |
| Abnormal | 4 | 3 | 2 |
| Normal | 0 | 0 | 0 |
| Slight | 0 | 0 | 0 |
| None | 0 | 0 | 0 |

Fig. 19

Historical Sub-risk Table

| Current Risk Level | Historical Risk Level | | | | | |
|---|---|---|---|---|---|---|
| | 5 | 4 | 3 | 2 | 1 | 0 |
| 5 | 3 | 3 | 2 | 2 | 1 | 0 |
| 4 | 3 | 3 | 2 | 2 | 1 | 0 |
| 3 | 4 | 3 | 2 | 2 | 1 | 0 |
| 2 | 4 | 4 | 3 | 2 | 1 | 0 |
| 1 | 5 | 4 | 3 | 2 | 1 | 0 |
| 0 | 5 | 4 | 3 | 2 | 1 | 0 |

Fig. 20

Lane Data Confidence Levels

| Confidence Level | Meaning | Number of Vehicles |
|---|---|---|
| 0 | Not determined | n/a |
| 1 | In flux | n/a |
| 2 | Possible | 20 |
| 3 | Low | 100 |
| 4 | Moderate | 500 |
| 5 | Hight | 2500 |
| 6 | Very high | 12500 |
| 7 | Confirmed | n/a |

Fig. 21

Example Lane Map Generation Transactions

| A | B | C | D | E | F | G | H | I |
|---|---|---|---|---|---|---|---|---|
| Row No | Transaction | Generated Internally | Received as Original | Received as Shared | Total Internal Count | Total Internal + Original | Total Shared | Confidence Level |
| 1 | Start | 0 | 0 | 0 | 0 | 0 | 0 | 0 |
| 2 | Recorded first 20 vehicles itself | 20 | | | 20 | 20 | 20 | 2 |
| 3 | Received a count of 10, original | | 10 | | 20 | 30 | 30 | 2 |
| 4 | Recorded another 20, itself | 20 | | | 40 | 50 | 50 | 2 |
| 5 | Received 150 as shared | | | 150 | 40 | 50 | 150 | 3 |
| 6 | Received 60 as shared | | | 60 | 40 | 50 | 150 | 3 |
| 7 | Received 190 as shared | | | 190 | 40 | 50 | 190 | 3 |
| 8 | Recorded another 15, itself | 15 | | | 55 | 65 | 190 | 3 |
| 9 | Received 70, original | | 70 | | 55 | 135 | 190 | 3 |
| 10 | Received 100, original | | 100 | | 55 | 235 | 235 | 3 |
| 11 | Received 235 as shared | | | 235 | 55 | 235 | 235 | 3 |
| 12 | Received as original | | 100 | | 55 | 335 | 335 | 3 |
| 13 | Received as shared | | | 650 | 55 | 335 | 650 | 4 |
| 14 | New lane detected | 0 | 10 | 0 | 0 | 10 | 0 | 1 |

Fig. 22

V2V Basic Fields

| A | B | C | D | F | H |
|---|---|---|---|---|---|
| Row No | Field | Length in Bits | Type 0 Message | Type 1 Sub-message | Type 2 Sub-message |
| 1 | V2V revision level | 4 | 4 | | |
| 2 | Flags | 4 | 4 | | |
| 3 | Message size | 8 | 0 | | |
| 4 | Sub-message type | 6 | 0 | 6 | 6 |
| 5 | Final risk | 4 | 4 | 0 | 4 |
| 6 | Vehicle type | 6 | 6 | 0 | 6 |
| 7 | Collision types | 4 | 4 | 0 | 4 |
| 8 | Risk sources | 4 | 4 | 0 | 4 |
| 9 | Location: offset N-S | 24 | 24 | 24 | 24 |
| 10 | Location: offset E-W | 24 | 24 | 24 | 24 |
| 11 | Angle of travel: | 10 | 10 | 10 | 10 |
| 12 | Speed of travel | 10 | 10 | 10 | 10 |
| 13 | Lane designation | 8 | 8 | 0 | 8 |
| 14 | Risk ID | 12 | 12 | 0 | 12 |
| 15 | Reserved | 0 | 0 | 0 | 0 |
| 16 | Total or Subtotal | | 114 | 74 | 112 |
| 17 | | | | | |
| 18 | IEEE 802.11 Fields | | | | |
| 19 | Service | 16 | | | |
| 20 | Tail | 6 | | | |
| 21 | FCS | 32 | | | |

Fig. 23

Collision Type Coding

| Value | Collision Type |
|---|---|
| 0 | no collision type in message |
| 1 | Rear-ender |
| 2 | Side-swipe |
| 3 | Side-impact |
| 4 | Head-on |
| 5 | Pedestrian, Bicycle or Motorcycle |
| 6 | Multi-vehicle |
| 7 | Single vehicle on roadway |
| 8 | Single vehicle off roadway |
| 9 | Backing up, or parking lot |
| 10 | Animal |
| 11 - 14 | reserved |
| 15 | unknown collision type |

EXTRA-VEHICULAR ANTI-COLLISION SYSTEM

This application claims priority to the U.S. Patent Application No. 61/637,588, dated 24 Apr. 2012.

BACKGROUND OF THE INVENTION

Four people are killed in motor vehicle accidents in the US every hour. Based on 2007 information from the National Association of Commissioners of Insurance and 2008 information from the United States Department of Transportation (DOT), the cost of vehicle insurance in the US in 2008 was $201 billion.

Consumer Reports magazine in 2012 reported an additional $99 billion dollars in medical costs and lost time due to vehicle accidents every year in the US.

Thus, the cost of vehicle accidents in the US is approximately $300 billion per year. This is approximately $1000 for every US resident every year.

Various technology-based methods have been proposed to reduce the number of vehicle accidents. The basis of some of these methods is wireless transmission by a sending vehicle of its position and speed, then the computation by a receiving vehicle of a possible collision between the transmitting vehicle and the receiving vehicle by computing the future positions of both vehicle based on the received information combined with the position and speed information of the receiving vehicle. Then, either the driver of the receiving vehicle is warned to take evasive action or evasive action is initiated by the receiving vehicle automatically.

Such systems are sometimes called "V2V" for Vehicle-to-Vehicle communication.

V2V systems have been deployed on a limited basis for commercial trucks and pilot tests have been performed on automobiles. However, such systems are not in widespread use, nor is widespread use being implemented or planned. A collision detection system for ships is currently widely used.

A standard has been developed and adopted for V2V communication by IEEE: IEEE 802.11p. This is not the protocol used by the existing ship-to-ship collision detection system.

These systems as proposed and developed suffer from serious weaknesses. One weakness is unnecessary complexity. This complexity hinders development speed and adds cost, which further delays deployment.

Another, even more serious weakness, is that the proposed systems will not in fact be effective at significantly reducing accidents for many years. Current systems require BOTH the transmitting vehicle and the receiving vehicle to be equipped with compatible V2V devices. The US DOT estimates in 2012 that if ALL vehicles were equipped that the accident rate would be reduced by 50%. Thus, if 25% percent of all vehicles were equipped with a V2V system, 25%*25%*50%, or a 3% reduction in accident rate would be achieved. If vehicle accidents cost on average $1000 per year per person, the net dollar advantage per person is only $30, which is far below the currently expected cost per vehicle of equipping a vehicle. Even reaching a 25% installed density of V2V systems will take many years, assuming current trends on new vehicle purchases. The average age of vehicles in the US is 11 years. If 50% of new vehicle buyers purchase with an installed V2V, then after 11 years the penetration percentage is approximately 25%. Thus, with the V2V systems currently proposed, there will not be sufficient motivation by either buyers to purchase optional V2V systems, or for the government to mandate required V2V systems.

This calculated low effectiveness of proposed systems understates the problem. In fact, a higher proportion of accidents are caused by older vehicles than new vehicles. Also, for early buyers, the effectiveness is even less than the eventual 3%. Thus, equipping only new vehicles is even less effective that the uniform distribution assumed in the above calculations.

Another serious weakness of V2V systems as proposed is the use of an inappropriate, non-deterministic basis for message transmission. Real-time systems, particularly those related to safety, as is V2V by its very definition, require deterministic, consistent delivery of information. The systems as proposed use non-deterministic, "random back-off" transmission of messages, such as CSMA/CA. Such non-deterministic systems were designed for, and are appropriate for, non-real time applications such as loading web pages and sending text messages.

Yet another serious weakness of V2V systems as proposed is lack of a simple, usable priority system that is integrated with bandwidth allocation. Priority of messages is important to assure that the most important messages get through while the least priority messages are delayed or dropped.

Yet another serious weakness of V2V systems as proposed is lack of clear distinction between emergency vehicle messages and non-emergency vehicle messages.

Yet another serious weakness of V2V systems as proposed is lack of clear bandwidth allocation rules separating safety-related messages from non-safety related messages.

Yet another serious weakness of V2V systems as proposed is lack of dynamic ability to calibrate and reduce location errors between different vehicles.

Yet another serious weakness of V2V systems as proposed is the lack of ability to retransmit messages in a relay. A message relay allows messages to reach beyond the immediate transmit range.

Yet another serious weakness of V2V systems as proposed is the lack of ability to send "courtesy" messages. Such messages significantly increase the value of an installed system to a driver, and thus increase the installed penetration rate.

Yet another serious weakness of V2V systems as proposed is a lack of ability to practically include pedestrians and bicycles in the system.

Yet another serious weakness of V2V systems as proposed is a lack of ability to take advantage of widely popular personal, mobile electronic devices to increase the installed penetration rate.

Yet another serious weakness of V2V systems as proposed is a method to limit transmission power; or a method to limit range.

Yet another serious weakness of V2V systems as proposed is lack of a complete application layer protocol, such as message formats and meanings. Without this specification there is no compatibility between different manufacturers or implementations.

Yet another serious weakness of V2V systems as proposed is lack of roadway lane information. Such lane information is highly desirable for an effective V2V system.

SUMMARY OF THE INVENTION

This invention is in the area of vehicle-to-vehicle collision prevention systems and methods.

The summary features described below apply to one or more non-limiting embodiments. They are summarized briefly for readability and comprehension: thus, these summary features include many limitations not included in the invention. The summary feature should be viewed as one exemplary embodiment: as an anecdotal scenario of one usage.

A physical layer protocol comprises very short packets, with an unusually brief inter-frame gap, operating in government-approved spectrum for V2V applications.

All messages are broadcast. All V2V equipped vehicles within range receive and process all messages.

Most messages are broadcast as cleartext. A provision is made to transmit lower priority or emergency vehicle messages encrypted.

Most of the frame structure and encoding is compatible with IEEE 802.11p, or a similar standard in non-U.S. countries. This permits the use of standard chips and chip level standard cells and intellectual property, as well as the known features of the encoding types supported by 802.11p. Includes is the use of a 32-bit frame check sequence (FCS) on each frame.

Core data messages are transmitted using the most reliable encoding supported by 802.11p, which is a 3 mbit/sec, OFDM, BPSK encoding. Non core-data messages may be transmitted with an encoding for a higher data rate, such as 6 mbit/sec or 12 mbit/sec. This allows more data to be placed in a message that still occupies only a single time slot.

Also non core-data sub-messages may be combined with core data sub-messages and transmitted occasionally using a higher data rate if this is viewed by the transmitting devices as the most reliable way to deliver the data.

A physical layer protocol comprises variable length messages in turn comprised of a variable set of fixed length sub-messages where the sub-message length and format is determined by a sub-message type field. One message type, type 0, is fixed length and does not contain sub-messages.

Core data transmitted at the physical layer is highly compressed in formats unique to this application, which keeps core message length particularly short.

Vehicles typically transmit one message every basic time interval, which is ideally 0.1 seconds. Thus, vehicles and the system as a whole generally transmits and receives updated data ten times per second.

The 0.1 s basic time interval is broken into 1000, 100 microsecond time slots. The shortest and most basic messages, including message comprising core vehicle data, fit into one time slot. This structure supports vastly more vehicles within range than prior art.

Vehicles self-assign their own time slot using a unique algorithm.

Message collisions are detected and corrected using a unique algorithm.

Messages are free from both MAC addresses and IP addresses, in one embodiment. MAC addresses and IP addresses take up a large amount of bandwidth and are unnecessary in most embodiments.

Vehicle identity is determined by the location of each vehicle. As vehicles move, the data that comprises the transmitted location changes, however, receivers track the progress of each vehicle and thus maintain continuous vehicle identities.

Core message data comprises vehicle heading and speed (collectively, "velocity"), vehicle position, vehicle type, and one or more risk values.

Core message data is sent every basic time interval (0.1 s, typical).

A novel method is employed that eliminates the use of timestamps for vehicle data, yet provides very high timing accuracy of vehicle data: vehicle data is valid at precisely the end of the basic time interval in which it is sent.

Data validity, precision and risk computation is determined primarily by the transmitting vehicle, not by the receiving vehicle.

A novel method is used whereby a transmitting vehicle may incorporate acceleration or other known factors that will shortly cause a change to future core data into a message by altering the current core data, without having to transmit acceleration data or other the factors.

GPS is used as the primary or synchronizing time base, in one embodiment.

A novel method is used to determine the time base when no GPS signal is available.

The period of time that a vehicle continues to use the same time slot is intermediate, typically up to 30 seconds. Thus, there is a low rate of new time slot acquisition and the reliability of message delivery is very high.

Time slots, because they are maintained for an intermediate duration, provide a secondary means of vehicle identification.

The basic time interval (0.1 s, typical) is subdivided dynamically into three time regions: interval class A, interval class B, and interval class C. Interval class A comprises communications in time slots and restricted to a single time slot for each message. Interval class A is used by most vehicle for high priority messages. Interval class C comprises communications in time slots and restricted to a single time slot for each message. Interval class C is used by emergency vehicles for high priority messages. Interval class A starts at time slot 1 and works upward from the start of each basic time interval. Interval class C starts at time slot 1000 (or, the highest numbered) and works downward from the end of each basic time interval. Interval class B is between the end of interval class A and the start of interval class C. Interval class B's beginning and end times are determined computed dynamically at each basic time interval. Interval class B communication is managed using CSMA/CA, the traditionally method of shared media management for IEEE 802.11 wireless communication.

Thus, the use of above interval classes A, B and C provide a hybrid method of managing shared spectrum, that provides both highly efficient and reliable time slot based allocation and highly flexible CSMA/CA allocation.

The use of the above interval classes A, B and C, where the duration and location of class B is dynamic, assures that high priority messages get through, while additional available spectrum and bandwidth is available for lower priority messages.

The use of the above interval classes A and C provide a dedicated, assured capacity for emergency vehicles, whose communications take priority over both class A and class C messages, while allowing unused spectrum to be used for lower priority messages.

The system provides for "proxying," which is where an equipped vehicle sends a V2V message on behalf of a nearby non-equipped vehicle. Proxying is a critical embodiment that permits this V2V system to be effective at preventing accidents with a relatively low penetration rate.

Local sensors, such as video, radar, and sonar are used by a first vehicle to determine relative speed, location and heading of a non-equipped, nearby, second, "subject" vehicle, to proxy.

A single bit in a message header indicates that a message is a proxy message being transmitted by a vehicle other than the subject vehicle. This is a highly efficient means to send proxy messages.

An embodiment uses a novel method to "hand off" the transmission of a proxy message from one transmitting vehicle to another transmitting vehicle.

Unlike prior art using CSMA/CA for V2V messages, embodiments use moderately fixed time slots for real-time message delivery.

Unlike prior art using completely fixed time slots for V2V messages, embodiments use dynamically assigned time slots to accommodate the use of time slots where the total number of equipped vehicles in a country might be in the tens of millions.

Unlike prior art using centralized time slot assignment for V2V messages, embodiments use self-assigned time slot numbers.

Unlike prior art where self-assigned message timing uses a random component to provide equal probability of a message time over a known time interval, embodiments use a "weighted" self-assignment algorithm to provide a variable probability of message start time over a time interval.

A novel method is used to compress location data into 24-bits per axis, with one cm resolution.

A novel hybrid location coding method is used that uses first latitude and longitude for "base grid" points, then distance (in cm) from a base grid point to establish actual position on the surface of the earth.

Angle of travel breaks the 360° compass headings into 1024 headings. These are encoded using 10 bits.

A novel method to encode speed uses a non-symmetric range around zero speed to support speeds in the approximate range of 25 mph backwards to 206 mph forwards. Speed is encoded to a resolution of about 0.2 mph, using 10 bits.

Actual units used are metric for global compatibility.

Unlike prior art, embodiments adjust transmit power to maintain adequate bandwidth for high-priority messages.

Unlike prior art, embodiments use a medium grained message priority to assure that both high-priority messages get through and that available bandwidth is efficiently utilized.

Unlike prior art, transmit power level is managed by a group "consensus" algorithm.

Unlike prior art, both actual transmit power and requested transmit power levels information is placed into appropriate message types.

Unlike prior art, transmit power level is adjusted dynamically to maintain desired minimum and maximum number of vehicles in range.

Unlike prior art, transmit power level is adjusted dynamically to maintain desired minimum and maximum range distance.

A novel method is used to permit a message to be sent at a temporarily higher power level by a first vehicle to reach an interfering second vehicle's receiver when the second vehicle is transmitting at a power level higher than the consensus power level of the first vehicle.

A novel location "consensus" algorithm is employed to determine relative positions of vehicles in range to high accuracy.

A novel algorithm is employed to determine which vehicles should participate in the location "consensus" set.

A novel algorithm is employed to quickly and efficiently identify and correct for message collisions—two vehicles using the same time slot. This algorithm uses two different methods of identifying vehicles involved in the message collision.

A novel algorithm is employed to provide a short term "overflow" time zone for vehicles to use in the even their time slot of choice is repeatedly unavailable.

A novel method is employed whereby a vehicle may send a high-priority message in interval class B if it unable to find an assured time slot in interval class A or C.

A novel method is employed to provide available bandwidth in interval class B for higher priority messages than normal class B messages.

A novel method is employed to send long messages as a "chain" of shorter messages.

A novel method is employed to permit occasional use of more than one time slot by a transmitting vehicle.

A novel method is employed that uses the most reliable encoding method for high priority messages while lower priority messages may use a higher density, but less reliable encoding method.

A novel method is employed that allows a transmitter to send a message in a single time slot that normally would be too long to fit in a single time slot by temporarily using a higher-than-normal-density encoding method.

A novel method is employed to generate, store and share lane maps between equipped vehicles.

A novel method is employed to generate, store, and share location histories between equipped vehicles.

A novel, simple and low-cost method is employed using fixed, visual targets in conjunction with a location-calibrated roadside transmitter to ensure high location accuracy of all vehicles in an area, such as an intersection.

A novel method is employed to limit the rate at which location correction may generate an apparent "artifact" motion of a vehicle.

A novel method is employed to use four factors in computing risk: vehicle motions, weather and road conditions, traffic condition, and location history.

A novel method is employed to encode the primary sources of a total computed risk as four one-bit flags: vehicle behavior, weather and road condition, traffic condition, and location history.

A novel method of efficiently communicating the highest risk accident type uses a four-bit field to encode the highest risk accident type.

A novel method of efficiently encoding vehicle size and weight uses a six-bit "vehicle type" field.

Special message types and special protocol is used in parking lots to avoid parking lots scrapes.

Special transmitter power management and message timing are used in a "parking lot mode."

A novel method of transmitting identified full or empty parking spaces on a street or parking lot is used to add value to the users of the V2V system, thereby accelerating penetration.

A novel method used to restrict the decoding of broadcast parking space information to a select set of V2V transponders is available as a feature of one embodiment.

Some information stored in a V2V transponder is both digitally encrypted using an institutional public key and signed using a unique private key so as to strongly preserve both the confidentiality of stored data and its integrity.

A novel method of identifying potential hackers or malfunctioning V2V transmitters is used whereby the transmitted location is compared to a set of locations determined by the transmission delay of the transmitted frame in its time slot.

A "network error" warning is transmitted upon detection of a possible invalid transmission based on the location/delay comparison.

A novel method of identifying intentional or accidental transmission of invalid V2V message data comprises vehicles in range recording data, such as taking photographs of a suspect vehicle or location, upon receipt of a network error warning message.

A novel method of achieving fast response to an intentional or accidental transmission of an invalid V2V message data comprises forwarding of network error warning messages beyond the immediate range.

A novel method of identifying the actual location of an intentional or accidental transmission of an invalid V2V message comprises each vehicle in range triangulating the source of the invalid message by measuring the wireless transmission delay of the receipt of the invalid message.

Transmission of audio and video messages are permitted in message class B. These messages may be broken up into smaller messages and "chained," thus permitting long messages to be sent over multiple basic time intervals.

Drivers may use one or multiple novel methods to identify a particular vehicle from a set, such as touching an icon on a screen, pointing, or using verbal information.

Messages may be directed to a single vehicle by the use that vehicle's location for identification. Note that the actual location for a given vehicle changes continually, as it moves.

In some cases, a vehicle may be identified by the time slot it is using.

Message may be directed to a class of vehicles by placing that vehicle class into an appropriate field in an appropriate message. No "multicast" server, router or list is required.

The level of risk is computed to a "risk value," using an 11-step scale. The advantage of this "medium grained" scale is that each numeric risk level has a well-defined meaning with respect to both how people perceive risks and the specific responses a V2V system must engage when it receives a particular risk level.

A novel feature uses the risk value as a message priority. Such message priorities are used in a priority method to assure that the highest priority messages always get through.

Risk value is computed by the transmitting vehicle.

A method of restricting the forwarding of V2V messages comprises using a hop count.

A method of restricting the forwarding of V2V messages comprises using a maximum distance.

A method of restricting the forwarding of V2V messages comprises using the direction of traffic flow as it relates to the location of subsequent forwarders.

A novel method of avoiding a forwarding storm (too many vehicle retransmitting a message) comprises using the priority of lower-number time slots to select a forwarder.

A novel method of avoiding a forwarding storm comprises using the direction of traffic flow and the location of previous forwarders to avoid resending a message that has already "passed by."

A novel method of forwarding uses different forwarding parameters, based on the type of message.

A novel method of forwarding uses different forwarding parameters, based on the direction of traffic flow.

Novel methods are employed to create and share data regarding lanes, paths, elevations, crossings, sidewalks, curbs, signals, defects and features, and other transportations fixtures, including permanent, temporary, intentional and non-intentional.

A unique benefit of such above methods is the elimination of the need for users of a V2V transponder, device, software, app or system to subscribe to mapping service or other for-charge service.

Methods are provided to implement secure gateways of V2V information over secondary, third-party, or insecure networks such as WiFi, cellular phone, cellular data, and Bluetooth.

DETAILED DESCRIPTION OF THE INVENTION

Table of Contents

Concept and Definitions
Proxying
Physical Layer
Vehicle Identification
Power Management
Time Slots
Message Classes
Message Formats
Message Types
Risk Determination
Location History
Time Slot Assignment and Message Collisions
Position Determination
Lane Maps
Vehicle Elevation
Forwarding
Hacking and Security
Recording and Encryption
Traffic Signal Optimization
Parking, Courtesy Messages and Gateways

BRIEF DESCRIPTION OF THE DRAWINGS

FIG. 10 shows two examples of visual location calibration beacons.

FIG. 11A shows prior to location consensus and FIG. 11B shows after location consensus.

FIG. 14 shows a Final Risk Value Table.

FIG. 15 shows a Vehicle Behavior Sub-risk Value Table.

FIG. 16 shows a Weather and Road Conditions Sub-risk Value Table.

FIG. 17 shows a Braking Sub-risk Table.

FIG. 18 shows a Turning Sub-risk Table.

FIG. 19 shows a Historical Sub-risk Table.

FIG. 20 shows an example of Lane Map Confidence Levels.

FIG. 21 shows an example of Lane Map generation transactions.

FIG. 22 shows one embodiment of basic V2V message fields.

FIG. 23 shows Collision Type coding.

CONCEPT AND DEFINITIONS

Figure 1:
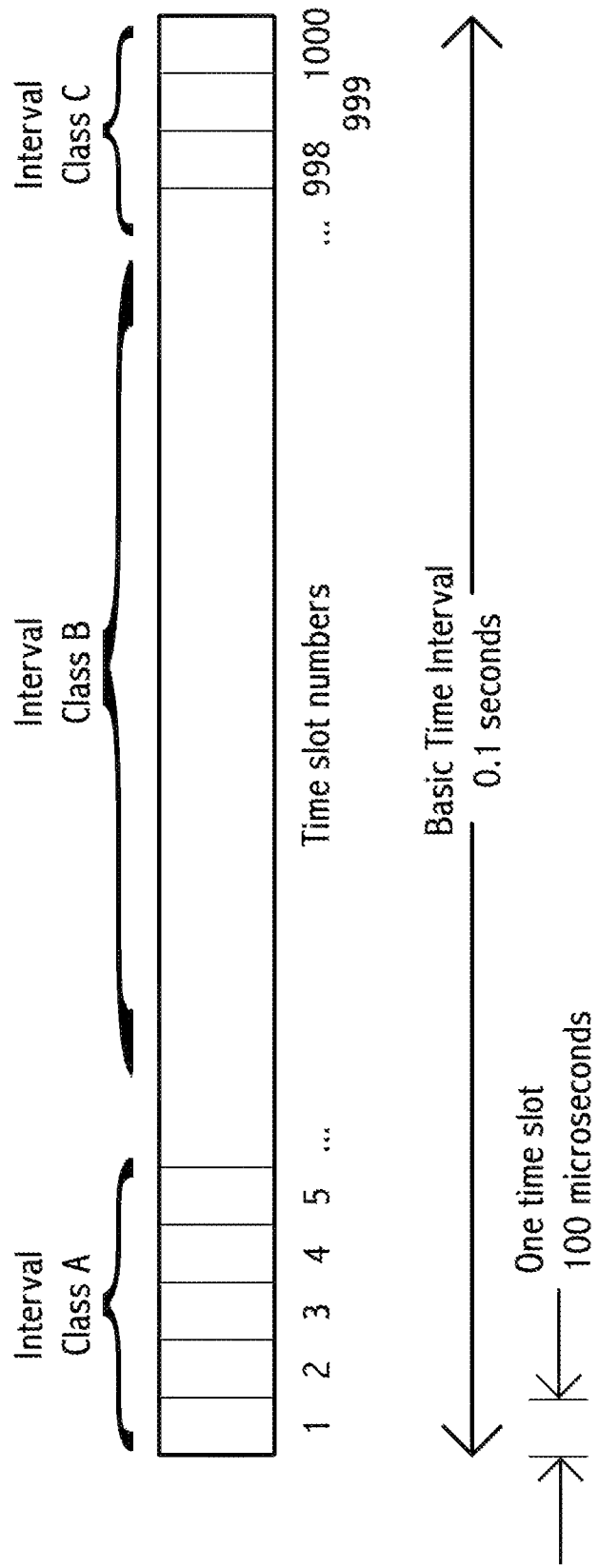
FIG. 1 shows a basic time interval of 0.1 s with 1000 numbered time slots, each 100 μs.

A basic heart of a V2V system comprises an equipped transmission vehicle, an equipped receiving vehicle, an assigned spectrum and physical (wireless encodings, bandwidth and power) layer, and an agreed message protocol. The transmitting vehicle transmits its position, speed and direction. The receiving vehicle receives the transmission and compares the transmit vehicle information with its own position, speed and direction. This comparison results in a possible collision determination, with an appropriate warning or action taken in response.

We refer to the combination of speed and direction as "velocity." We refer to the location and velocity of a vehicle, along with any other optional information about the vehicle or its environment as "vehicle information" or "vehicle data."

We refer to any variation in transmitters and receivers, so long as at least one is capable of motion, as "V2V." For example, fixed equipment to vehicle is sometimes known as X2V, or the reverse, V2X. We use V2V to encompass all such variations, including, for example, bicycle to pedestrian, or fixed roadside hazard to vehicle. Similarly, when we refer to a "vehicle" we mean any equipped V2V device or entity, including, for example, fixed road hazards and moving strollers.

The fundamental purpose of any V2V is to avoid or reduce collisions, including single-vehicle collisions, and to reduce the severity of remaining collisions. We refer to the aggregate of these benefits as "reducing collisions."

"Range" refers generally to the distance or area in which two ore more vehicles may communicate, at least on one direction, point-to-point, without forwarding, using V2V protocol.

"V2V protocol" refers to the aggregate of communication within this document, including what the ISO model refers to as layers 1 through layer 7, that is, the physical layer through to the application layer, inclusive. The V2V protocol moves discreet "V2V messages" between vehicles, predominantly in a point-to-point communication mode.

A "V2V transceiver" is a device capable of both transmitting and receiving V2V messages via a V2V protocol.

A vehicle is "equipped" when it has a functional, compatible, operating V2V transceiver.

Unlike prior art, a key purpose of various embodiments of this invention is to encourage adoption. AV2V systems are only effective when there is some minimum percent threshold of participation by vehicles in an area. We refer to a percentage of equipped vehicles as "penetration." Therefore, features and methods that encourage adoption are valuable.

A key embodiment of this invention that improves effectiveness and encourages adoption is the detection of nearby non-equipped vehicles and the transmission of data about that vehicle. We refer generally to this capability as "proxying." In one embodiment the actual transmitting vehicles "pretends" to be the non-equipped vehicle for the purpose of transmitting a V2V message.

"Core information" refers generally to a vehicle's position, speed, direction and size. We treat core information as the minimum information needed for a receiver to determine and avoid a collision. Risk value and source may be included with core information. A minimum amount of information about the size of vehicle is also needed as a way to quickly estimate the two-dimensional footprint or three-dimensional physical extent of the vehicle. For example, a simple "vehicle type" designation from a set (such as: car, small truck, large truck, oversized vehicle, pedestrian, bicycle, barrier) is generally adequate. This simple vehicle type designation provides both an approximation of vehicle size and shape and an approximation of possible future and defensive options for the vehicle. For example, cars can stop faster than trucks. As another example, pedestrians frequently operate safely with a lesser distance amount of separation than vehicles. As a third example, a fixed barrier is not expected to take any dynamic measures to avoid a collision.

The terms "accident" and "collision" have largely the same meaning. The term "collision" is generally preferred.

The terms "collision avoidance," "collision prevention," and "collision mitigation" have meanings that substantially overlap. The use of one term over another should not be viewed as limiting. In general, we prefer the term, "collision avoidance" to refer to all forms of avoiding and preventing collisions, manual and automatic defenses and responses, and damage and injury mitigation should a collision occur. Mitigation is a key benefit of this invention, even if full avoidance does not occur. Thus, "anti-collision" specifically comprises all forms of damage and injury mitigation and minimization, including responses appropriate before, during and after a collision occur.

The optimal "position" for a vehicle to transmit is generally the center of the front of the vehicle. As most collisions involve at least one vehicle front, this is a most critical point. The four corners of a rectangular vehicle are readily calculated based on approximate size from the vehicle type. There are a few exceptions. For example, if a large truck is backing up, it would be appropriate for the position transmitted to shift to the center rear of the vehicle. As another exception, a fixed barrier should preferably transmit its most extreme point— that is the point closest to possible collision traffic.

The terms "position" and "location" are generally used interchangeably herein. Position or location may be absolute geolocation, such as GPS coordinates, or may be relative, such as an offset from another vehicle. Ideally, "location" is a preferred term for an absolute geolocation coordinate, or its equivalent, while "position" is a preferred term when discussing the close relationship of two points. However, since the absolute and relative coordinates are computationally interchangeable, alternate usage is primarily for emphasis and convenience.

We use the term "acceleration" to describe any rate of change of velocity. Thus, this includes braking, turning, and speeding up.

While "range" is a term related to the effective maximum point-to-point wireless communication distance of two vehicles, we introduce a term, "known vehicle" which is a vehicle whose position, velocity and type are known to within some threshold of accuracy and reliability. A vehicle may be known because it has broadcast that information, but is out of sight. A vehicle may be known because it is "seen" by one or more sensors, such as a video camera, radar, sonar or lidar. This latter vehicle may or may not be equipped.

We will not discuss here the computations to determine future positions of vehicles, as these are well known. We will not discuss the electronics for transmitting, receiving, encoding, or decoding digital information wirelessly, as these is well known. We will not discuss methods of obtaining GPS coordinates, or obtaining video or still image data from a camera, or obtaining distance measurements from a sonar device or lidar device as these are well known. We will not discuss the microprocessor, memory, power supply or packaging of a V2V transceiver, as these are well known.

Proxying

A key embodiment for adoption is the detection of nearby non-equipped vehicles and the transmission of data about that vehicle. In one embodiment the actual transmitting vehicles "pretends" to be the non-equipped vehicle for the purpose of putting data into a V2V message. Thus, it not strictly necessary to identify the true sender, but rather it is more important that the core information be transmitted. Our preferred embodiment uses a dedicated bit in the message header to identify proxy messages, as a highly efficient means to send proxy messages that fit within one time slot, without the overhead of including two vehicle locations in the message.

During the years of deployment, we expect a large fraction of core data messages will be proxies. Thus, efficient encoding of proxy identification is crucial to preserving bandwidth.

Consider a situation where there is 25% V2V penetration, meaning that 25% of vehicles in an area are equipped. Consider a typical busy city intersection where a two-lane one-way street crosses a four-lane two-way street. We assume for this computational example that, on average, each equipped vehicle can has approximately eight other vehicles that it can "see," meaning that the vehicles local sensors are able to determine, at least in one axis, the relative location of that vehicle to itself. We refer to all such vehicle as the "proxy candidate list." Vehicles in this list might comprise the vehicle in front, the vehicle behind, two vehicles in the lane over, and one vehicle in each lane of the cross street. These eight vehicles are "line of sight," or "seen" to one or more sensors, or were in a line of sight so recently as to allow their calculated relative information to be within our acceptable thresholds. Note that "line of sight" for some sensors, such as radar, is better than the vision of the driver. For example, some radar is able to see "under" an adjacent vehicle to detect the distance of the next adjacent vehicle. As another example, a roof-mounted camera may be able to see more vehicles that the driver is able to see.

With 25% penetration and eight vehicles on the proxy candidate list, there is approximately 0.75^8 chance that no vehicle is equipped. Or, a 90% chance that at least one other vehicle is equipped. If each vehicle transmits core data for all vehicles in its proxy candidate list, this 25% penetration rate achieves 90% effectiveness (compared to 100% penetration). Even a 10% penetration rate achieves better than 50% effectiveness.

High system effectiveness at low penetration is further improved by deploying a fixed V2V transceiver with good sight lines at high-risk intersections. Such a transceiver has an excellent view of nearly all vehicles approaching the intersection, and thus provides close to 100% effectiveness for any vehicle equipped with a receiver near the intersection. Note that a vehicle might be temporarily blocked from such a sightline by a larger vehicle, however, its approximate position, speed and heading may be realistically estimated, and thus such a temporarily hidden vehicle may remain on the fixed V2V transceiver's proxy candidate list.

A suitable algorithm for temporarily maintaining such a hidden vehicle in the proxy candidate list is to initially continue the vehicle's last known velocity and acceleration from its last know position, then linearly convert to a velocity and position that are the numerical averages of the velocity and position of the vehicles directly in front and behind the hidden vehicle, while maintaining the hidden vehicle's position within the effective site-line "shadow" created by the blocking vehicle.

There are several non-obvious advantages to this embodiment. That is: transmitting the core data of all known, non-equipped vehicles. One such advantage is that even with a low penetration the statistical effectiveness of the system is measurable. Such credible data on collision reduction, and the cost and pain savings associated with that, provide a powerful motivator for both individual purchases of V2V transceivers and government mandates to make V2V transceivers mandatory, or for alternative government-initiated motivators. For example, a law requiring a significant decrease in vehicle insurance premiums might be such an alternative motivator.

A second non-obvious advantage is that with equipped vehicles "pretending" to be non-equipped vehicles, bandwidth usage and other physical layer attributes, such as error rates and radio interference, are tested in the earliest stages of deployment. Thus, algorithms, thresholds, features and other elements of the protocol are reliably measured under conditions similar to high deployment in time to improve these elements of the protocol before the highest volume manufacturing and sale.

The non-deterministic protocol of currently proposed V2V systems do not have scalable behavior. That is, performance at, say 25% bandwidth capacity is not a usable predictor of what will happen at 50% utilization. Thus, currently proposed systems may fail under high deployment, but that will not be known for many years.

Note that vehicles in the proxy candidate list that are properly transmitting are not proxied. Thus, there is minimum duplication of transmitted messages.

There are a number of reason why a vehicle in the proxy candidate list is not actually proxied. One reason is that it is properly transmitting. Another reason is that at insufficient information is available to construct a reliable proxy message. Another reason is that another transmitting vehicle is already a proxy transmitter for the subject vehicle.

When another vehicle sends data on behalf of a different, non-transmitting vehicle we call the first vehicle the "proxy transmitter." When discussing proxying, the vehicle being proxied is the "subject vehicle." If the preferred embodiment of including a "proxy" bit in the message header is not used, then in that embodiment a listening V2V transceiver cannot trivially tell if a message is being sent by the subject vehicle or by a proxy transmitter. Nonetheless, the information in those messages accomplishes the core goal of a V2V system.

As a first subject vehicle moves out of sight (off the proxy candidate list) to the proxy transmitter, after a period of time the proxy will stop transmitting data for that subject. Other equipped vehicles, that have the first subject vehicle on their own proxy candidate list, were not acting as a proxy transmitter for the first subject vehicle because there were receiving proxy messages for it, now start acting as a proxy transmitter for that first subject vehicle.

Once the first proxy transmitter stops transmitting for a given proxy subject vehicle, another transmitter, with the given subject vehicle in its proxy candidate list, will start transmitting proxy messages for it immediately. Because most message transmissions use the same time slot each basic time period, and the proxy messages are tagged with a "proxy" bit, other potential proxy transmitters for the given proxy subject vehicle generally know immediately when a current proxy transmitter stops sending proxy messages for that subject vehicle because the expected time slot is now empty. The new potential proxy transmitter now has two options. It may either use the prior proxy time slot or it may select a new time slot for the proxy messages. If the potential transmitter is the closest potential transmitter to the given proxy subject vehicle, it uses the prior proxy time slot. If it is not the closest potential transmitter to the given proxy subject vehicle, it selects a new time slot. In this way, there is minimal likelihood of a message collision in the prior proxy time slot due to two new proxy transmitters at the same time.

At the same time as the above "proxy handoff" from a first proxy transmitter to a second proxy transmitter, all potential proxy transmitters are listening to see if any other proxy transmitter has started transmitting, "first." The first new proxy transmitter to broadcast a proxy message for the being-handed-off proxy subject vehicle "wins," in the sense that it is now the proxy transmitter for that subject vehicle. Note that the winning new proxy transmitter may be using the same time slot as the old proxy transmitter, or a lower numbered time slot, or a higher numbered time slot. Thus, it is possible that the proxy handoff occurs within a single basic time interval. It is also possible that an entire basic time interval passes with no proxy message for that subject vehicle.

A vehicle stops proxying for a subject vehicle when it believes that its data about the subject vehicle is not longer sufficiently accurate to warrant its acting as the proxy transmitter. Such determination is up to the transmitting vehicle, and may include consideration of the relative positions of other potential proxy transmitters.

Two or more proxy transmitters may proxy for the same subject vehicle. Such actions are permitted, but not encouraged for extended periods of time. One such reason is that a second proxy transmitter believes that the information about the subject vehicle is not accurate or is less accurate that information available or computed by the second proxy transmitter.

It is desirable but not critical to know the identity of the proxy transmitter. This information may be communicated in several ways. A preferred method is to send a single message that comprises both the identity of the proxy transmitter and the identity (location) of the proxy subject. Such a message is called a "proxy linking" message. It may be sent in either interval class B or A. Ideally, this message should be send in the same or subsequent basic time interval as the first proxy message, or as soon as possible thereafter. In addition, such a proxy linking message should be sent regularly, such as every two seconds. Once a proxy linking message has been received, the receiver may generally assume the identity of the proxy messages until a proxy linking message is received, or a new time slot is used for the proxy message. A proxy linking message may be sent with a low encoding rate in interval class B, or at a higher encoding rate in interval class A.

An alternative method of sending proxy messages comprises alternately sending core data for the proxy transmitting vehicle and the proxy subject vehicle in alternate basic time intervals, using the same time slot. This method is not preferred, but consumes the least bandwidth. It is most applicable when no risks are associated with either message.

A proxy transmitter may proxy for more than one proxy subject vehicle. This is a common occurrence.

In some cases a V2V system has wireless line-of-sight "blind spots." For example, two streets may intersect at a corner where a building on the corner blocks direct radio line-of-sight. Two vehicles approaching the intersection at high speed might not be receiving messages from each other, even if both are equipped. In this case a vehicle may become a proxy even though both vehicles potentially involved in a collision are equipped. In this mode, a potential proxy V2V system calculates possible collisions of other vehicles within range. We refer to this capability as "proxying equipped vehicles." This capability is most appropriate when a potential proxy transmitter detects a high risk and that risk is not being appropriately broadcast. Alternatively, this capability may be used when a potential proxy transmitter detects a high risk and that risk is being appropriately broadcast, but not necessarily received by all appropriate recipients. Such proxying of equipped vehicles messages may send high-priority messages in either interval class A or B.

It is useful to provide a method of avoiding excessive proxying. We first add some additional definitions. A "first circle range" consists of those vehicles in range or in sight that are closer to the transmitting vehicle than to any other equipped vehicle. A "second circle range" consists of those vehicles in range or within sight that are the closest vehicle to the transmitting vehicle within the lane of the subject vehicle, with the addition of any vehicle in range or in sight that is directly in front or directly behind the transmitting vehicle. For example, on a two-lane, bi-directional street, vehicles in the second circle range would typically include the vehicle directly in front, the vehicle directly behind, the closest oncoming vehicle, the closest vehicle moving in or out of a street-parking space, the closest vehicles moving in or out of a driveway, and the closest vehicle in any given turn lane, assuming that all such vehicles are in range or in sight. If a cross-street is in view, then one closest vehicle in each lane of the cross-street would also be in the second circle range, assuming that such vehicles are in range or in sight. An "outer circle range" consists of those vehicles in range or in sight that are neither in the first circle range of the second circle range. Note that the only vehicles included in the first circle range, second circle range, or outer circle range are those vehicles that are moving, or have a likelihood of moving, or are transmitting.

Figure 4:
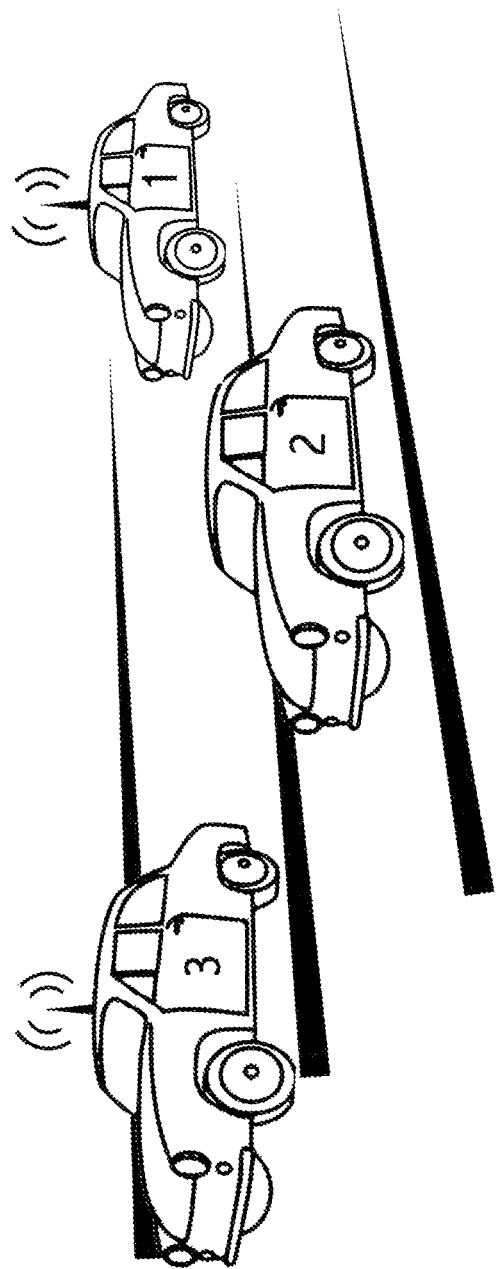
FIG. 4 shows three exemplary vehicles in two traffic lanes, with vehicles 1 and 3 V2V equipped, vehicle 2 unequipped and being proxied.

FIG. 4 shows three typical vehicles, numbered 1, 2 and 3. Vehicles 1 and 3 are equipped with V2V transponders, shown on the roof of the vehicles as an antenna. Vehicle 2 is not equipped. In normal operation, vehicle 1 and 3 each transmit their location and velocity ten times per second. Vehicles 1 and 3 receive each other transmissions. If vehicle 1 were about to rear-end vehicle 3 both vehicle 1 and 3 would provide a warning to the drivers. If necessary, vehicle 1 would active an automatic braking system to prevent the collision.

Vehicle 2 is not equipped. However, both vehicles 1 and 2 "see" vehicle 2 with their local sensors, such as video, radar and sonar, which allow both the relative location and velocity of vehicle 2 to be determined. Both vehicle 1 and vehicle 3 are able to transmit a "proxy" message for vehicle 2, here called the "object vehicle" of the proxy. To do this, the transmitting vehicle typically takes a new time slot and advertises vehicle 2's position as if vehicle 2 were in fact equipped. Although both vehicle 1 and 3 are able to "see" vehicle 2, ideally one of vehicle 1 or vehicle 3 should transmit a proxy message. Since both vehicle 1 and vehicle 3 are receiving all messages from transmitters in range, they know if some other vehicle is already broadcasting a proxy message for vehicle 2. If such a proxy is already being broadcast, a repeat proxy broadcast is not necessary. In the case of this Figure, vehicle 1 is broadcasting the proxy message for vehicle 2. As vehicle 2 speeds up and passes vehicle 3, it is no longer in sight of vehicle 1 so vehicle 1 will stop broadcasting proxies for vehicle 2. However, vehicle 2 is still in sight of vehicle 3, and vehicle 3 notices that there are no longer proxy messages for vehicle 2, so it begins to broadcast a proxy message for vehicle 2. It may use the same time slot for this proxy message that vehicle 1 was previously using.

Physical Layer

Embodiments use a physical related to the prior art of IEEE 802.11p, but with important differences. Each 0.1 second is broken into 1000 time slots, each 100 μs in duration. Vehicles send their core information in a selected time slot. Effective range is 250 meters. Every vehicle transmits, in our preferred embodiment, every 0.1 seconds. This interval is called the basic time interval. The basic time interval is broken into three zones: interval classes A, B and C. Class A is for regular safety-related messages, also called "priority messages." Class C is reserved for emergency vehicles. Class B is for non-safety-related messages, also called, "low-priority messages," which maybe longer. Class A starts at time slot zero and moves upwards, based on demand for time slots. Class C starts at time slot 1000 and moves downward. Class B does not use time slots, but rather a modified CSMA/CA. The duration of Class B changes every basic time interval.

The basic time interval is divided into three "interval classes:" Interval class A starts with time slot 1 and uses consecutively numbered time slots counting upwards from there, such as 2, 3, 4, etc. Interval class C starts with time slot 1000 and uses consecutively numbered time slots counting downwards from there, such as 999, 998, 997 etc. Interval class B is in between interval class A and interval class C. Interval class B uses time slots optionally. This organization of the basic time interval into three interval classes in a unique and innovative aspect of this invention.

Interval class A contains safety-related or high-priority messages. These are the fundamental messages for vehicle collision avoidance and mitigation in the V2V system. Interval class C contains V2V messages from emergency vehicles and certain fixed, government provided, roadside equipment such as traffic signals.

The allocation system of time slots in interval classes A and C causes time slots to be allocated "near the ends" of the basic time interval. That is, chosen time slots in interval class A tend to clump in in the lowest numbered time slots, while chosen time slots in interval class C tend to clump in the highest numbered time slots. The number of time slots actually used in the interval classes A and C depends on the needs of equipped vehicles within range. Thus, the size (as number of used time slots) of interval classes A and C is variable, and changes dynamically. Interval class B may be viewed as the "left over" bandwidth of the system, available for use for lower priority messages.

Interval Classes

A unique feature of one embodiment is that the dividing lines (in time) between interval classes A and B; and between interval classes B and C, are variable.

The way this works is that time slot selection for transmissions for interval class A and C are "weighted" towards the ends of those interval classes. Interval class A is weighted towards time slot 1. Interval class C is weighted towards the highest numbered time slot, such as 1000.

Time slots are still selected using a random back-off algorithm, only in this embodiment a weighting factor is used to push the assignments towards the ends of the A and C interval classes. Weighting factors may be linear, exponential, or other shapes. The specific weighting factor uses varies with the bandwidth used or the number of vehicles transmitting within range. That is, it varies with number of time slots already in use. When only a few time slots are in use, the weighting is "heavy," keeping new time slot selections near the ends of the interval classes. When many time slots are in use, weighting is minimal, or zero, spreading out the time slots selections within the basic time interval, and maximizing the chance of a non-interfering time slot selection.

Between the last normal used time slot in interval class A and the start of interval class B a predetermined number of time slots are left empty as a buffer zone. These time slots may be used when a V2V transmitter is having trouble selecting a new, clear time slot, or for new "high risk" messages. This buffer zone may be viewed as an "overflow" or "emergency" zone. There is a similar zone between interval class C and the end of interval class B. This zone is used by class C transmitters. A suitable width of the buffer zones is 25 time slots each.

Looking now at FIG. 1 we see what a basic time interval looks like for one embodiment. The times shown in this Figure, which may be different in different embodiments, are: the duration of the basic time interval at 0.1 seconds; the number of time slots in the basic time interval at 1000; and the time duration of one time slot at 100 microseconds. V2V transceivers typically send a location update message every basic time interval, or ten times per second. They typically use one time slot for their transmission, with each equipped vehicle using a different time slot. Messages in interval class A use low numbered time slots at the start of the basic time interval, starting with one and working upward. Messages in interval class C use high numbered time slots starting with 1000 and working downward. The empty time area near the middle of the basic time interval—between the last interval class A time slot used and the first interval class C time slot used is the interval class B. Message in interval time slots A and C are restricted to one time slot each in duration and must be safety-related messaged. Messages in interval class B maybe longer than one time slot and may be non-safety-related messages.

Figure 2:
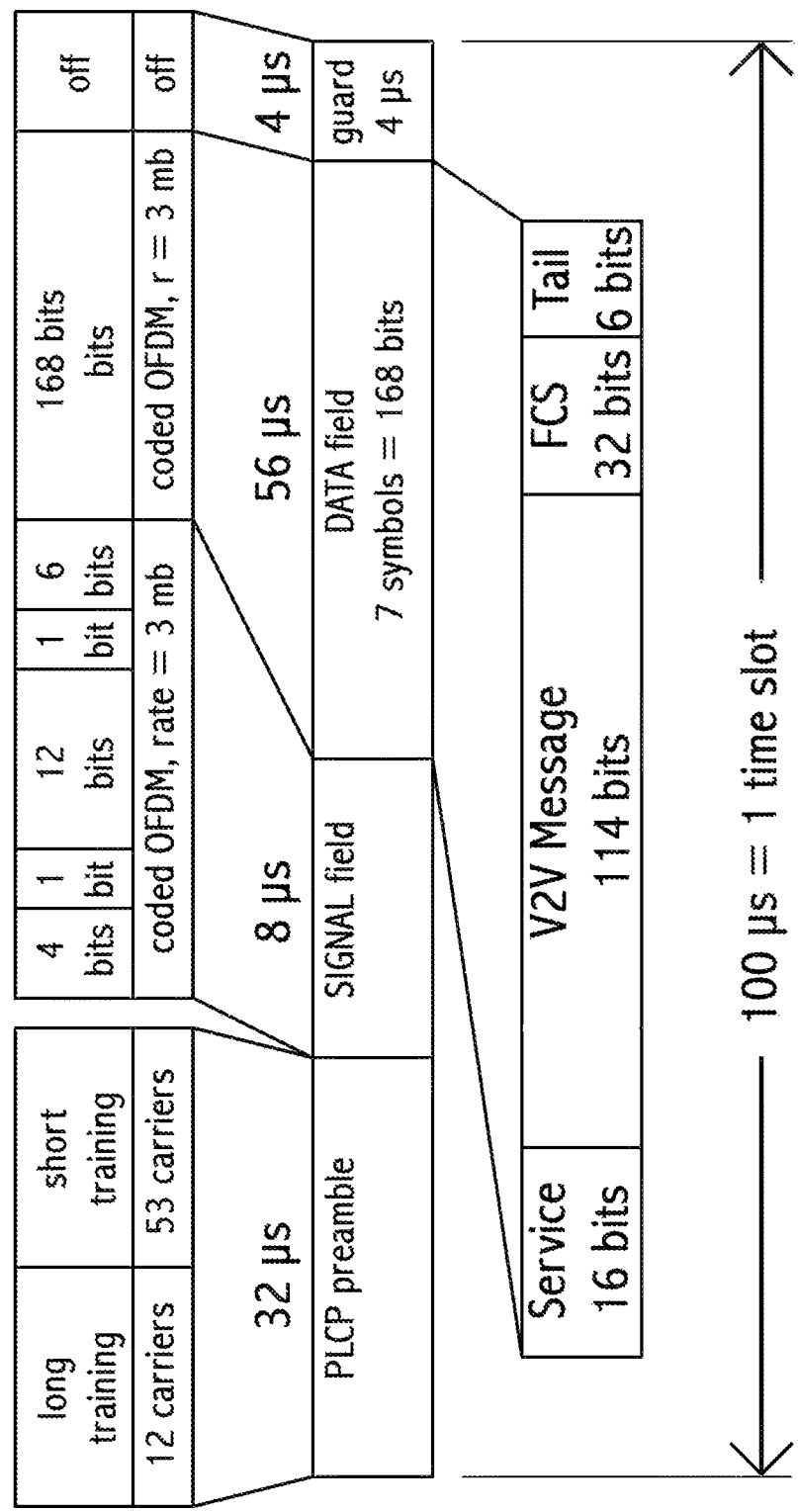
FIG. 2 shows a single 100 μs message frame in IEEE 802.11p format, with a 3 mbit/s modulation, comprising SIGNAL, SERVICE, FCS, and Tail fields, with 114 bits available for a V2V message.

Looking now at FIG. 2 we see the organization and timing of one V2V frame. Most of what is shown in this frame is prior art, for example, IEEE 802.11 and IEEE 802.11p. The 32 μs PLCP preamble has two training sequences that allow receivers to lock onto the transmitter's signal. The 8 μs SIGNAL field comprises the RATE field at 4-bits; then a 1-bit reserved field; then a 12-bit LENGTH field, then a 1-bit PARITY field; then a 6-bit TRAIL field. The PLCP preamble and the SIGNAL field are compatible with 802.11p. The SIGNAL field contains information that informs the receiver about the modulation that will be used in the upcoming DATA field. This Figure shows the DATA field modulated at a 3 mbit/s data rate. Symbols (except in the PLCP preamble) are 8 μs in duration and contain 24-bits each. The entire frame must fit within one time slot, here shown at 100 μs. There is a 4 μs guard time at the end of the transmission during which there is no transmission at all. This guard time is unique. This guard time allows different time of flight, up to a maximum of about 1.2 kilometer. The preferred embodiment of this invention is to limit power to an effective range of 250 meters.

The DATA field data rate is effectively set by information in the SIGNAL field. Shown here, at a rate of 3 mbit/s, there is room for 168 bits in this field. At the start of the DATA field is a 16-bit SERVICE field. This field maintains compatibility with IEEE 802.11p. The HEADER field is defined by this invention. It is used in all frames. It provides information on the length of the message and flag bits. At the end of the DATA field is a 32-bit FCS or Frame Check Sequence. These bits cover the entire DATA field. The use of these bits provides receivers with a very high level of confidence that they have correctly demodulated the frame. The FCS is defined for this frame in this embodiment by IEEE 802.11.

After the HEADER and before the FCS is room for one or more sub-messages. It is these sub-messages that contain the V2V information or implementing the V2V application layer functionality. The 114 bits shown in this Figure is sufficient for core messages and many other sub-message types.

Figure 3:
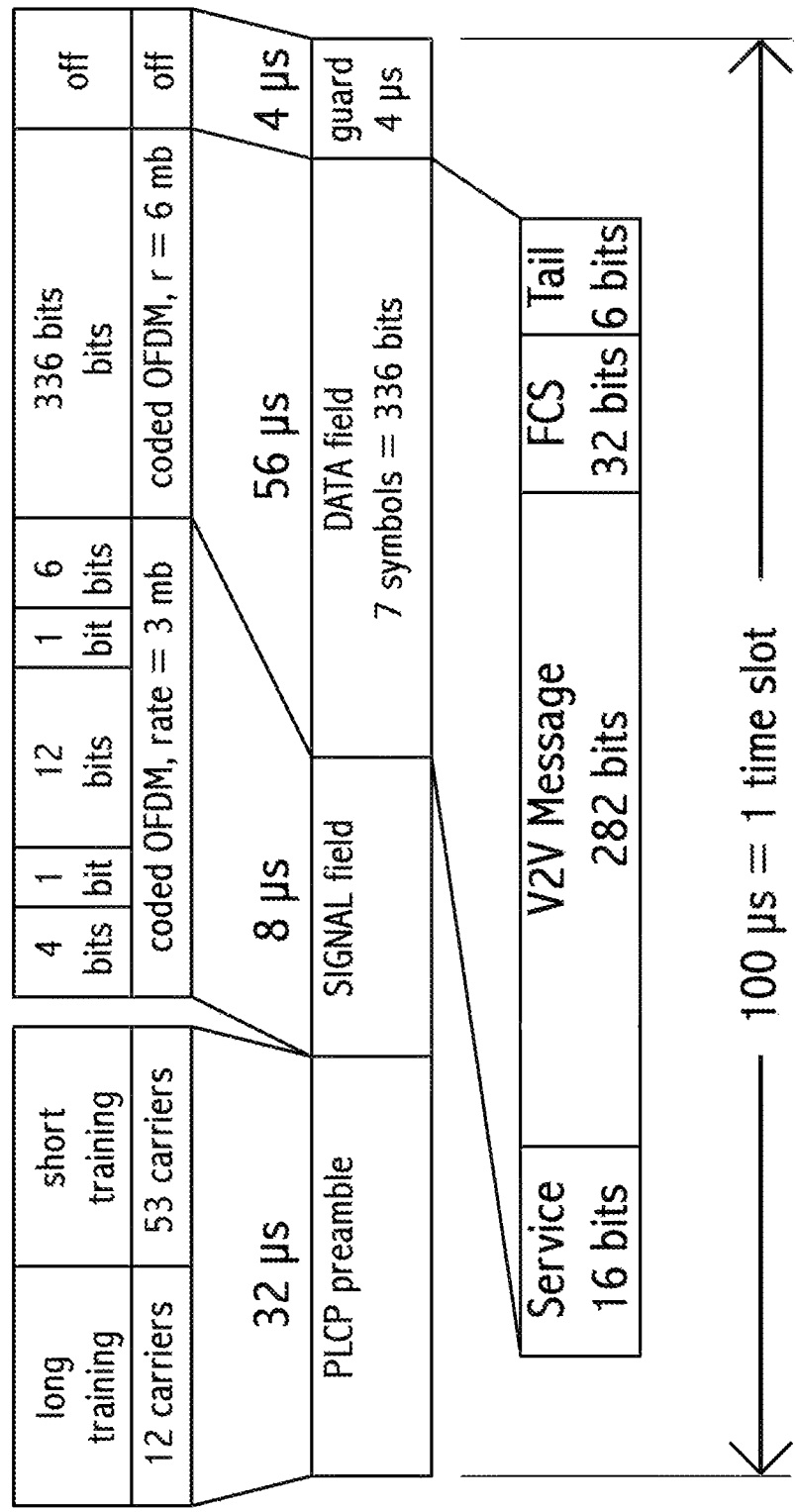
FIG. 3 shows a single 100 μs message frame in IEEE 802.11p format, with a 6 mbit/s modulation, comprising SIGNAL, SERVICE, FCS, and Tail fields, with 282 bits available for a V2V message.

FIG. 3 is similar to FIG. 2, except that now the data rate for the DATA field is 6 mb/s, which permits 282 bits in the V2V message. This typically allows more than one sub-message in this frame. At this data rate, 8 µs symbols now contain 48 bits each.

If two transmitters within range of each other choose the same time slot in a basic time interval then there is a message collision in that time interval. At least one of the transmitters then makes a new time slot selection, using the time slot selection algorithm. There is no "back-off delay" in the sense of CSMA/CA and CSMA/CD, but rather new time slot selection for the next basic time interval. (Fixed roadside equipment, such as signals, may wait up to two basic time intervals before selecting a new time slot upon a collision. If the collision goes away, then the original time slot may be maintained. This generally forces vehicles to change time slots, rather than fixed equipment.) Alternatively, a transmitter that must select a new time slot due to a message collision may select a new time slot in the same basic interval as the collision, assuming the transmitter is able to detect the collision in time. The transmitter may choose to transmit the same message that was collided now in interval class B, within the same basic time interval as the collision, then select a new time slot in interval class A for the next transmission.

Transmitters keep the time slot they have selected as long as possible; they only choose a new time slot when necessary due to a message collision or a re-evaluation interval. Thus, there is a minimum amount of new time slot selection and thus message collisions due to simultaneous identical time slot selection.

When a transmitter selects a time slot, it uses that time slot in the next basic interval, unless the risk factor of the frame to transmit is above a threshold, say four. In this case it may use the same basic interval for transmission, provided that its new time slot selection is for a time slot greater than the one used for transmission that had interference; or it may repeat the message transmission in interval class B.

A transmitters should send a message collision notification sub-message if its determine that two transmitters have a message collision in a time slot, unless a similar message collision notification has already been sent. This sub-message identifies the time slot with the message collision, or at least one vehicle location.

The format of the message collision sub-message for time slot identification is shown in the Table below:

TABLE 1

Message Collision Notification Using Time Slot
Message Collision Notification Sub-message w/ Time Slot

| Field Name | Size in bits |
| --- | --- |
| Sub-message type | 6 |
| Message collision time slot | 12 |
| Number of detected collisions | 4 |
| Receive signal power | 4 |
| Reserved | 4 |
| Total Bits in Sub-message | 30 |

The format for Type 2 Message Collision Notification Sub-message is shown in the Table below:

TABLE 2

Message Collision Notification Using Location
Message Collision Notification Sub-message w/ Location

| Field Name | Size in bits |
| --- | --- |
| Sub-message type | 6 |
| Message collision time slot | 12 |
| Target location: offset N-S | 24 |
| Target location: offset E-W | 24 |
| Number of detected collisions | 4 |
| Receive signal power | 4 |
| Reserved | 4 |
| Total Bits in Sub-message | 78 |

The message collision time slot identifies the number of the time slot in which the message collision occurred. 12 bits permits up to 2046 time slots. The values of zero and 2047 in this field are reserved. The number of detected collisions identifies the number of basic time intervals in which a message collision in this time slot is likely to have occurred, for at least two of the same transmitters. A reasonable time interval in which to count collisions is two seconds. A message collision notification sub-message should only be sent when at least two consecutive basic time intervals contain a probably collision in the same time slot. If one or both the message transmitters is distant, a receiver might have some basic time intervals in which a collision is detected and others where a message is received properly and no collision is detected. Thus, a receiver might accumulate a number of counted message collisions before sending this sub-message. Four bits permits number in the range of zero to 15 to be in this field. The values of zero and one are reserved. The value of 15 means, "15 or more." The receive signal power field uses four bits to encode up to 14 levels of received signal power. The values of zero and 15 are reserved. There is a reserved field of four bits. This field may be used in the future to identify additional information about the detected message collision. These bits should be set to zero. Various reserved values in this sub-message may be defined in the future for testing or simulation use.

Type 2 is the same as Type 1 except for the two Location fields. The location fields are defined the same way as other location fields. In this sub-message type, this is a "directed message" to the vehicle at the location in the sub-message. Note, as always, the location is effective at the end of the basic time interval in which it is transmitted. This message notifies this ONE vehicle to change time slots.

It is slightly more effective for a single vehicle to change time slots rather than two vehicles changing time slots simultaneously. If two vehicles each self-select a new time slot in the same basic time interval, they may select the same time slot and still have message collision. Such a message collision is less likely if only a single vehicle changes time slots.

It is likely that the vehicle that detected the message collision and sent the notification sub-message has been receiving ongoing messages from one of the two vehicles participating in the message collision. Most likely that vehicle has been using the same time slot for its communications prior to the message that collided and the message that collided (although this is not necessarily the case). Therefore, there is a good likelihood that the vehicle that detected and transmitted the message collision notification knows the location of one of the two vehicles participating in the message collision. If this is the case, that vehicle should use a Type 2 notification instead of a Type 1. It should use the Type 2 message only once for any message collision. If the message is not effective in eliminating the message collision in that time slot the sender must revert to a Type 1 sub-message. Note that if the vehicle detecting the message collision has been receiving regular messages from one of the two vehicle participating in the message collision, it is likely that the signal from that vehicle is stronger and thus it is more likely that this first, Type 2, notification will get through successfully, than for the other vehicle participating in the message collision.

A vehicle receiving a Type 2 message collision notification must first check if it is the intended vehicle—the target of the directed message. If it is NOT the target vehicle but IS transmitting in the identified time slot it may optionally choose to select a new time slot, or not. The preferred embodiment is to wait one basic time interval, then select a new time slot, as this minimizes the chances of a new message collision occurring.

Next a vehicle receiving a Type 2 message collision notification must check that its last transmission was in the time slot identified in the sub-message. It is possible that it has already selected a new time slot. If both the location matches and the time slot matches, it must immediately select a new time slot.

A common situation is when two vehicles approach each other from a distance. Each vehicle has chosen the same time slot as the other vehicle. At some distance, a third vehicle, located between the first two vehicles, detects the message collision in this time slot. This third vehicle most likely can identify one of the two vehicles, because they have both been transmitting in the same time slot repeatedly, and prior frames were likely received without error. The third vehicle is able and is required (in preferred embodiments) to send such a message collision notification sub-message, if it receives two or more consecutive message collisions in the same time slot.

There are three possible outcomes following the transmission of such a message collision notification sub-message: (a), neither message colliding transmitter receives the notification; or (b) only one message colliding transmitter receives the notification (due to range or a Type 2 sub-message); or (c) both message colliding transmitters receive the message of Type 1. In the first (a) case, message collisions are likely to continue, although not necessary, as the two vehicles could be in cross traffic or now moving away from each other. This case is usually detected quickly by the same vehicle that sent the notification because any transmitter receiving such a valid notification for it must immediately choose a new time slot. If the message collision is detected again in the next basic time interval, a second message collision notification sub-message, which now must be Type 1, must be sent. Case (a) is relatively uncommon, because the third vehicle must have been close enough to both the transmitting vehicles to detect the collision, so at least one transmitter should be in range to receive the notification sub-message. However, with message collision notifications now being sent in every basic time interval from at least one source, the message collisions will quickly resolve. In case (b), the one transmitter that received the notification will choose a new time slot and the transmitter that did not receive the notification will continue to use its existing time slot. In case (c), both transmitters will choose a new time slot. Note that in all three cases, message collisions stop quickly.

Note that more than one vehicle may send a message collision notification sub-message in any one basic time interval. However, a V2V transceiver, if it hears another message collision notification in the current basic time interval, may choose to not send a duplicate notification. This decision is optional. In most cases, only a single message collision notification sub-message will need to be sent. Thus, very little bandwidth is used by this method of rapidly detecting and correcting message collisions.

Transmitting vehicles should attempt to determine themselves if there is a message collision in the time slot they are using. Such determination may be technically difficult, however. That is why other vehicles, which can easily detect such interference, are an important part of this embodiment protocol.

Choosing a New Time Slot

In one embodiment the target likelihood of any new time slot being free from interference is 99%. Transmitters may use a variety of algorithms to achieve this target. Note that if two consecutive attempts need to be made using these odds, then there is a 99.99% of success (no message collision after two attempts). For three consecutive attempts the failure rate is only one out of 100,000. In practice the odds are even better. First, high priority frames are retried in the same basic time interval, rather than waiting for the next time interval. Second, the algorithm may adjust to use less "weight" and therefore more time slots become statistically available.

Although some people might object to a safety system with a failure rate of "one in 100,000," this low rate of first-time time slot acquisition failure is completely legible compared to other reasons that a V2V system will be unable to prevent a collision. For example, not all vehicles are equipped. As a second example, not all drivers or vehicles will take evasive action, even if warned. As a third example, somewhere between 20% and 50% of accidents are not avoidable even with a conceptually perfect V2V system. As a fourth example, a sub-second delay in acquiring a new time slot will often still allow sufficient time for communication and avoidance.

Note, also, that the target percentage success rate of first time slot acquisition is easily raised to 99.9%, or higher.

Note also, that by using regular clocking, instead of half clocking, 1600 to 2000 time slots become available. This is a very large number of vehicles "in range" to need to be communicating. After all, the only vehicle one really needs to communicate with is one that is close enough to possibly collide with one. If there are more than 100 (or some other predetermined limit) vehicles in range, the transmit power should be reduced (claim).

The advantage of using a relatively low first-time new time slot acquisition percentage of 99% is that it significantly clumps regular frames down near frame one. This leaves a large fraction of the basic time interval (0.1 sec) for low-priority, "convenience" messages, which use Area B, which might include audio or video information.

In one embodiment, all such convenience, low priority messages are held off for the next time slot following any time slot in which there is a collision in an interval class A or interval class C frame. Time slot collisions in interval class A and C combined should be one per minute, maximum.

Note that message collisions between convenience, low priority don't count in the previous paragraph back-off. Message collisions for interval class B are handled using existing CSMA/CA algorithms. The main difference is that the size of interval class B changes dynamically.

Interval class B is defined simply as the space between the end of interval class A and the start of interval class C, computed as the worst case over the past five basic time intervals, plus a buffer zone (say, 25 time slots) extra at each end. Any of these metrics are predefined constants, which may be different, or adjust dynamically.

Typically, the number of simultaneous interval class C transmitters will be the number of emergency vehicles within range. This means that there will not be very many interval class C messages sent each basic time interval. Management of the expansion of interval class C and the adjustment of the weighting for new time slot acquisition in interval class C is the same as interval class A, except interval class C takes precedent. Thus, even in a case with hundreds of emergency vehicles within range, the system of this invention still works. It just means that interval class A broadcasts are reduce to make room for the emergency vehicle broadcasts. This is a giant improvement on current proposed V2V systems (claim).

One embodiment uses the following algorithm to determine which new times lot to use.

Step One. Determine frame type for message as interval class A, B, or C.

Step Two. Determine risk factor of the message.

Step Three. Identify all available time slots for interval class A messages. (Algorithm for interval class C is similar.) Number these consecutively starting at 1. Note that these "available" time slot numbers are NOT the same as the actual time slot numbers. The available time slot number we identify as n. An example is shown in the table below.

TABLE 3

Time slot Allocation Example
Example Time Slot Allocation

| Actual Time slot No | In Use? | Available Number = n |
|---|---|---|
| 1 | yes | — |
| 2 | yes | — |
| 3 | no | 1 |
| 4 | no | 2 |
| 5 | yes | — |
| 6 | no | 3 |
| 7 | no | 4 |

Step Four. A constant k is determined based on bandwidth available and message risk factor. More discussion on k is below.

Step Five. A "time slot selection weight," or w, is calculated from the following formula: $w=[\exp(-n/k)]/(k-1)$, for each n. This w represents approximately the chance that this available time slot n will be used. A sample result of the first 20 n, for k=11 is shown in the table below. Note that the sum of these weights for the first 20 n is about 0.88.

TABLE 4

Time Slot Weighting Example
Calculation of Weight = w
k = 6.0

| Available Number = n | Weight = w | Aggregate Weight |
|---|---|---|
| 1 | 0.141080 | 0.141080 |
| 2 | 0.119422 | 0.260502 |
| 3 | 0.101088 | 0.361591 |
| 4 | 0.085570 | 0.447160 |
| 5 | 0.072433 | 0.519593 |
| 6 | 0.061313 | 0.580906 |
| 7 | 0.051901 | 0.632807 |
| 8 | 0.043933 | 0.676740 |
| 9 | 0.037188 | 0.713928 |
| 10 | 0.031479 | 0.745407 |
| 11 | 0.026647 | 0.772054 |
| 12 | 0.022556 | 0.794610 |
| 13 | 0.019093 | 0.813703 |
| 14 | 0.016162 | 0.829865 |
| 15 | 0.013681 | 0.843546 |
| 16 | 0.011581 | 0.855126 |
| 17 | 0.009803 | 0.864929 |

TABLE 4-continued

Time Slot Weighting Example
Calculation of Weight = w
k = 6.0

| Available Number = n | Weight = w | Aggregate Weight |
|---|---|---|
| 18 | 0.008298 | 0.873227 |
| 19 | 0.007024 | 0.880251 |
| 20 | 0.005946 | 0.886197 |

Step Six. Select or create a random or pseudo-random number between 0 and 1.

Step Seven. Scan the table created in Step 5 (or, more efficiently, do this step while computing step five) until the aggregate weight of each n from 1 to the currently examined n is equal to or greater than the random number selected in step six. Use this n.

Step Eight. Look up the selected n from step seven in the table (or equivalent processing) to find the corresponding actual time slot.

For example, using the above tables, suppose our random number is 0.351 . . . . Traversing the table above, we find than n=3, because the aggregate weight at n=3 is greater than 0.351. From the prior table, we see that the actual time slot corresponding to n=3 is time slot 6. Time slot 6 is our new time slot.

K should be adjusted to meet the target first time new time slot acquisition success rate, such as 99%.

Note that for the sample formula, the aggregate weight exceeds 1.0 at n=34. Thus, the selected n will always be in the range of 1 to 34, for k=11.

Note that the formula given is only one possible embodiment. Other formulas and algorithms may be use that meet the requirement of "weighted" slot number selection. For example, a linear weighted, rather than exponential weighted, could be used. Also, a flat weighted formula could be used, where the number of time slots considered is a function of available time slots.

An appropriate "linear weighted" formula is n*ABS (RAND( )+RAND( )−1), where n is the maximum number of available time slots and the functions have the usual Microsoft Excel definitions. The result of this formula is rounded to an integer and the corresponding available time slot is the one selected.

K may be increased for high-risk packets. K may be increased each time there is a failure. That is, when a selected new time slot has interference. At k=100, using this formula, a probability of 50% is about n=70. A probability of 100 is reached at about n=530. Using this formula, with 800 time slots, k should not exceed 141.

One method of assigning k is that k=the number of used time slots, with a minimum k of 10, and a maximum of 141. However, adjusting k to meet a target first time new time slot acquisition success rate, as previously discussed, is preferred.

When utilization exceeds a set threshold, this weighting should be discontinued and random selection, evenly weighted, over all unused time slots should be used. Such a threshold may be 30%.

Time slots numbers over a certain threshold, such as 400, (out of 800) should be abandoned and a new one selected after five seconds. Thus, if there is a sudden burst of activity, or some vehicle selected a high time slot number, these will tend to move back down toward the end of the Area. This maintains as a large as possible the Area B.

Windows that exceed one basic time interval, such as 0.5 seconds or five seconds, should be selected by each transmitter on random or arbitrary boundaries, to avoid clumping or motorboating issues.

It is worth doing a worst-case analysis. Peak freeway capacity is about 30 vehicles per minute per lane. With two lanes of approaching traffic, plus the speed of the transmitting vehicle, up to about 120 vehicles per minute could be entering the transmitting vehicle's range. If time slots are 25% utilized, then roughly one out of four vehicles entering the range will need a new time slot, or 30 vehicles per minute, or one every two seconds. With a basic time interval of 0.1 seconds, this means a new time slot is needed within range every 20 basic time intervals. If 50 time slots represents the equally-weighted change of selecting a particular new time slot, then the odds of two vehicles selecting the same new time slot is approximately one in 20*50 or one in 1000, for a first-try success rate of 99.9% In practice, the percent success rate will be higher because the new time slots requirements arrive at a relatively consistent rate; they are not random. Also, at 25% time slot utilization (within interval class A), well over than 50 time slots are available.

Periodically, transmitters re-evaluation their time slot selection. This re-evaluation interval may be every 30 seconds. If, at the end of this re-evaluation interval, the transmitter were to make a new time slot selection, and the odds that the new time slot would be less than the current time slot (for interval class C: higher than the current time slot) are 80% (or a different percentage threshold) or higher, then the transmitter does select a new time slot. In this way, time slots are slowly, but continually, moved back to the ends of the basic time interval, keeping interval class B as large as possible. Simulations may be used to select optimal re-evaluation interval and the percentage threshold, as well as parameters for the weighted time slot selection.

When a time slot is chosen by a first vehicle for interval class A, and that slot has been used in the prior basic time interval for a class B method, the first vehicle should find the next largest time slot after the first chosen time slot in what is currently interval class B that is open—that is, has no transmission in the prior basic time interval. This extends the duration of interval class A and forces the vehicle that sent the interval class B message to choose a new time to broadcast any subsequent interval class B messages. This method avoids having a long message chain in interval class B "block" the duration growth of either interval classes A or C. The process described above operates similarly for the boundary between interval classes B and C.

It is appropriate to leave a buffer zone of generally unused time slots between the highest used time slot in interval class and the start of interval class B. A similar buffer applies below interval class C and interval class B. An appropriate buffer size is 25 time slots. These slots may be used for emergencies, high priority messages, and for use when a V2V transceiver has two consecutive failed attempts at allocating itself a non-message-colliding new time slot. The buffer time slots are not available for use for interval class B messages.

In the event that a "message collision storm" is detected, the appropriate interval class (A or C) should be rapidly expanded. This may be done, for example, by broadcasting core data messages in a number of time slots in the prior interval class B zone. V2V transponders will detect those transmissions, quickly adjusting to the reduced (or eliminated) interval class B.

Interval Class B Message Timing

Messages sent in interval class B are generally lower priority than messages sent in class A or class C. However, any message that may be sent in class A or class C may also be sent in interval class B. This latter case might happen, for example, when more high priority messages need to be sent than fit in the sender's class A or class C time slot; or the sender's current class A or class C time slot is in a state of message collision.

Interval class B is not managed generally using time slots. Unlike interval classes A and C, messages in class B may be longer than one time slot—sometimes, much longer. Interval class B is managed similarly to traditional IEEE 802.11 (message) collision-domain management: that is: CSMA/CA per 802.11, with modification as discussed herein.

The first restriction on message timing in interval class B is that first the window for interval class be must be determined every basic time interval. Interval class B is the time left over between interval classes A and C, plus the two buffer zones. In the most strict embodiment, interval class B begins in the time slot after the last used time slot for interval class A, plus the size of the buffer zone and ends at the time slot before the first used time slot for interval class C, minus the buffer zone. However, another embodiment permits a small amount of overlap. In this preferred embodiment, the start of interval class A is at the time slot, below which lie 90% of the currently used interval class A time slots.

The second restriction on message timing in interval class B is that the sent message may not overlap with ANY currently used time slot in interval classes A or C.

The third restriction on message timing in interval class B is that the sent message may not overlap with the period of time used for an interval class B message sent in the prior basic time interval unless the "final" bit was set on that message. This restriction allows a long message chain, which must be sent as a series of interval class B messages, to generally use the same time window within the basic time interval for each message in the chain. Note we do not refer to this timing as a "time slot" because it may not be aligned with a time slot, and it may take up more than one time slot.

The fourth restriction on message timing in interval class B is that the typical lower priority messages in this class, such as courtesy messages, audio, and video, may be restricted to throttling back due to bandwidth management.

The fifth restriction on message timing in interval class B is that, when possible, a message chain in interval class B should attempt to use the same timing for each message within the basic time interval, subject to all the other restrictions.

A sixth restriction on message timing in interval class B is that, if the message is the start of a chain of messages, such as might happen with a long audio or video message, that the initial time broadcast time be selected so that the start of the message is some distance after the last time slot used in interval class a and the end of the message will be some distance from the first time slot used in interval class C. This allows extra space for the expansion of the duration of interval classes A and C during subsequent basic time intervals.

Receivers may, optionally, correct for Doppler shift caused by relative vehicle motion during the sync or training portion of the message preamble. Receivers may, optionally, attempt to correct for such Doppler shift by expecting a message in a time slot from a vehicle known to be moving at an approximate relative speed. Thus, its "starting Doppler shift correction," at the very start of the preamble, may be based on its expectation of the likelihood that the transmitting vehicle in that time slot is the same transmitting vehicle that used the same time slot in one or more previous basic time intervals.

FIG. 2 shows one embodiment of a physical layer frame, using a 100 µs basic time interval, 3 mbit/sec OFDM encoding with 24-bit symbols and a 4 μs guard time. IEEE 802.11 defines this encoding the preamble, SIGNAL field, SERVICE field, FCS field, and Tail field. The 4 μs guard time may or may not be IEEE 801.11p compliant. The V2V message, as shown in FIG. 2, is not an IP packet. The SERVICE and Tail fields are used to maintain compatibility with existing radio designs and convolution encoders and decoders. The SIGNAL field defines the data rate and encoding, as defined by IEEE 802.11p. The FCS is defined as in IEEE 802.11p, although the packet is not an IP packet. Bit scrambling and encoding is defined by IEEE 802.11p. Other embodiments are possible.

Note that the 4 μs guard time provides a working distance of approximately up to 1.2 km. As the nominal target range of an embodiment is 250 meters, this working distance provides a reasonable margin. It may be desirable to provide traffic signals with a range greater than 250 meters so they may communicate with each other. The 4 μs guard time allows them to use time slots for communication up to a distance of 1.2 km. In general, traffic signals communicating in either direction with vehicles do not require more than a 250 meter range. Traffic signals communicating with other traffic signals are likely exchanging signal timing information that is often more appropriate to place into interval class B messages. These messages use a longer guard time, and thus a range over 1.2 km is supported. Note that generally the maximum range of a traffic signal needs to be no longer than one traffic signal cycle length times the average speed of approaching traffic. For example, with a 80 second cycle time and a average speed of 30 mph, this distance is 1.07 km. Generally, both safety needs and optimal traffic light cycle simulation is effective using a shorter range.

FIG. 3 shows one embodiment of a frame using a 6 mbit/sec encoding rate, but otherwise the same as in FIG. 2, above. The V2V message length is now 282 bits maximum.

Higher density encoding permits longer V2V messages.

V2V transmitters have several options available for sending messages longer than a Type 0 message. One option is to use a higher density encoding, and transmit in the transmitters established time slot. A second option is to send the message in the interval class B. A third option, particularly for high priority messages and proxy messages, is to use an additional time slot. A fourth option is to use multiple sequential basic time intervals. Options may be combined.

In general V2V transmitters will have the ability to compute with high assurance the likelihood that a particular V2V receiver will be able to reliable receive a message. Power levels are largely known and generally consistent within a range. The signal-to-noise level of all received messages may be measured. The location of each transmitter is generally known. Generally, mobile V2V receivers within a range should have comparable radio performance, as that consistency is a key goal of embodiments. As those trained in the art appreciate, this information, in aggregate, may be used to make an accurate estimate of the signal-to-noise margin for any intended message recipient (location) for any given radio encoding.

Note that fixed V2V transceivers, such as traffic signals or location calibrators, may have significantly different radio performance than vehicles. For example, their power level may be higher; their physical antenna height may be higher; their antenna may have better line of sight; their antennas may be directional; their chance of message collisions may be less; and other optimizations maybe available to this equipment.

Vehicle Identification

The preferred embodiment for vehicle identification (vehicle ID) is the vehicle's location.

There are many ways to identify a vehicle. We do not list all possible methods here, but identify four classes of identity methodology, below. The first method is a physical serial number, which might be a serial number of the V2V transceiver, the VIN number of the vehicle, or the license plate number of the vehicle, or another unique assigned number. The second method is a communication address, such as a device MAC address, or an internet IPv6 address. There are both static and dynamic ways to assign such numbers. Other possible communication addresses include a cell phone number or a SIM module number. A third method is a random number. A V2V transmitter selects a random number. This number may be fixed or updated from time to time. If a 128-bit number is selected (or even a 64-bit number) the odds of two vehicles choosing the same number is negligibly small, and the harm done by such a duplication is also negligibly small. A fourth method is to use the location of the vehicle for its identification. Two vehicles cannot be in the same place at the same time. (In the case of two vehicles in a collision that creates this situation, both vehicles will be transmitting nearly identical information in two distinct time slots, so there is in fact an advantage, not a problem, in such a rare situation.) Vehicle location, as core information should be in every message already. There is no reason to add unnecessary bits and unnecessary complexity and use up bandwidth unnecessary by adding additional, unnecessary vehicle ID. When an equipped vehicle is proxying for a non-equipped vehicle, it is "pretending" to be that vehicle, and thus using that vehicle's location for that vehicles ID is appropriate. Also, all proxy messages are identified as proxy messages, so there is no argument that such proxying constitutes spoofing.

Thus, the strongly preferred method of vehicle identification is the use of vehicle location.

Note that this identification changes, typically, with each message for a moving vehicle. There is little reason to associate one message with another message, as this system is designed around the doctrine that most messages are standalone units of information. However, since the basic information in the message also includes velocity, it is a simple calculation to associate a stream of messages with the same vehicle. Also, time slots used by vehicles to not change frequently, so the messages in the same time slot in contiguous basic time intervals have a good likelihood of being from the same vehicle.

Using vehicle location for vehicle ID allows "directed messages" to be sent. That is, a V2V message may be sent to a specific recipient, the "target vehicle," by using that vehicle's location (as computed where it will be at the end of the same basic time interval as the directed message). If the V2V transmitter is unable to determine the target vehicle's location, then it is inappropriate to use a vehicle location for this directed message. Directed messages may also be directed to a vehicle type.

There is a substantial social advantage of using location for vehicle ID. Privacy is a major social issue. As every vehicle is already visible, at a particular location, using this information for vehicle ID provide neither less nor more private information than is already available.

Message validity is a major issue with any V2V system. The situation today is that vehicles are neither hidden nor anonymous. They are large, visible, physical objects with a license plate for reliable ownership identification, should that information be needed. Beyond that, drivers are largely anonymous entities on the road. Using vehicle location for vehicle ID provides exactly the same level of identification, anonymity, and credibility as what exists acceptably today.

Both vehicle based cameras and fixed cameras can easily compare vehicle physical and visual identification with transmitted location as a way to severely limit any hacking, spoofing, or other misuse of the V2V system. Limited transmission range limits remote hacking attacks.

Location and Velocity Coding

Transmitting location is a fundamental part of any V2V system. We have previously discussed that the preferred location of a vehicle is the center of the front (back, if backing up) of a vehicle. For a fixed object (or a vehicle that might act as a fixed object in a collision, such as a vehicle protracting at an angle into a traffic lane), the most likely collision point is the preferred location. For parking spaces, the center of the marked parking space is the preferred location. For intersections, the center of the intersection is the preferred location. For messages that need two locations, a preferred method is to send two consecutive sub-messages in the same time slot, with a beginning location and an end location, or use a sub-message that comprises two locations. The method of using a sequence of locations maybe extended to transmit the corner points on any polygon shaped area. An alternative method is to send longer messages, or messages with more data encoded at a higher data rate.

Location may be encoded as an absolute geophysical location on the surface of the earth, such as used by the GPS system. The preferred geodetic system is the World Geodetic System 1984 (WGS84).

Power Management 14 different levels of transmit power are supported. Messages and algorithms are defined to manage transmit power in order to maintain sufficient bandwidth as vehicle density changes and to maintain consistency of range within a group.

IEEE 802.11. changes modulation in order achieve a desired quality of service, which another way of saying that a high rate of corrupted received frames causes a change to a lower modulation rate. This mechanism assumes point-to-point communication with acknowledgments from the remote end to determine proper frame receipt or not. This mechanism is not appropriate for a V2V system for several reasons. First, effective communication in V2V is not point-to-point. Second, our preferred embodiments do not use acknowledgments. Third, this system fundamentally assumes failure (corrupted frames) in order to work at all. Such "required failure" mechanisms are incompatible the intent of a safety system. Fourth, in a V2V system most transceivers are moving, thus any one measurement of receive signal-level, SNR, margin, QoS, or other wireless PHY-level metric is highly likely to quickly change.

Our preferred embodiment uses a significantly different mechanism to assure a very high quality of service (QoS). In our preferred embodiment, power levels should be low enough that only vehicles in an appropriate wireless range receive each other's messages. A large number of such overlapping ranges make up a metro-area operating V2V environment. The preferred "range distance" which might be measured as the longest distance between to vehicles within range, or might be measured as the average distance between all vehicles in an operating range, or might be measured as the root-mean-square of all vehicles in an operating range, or another means of measuring a "range distance" may be used. This optimal range distance is likely to be the topic of much analysis and discussion, as systems are deployed and operating experience is gained. Most likely, the selected optimal range distance will both change over time and also be a function of environmental factors, such as rural versus urban. We use a 250 meter radius from a V2V transceiver as a discussion optimal range distance herein, with the understanding that the actual range distance in use may differ significantly from this distance.

Note that such ranges for emergency vehicles and stationary transceivers such as traffic signals and calibration beacons should generally vary significantly from these range distances. Note also that for emergency vehicles and stationary transceivers their transmit power may differ from their "requested transmit power."

In addition to "range distance," we also define a metric, "range count." Range count is the number of active V2V transceivers within range. This optimal range count is likely to be the topic of much analysis and discussion, as systems are deployed and operating experience is gained. Most likely, the selected optimal range count will both change over time and also be a function of environmental factors, such as freeway versus city streets versus mountain roads versus parking lots. We use 150 vehicles as a discussion maximum optimal range count herein, with the understanding that the actual preferred, optimal, or maximum range count in use may differ significantly from this count. Note that optimum range count may be a function of average nearby peak vehicle speed on an undivided road or intersection. We prefer to use, as a discussion range, the LOWER of 250 meters or 150 vehicles.

Our preferred embodiment changes transmit power level for several reasons. A first reason is to maintain a preferred range distance. A second reason is to maintain a preferred maximum range count. A third reason is limit message corruption from the overlap of messages in adjacent time slots to distance-caused delays.

Note that our embodiments still support multiple modulations implementing different data rates. A higher than minimum data rate may be used for several reasons, such as to encode more information within a single time slot, or to send relatively lengthy information in an interval class B message. If such messages are safety related, they may be sent at a higher power level than other messages. If such messages are not safety related, they should be sent at the same power level as other transmitted messages.

In our preferred embodiments, it is important that the various mechanisms described are used to maintain a very high QoS, meaning that a very small fraction of safety-related messages will be lost for vehicles close to each other, and thus at highest risk of a collision. Thus, the available bandwidth of the channel must be such that nearly all message get through to other vehicles in range. A key method to achieve this is to reduce the range as necessary to maintain a suitable amount of available bandwidth. (Another key method is to reduce or eliminate non-safety-related messages that are consuming bandwidth desired for safety-related messages.) Thus, dynamic changes to transmit power, continually adjusting power to achieve a desire range, is a key aspect of preferred embodiments.

We define 14 power levels, although other embodiment may define more or less levels.

We define three primary reasons to reduce transmit power level: (a) too many vehicles are in the current range; (b) there is not enough available bandwidth in the current range; and (c) there is message interference between adjacent time slots due to distance-caused delay exceeding the inter frame gap (4 μs, typically). We define a Signal Level sub-message type to communicate this information, as shown in the Table 5 below:

As in all sub-messages, the sub-message begins with a 6-bit field stating this type of sub-message, with the value equal to six. The transmit power level field is 4-bits, containing one of 14 values from binary 0001 (lowest power) through to binary 1110 (highest power). The bit value of 0000 means "not specified." The value of binary 1111 is reserved. This same bit encoding is used for the field, "recommended power level."

Appropriate stationary V2V transponders, and emergency vehicles set the first two flags in the flag field to one, respectively. Two flag bits are reserved.

TABLE 5

Signal Power Sub-message Fields
Signal Power Sub-message

| Field Name | Size in bits | Format |
|---|---|---|
| Sub-message type | 6 | value = 6 |
| Flags (Stationary, Emergency, reserved [2]) | 4 | flags |
| Transmit power level | 4 | power level |
| Transmit power reason | 3 | see below |
| Recommended power level | 4 | power level |
| Recommended power reason | 3 | see below |
| Total Bits in Sub-message | 24 | |

The 3-bit fields, "Transmit power reason," and Recommended power reason are coded per Table 6 below:

TABLE 6

Signal Power Reason Encoding
Power Level Reason

| Reason | Bit Encoding |
|---|---|
| Default power level | 000 |
| Too many vehicles (reduce power) | 001 |
| Not enough bandwidth (reduce power) | 010 |
| Too much distance (reduce power) | 011 |
| No change | 100 |
| Not enough vehicles (increase power) | 101 |
| Available bandwidth (increase power) | 110 |
| Not enough distance (increase power) | 111 |

If power level is being reduced, one of the reasons: 001, 010, or 011 is given in the sub-message. If power level is at the default, this field is coded as 000.

For the concept of setting power level for all vehicles in a range to function ideally, all transceivers in range should use the same power level, so, generally speaking, any two transceivers in range are either able to communicate bi-directionally, or they are not, because they are out of range. Note that there is a potentially undesirable situation, where one group of vehicles is operating a low power, and a second group is operating at high power. Generally, the low-power vehicles will hear the high-power vehicle transmission, but not vice-versa. The range around the low-power transceivers is busy (that is why their power is low), and the transmissions from the high-power group then adds to the busyness. However, the range around the high-power transceivers is not busy, and they do not hear the low-power transmissions. In addition, transceivers in the high-power group may take time slots already in use within the low-power group.

Thus, it is important that all the transceivers in a range or should-be range operate at close to the same power. This is achieved in part by the use of the power-level sub-message. This sub-message contains two fields, the transmit power level and transmit power reason that relate to the transmit power. It also contains two fields, the recommended power level and recommended power reason that indicate what that particular transceiver would like other devices in its range to do. One reason it is desirable to have distinct transmit and "recommended" fields is that that a transceiver in the low-power group may need to transmit at a high-power to be heard by the high-power group. Thus, temporarily, it is transmitting at a high power level to be heard, but wants everyone to transmit at a low power level.

The transmit power level field should always indicate the actual power level being used for the message frame that contains this sub-message.

A novel embodiment comprises having all V2V transceivers average the power level of all other transceivers and adjust its own power level to that average. Convergence is slow so as to avoid oscillations and other instabilities. Ideally, this averaging and convergence would be based on actual transmit power, but as we have seen above, in some cases it is necessary to "shout" to be heard, even if your message is to "be quieter." Thus, the power level that should be averaged is the "recommended" power level. In most cases the transmit power level and recommended power level should be the same, or one level apart. The preferred embodiment is that power levels are increased at the maximum rate of one step per basic time interval. Thus, typically, ramping up from minimum power to maximum power takes 1.3 seconds, if the basic time interval is 0.1 s. Ramping power down should be quicker, at the rate of two steps per basic time interval. If lower power is needed to maintain QoS, it is important that this be achieved quickly. However, vehicles in a high-power approaching group should be able to inform each other of this impending "ramp down," and they may need more than the minimum power level to achieve this. Thus, this moderate ramp-down rate meets both needs.

In general, having all V2V transponders within range listen to power levels every basic time interval and perform an averaging calculation and then adjustment of their own transmit power level provides for rapid, ongoing convergence of an appropriate power level, even as the number of vehicles in a range changes continually, and vehicles are in multiple ranges. Consider a situation where, on a long road, at one end, a large number of vehicles are clumped together, perhaps waiting for traffic light with heavy cross traffic. At the other end of this long road, vehicles are spread out. There is a gradual shift in vehicle density from the high-density end of the road to the low-density end. Each vehicle is in a unique range, with some vehicles in that range closer to the low-density end and some vehicles in that range closer to the high-density end. At the high-density end, transmit power will be low, as vehicles are closely spaced and there are many. At the low-density end, transmit power will be high, as the vehicles are moving fast, there are few, and thus the vehicles desire information on relatively distant (and fast moving) other vehicle in range. Note that this novel embodiment provides for a gradient of transmit power from the low-density end of the road to the high-density end of the road. A vehicle in the middle notes that some vehicles in its range are using lower power, while other vehicles (going in the opposite direction) are using higher power. It averages these, placing its own power in the middle. The transceivers continually adjust their power as they move from one end of the road to the other. Thus, the power gradient may stay relatively constant even though vehicles are moving through the gradient in both directions.

Transceivers do not need to send a Signal Power sub-message every basic time interval. If the vehicles in range are largely agreed, already on an appropriate power level, there is no reason to transmit a message that says, in effect "I am still using the same power and so should you." This sub-message should be sent (a) at a low rate, such as once every two seconds; and (b) when power levels of transponders should be adjusted; and (c) when a transponder changes its own power level. Note that the recommended power level may change faster than the transmit power level.

Transceivers may implement "hysteresis," to avoid changing power levels too frequently. For example, they may require that the their "target" power level, as computed by the average of all received recommended power levels, be at least one full power level higher or lower than their current power level before changing their current transmit power level. Thus, they may be recommending a power level one level different than their own transmit power level for a while.

Fixed roadside transmitters operated by government entities do not have to implement dynamic power level changing, although some type of dynamic adjustment is recommended for most roadside transmitters. Also, they are permitted to consistently transmit at a higher power level than their recommended power level. In this mode they operate somewhat as "master power level police."

The 3-bit reason fields are interpreted as follows. For the transmit power reason, this is the primary reason that the power level of the transmitter has been changed. If the power level of the transmitter has not changed, then code 100 is used. If the power level of the transmitter is at the default power, then code 000 is used. For the recommended power reason, the field should be interpreted as the primary reason that the transmitter is requesting a change. If no change is being requested, code 100 should be used. If the transmitter wants the receivers to restore to the default power level, code 000 should be used. If a transmitter does not which to provide its own power, or does not which to make a recommendation, it uses 0000 as the power level, respectably, which means, "not specified." In this case the code 000 should be used for the reason.

Note that when a group of low-power transceivers meets a group of high-power transceiver that, in general, there will be more low-power transceivers than high-power transceivers. Thus, there will be more messages containing "low power" in the power level fields than messages containing "high power" in the power level fields. Thus, typically, lower-power messages will tend to dominate in such averaging, when two disparate groups of vehicles merge towards forming a single range.

A transceiver is not obligated to send Signal Power sub-messages if it has higher priority sub-messages.

Signal Power sub-messages should be generally be sent once every five seconds. If vehicles in range are seriously out of power level convergence, the rate may be increased to twice per second.

As in all other messages that are sent at regular intervals exceeding one basic time interval, V2V transceivers should choose an algorithm that spreads out these types of messages over time. One method is to randomly adjust the time interval up and down. Another method is to observe current transmissions and select a time that is not busy. Note that random delays in making such a decision should be used, to avoid system-level oscillations.

We define 14 power levels, although other embodiment may define more or less levels.

Passive Reflectors

The use of passive reflectors is a well-known method of extending line-of-sight radio communication to non-line-of-sight paths.

On mountain roads, the V2V transmissions of some vehicles will frequently be blocked by part of the mountain from being received at a distance by another transponder.

The use of selective placement of passive reflectors on the side of the road way is an excellent way to overcome this problem.

Accident locations on most mountain roads do not occur at random locations. Rather, there are certain situations that are known to be high risk. For example, on blind curves, a driver on the inside of the curve moving too fast may move into the oncoming, outside lane, resulting in a head-on collision, or a vehicle being forced over the outside lane over a cliff. Another common unsafe situation is unsafe passing on a straight section of road that is not long enough for a driver to complete a pass.

Passive reflectors can help this situation by allowing vehicles which otherwise are unable to pickup V2V communications to now do so. Situations such as excessive speed or passing in progress (where prohibited) immediately warn of high risk.

Typically, such passive reflectors do not have to be large, because most likely the transponders are broadcasting at full power. Also, since the highest risk location on the roadway are known, the reflectors may be placed highly selectively just to support communication at those locations. Knowing the typical speed of vehicles (both the "safe" and the "unsafe" vehicle) allow the locations of moving vehicles on both sides of a likely collision location to be determined. The passive reflector may be positioned specifically to optimize the vehicle-to-vehicle communication of two vehicles at those two "critical" locations.

The passive reflector may be parabolic, rather than flat, to increase signal gain. Since the "critical locations" are known for most high-risk mountain road potential collisions locations, the relatively narrow effective angle of parabolic reflectors is not a problem. The gain of the reflector may be selected based on the size of the "critical locations." Another advantage of parabolic passive reflectors is that they may be small, and thus inexpensive and unobtrusive, and thus many of them may be economically deployed to cover a large number of high-risk curves, blind spots, and known problem areas on mountain roads.

Passive reflectors may also be used in parking lots and parking structures. For example, they may allow V2V transceivers to communicate between concrete floors of a parking structure. The passive reflectors may be placed outside the structure or at the ends of access ramps. Such intra-garage communication is valuable in counting vehicles, locating empty spaces, billing, and other services.

Time Slots

Network Bandwidth

For a V2V network to be effective, it must maintain sufficient usable bandwidth that the most important information gets through. Thus, for a preferred embodiment, the available bandwidth of the network should be measured by V2V transmitters and used to throttle back less important transmissions. Such throttling may comprise increasing the time between transmissions. Such throttling may comprise using a higher threshold of risk for transmitting packets. Such throttling may comprise reducing the number of retransmitted messages. Such throttling may comprise limiting transmissions to only safety related messages.

A suitable window for measuring available bandwidth is one second. A suitable threshold to start throttling is 33% bandwidth utilization. A suitable threshold for more severe throttling is 50% bandwidth utilization.

In one embodiment an audio message is included in one or more messages. If the data portion of one message is insufficient to hold the digitized voice message, additional messages are used in a "message chain." The individual messages in the chain may be number. However, preferred embodiment is to use the vehicle location as an identifier for the source of the message. The receiving vehicle(s) then use the location to identify that the messages in the chain come from the same source, even thought location data itself is changing each message. Messages in the chain may be lost, but they will always be received in order, because there is no routing. Thus, the only requirement is a single bit is to indicate if a message in a chain has more messages following, or if it is the "last message" in the chain. The bit is called the "final" bit and it is included in every message header. If the bit is set, this message (which may be the only message) is complete and receivers may process it as a logical unit. Once all audio messages in a chain are received, the receiving vehicle(s) presents the reconstructed audio stream to the occupants in one of two modes: (a) either playing the message immediately, or (b) notifying the driver that there is an audio message waiting, allowing an occupant to select for playback. This feature is useful for (a) safety warnings, (b) courtesy messages, and (c) social interaction. Note that the actual real time to send the audio message chain is often much less than the length of record or playback time for that audio clip. Note that messages in a chain of audio messages may pause during transmission, as a bandwidth preservation measure or for other reasons. Such a pause may delay complete transmission of an audio message chain, but it does not inherently abort the chain.

Courtesy messages are higher priority than social interaction messages.

Message Collision Notification

The broadcast system in the preferred embodiments of this invention do not obviously support acknowledgments (ACK) or negative acknowledgements (NAK) on a per-packet or per-frame basis as many existing IP protocols.

It is generally considered difficult for a transmitter to detect message collisions in its own broadcast time, although this is not impossible.

Therefore, preferred embodiments provide means to send message collision notifications. The most important of these is message collision notification. Note that it is important to distinguish between "vehicle collisions" which are physical collisions resulting in property damage and often personal injury from "message collisions," which is a common wireless term of the art meaning that two transmitters are attempting to send at the same or overlapping time. Which collision is meant in this document should be clear from context. In most cases, vehicles collisions are called, simply, "collisions," whereas message collisions are usually so identified.

There are two sources of message collision. One source is when two vehicles, not in range of each other, are each using the same time slot. Then, when the come into range, there will be message collisions in that time slot. The second source is when a time slot is empty, and two vehicles within range both decide for the same initial basic time interval to use the same, previously empty time slot.

Let is first consider the first case. A first vehicle may be using time slot seven and a second vehicle may be using time slot seven. They are not in range of each other, but as they approach they both come into range of a third vehicle. The third vehicle is able to detect the message collision in time slot seven, although vehicles close to the first vehicle and vehicles close to the second vehicle do not detect collisions in this time slot and are able to receive properly the messages from vehicles one and two in this time slot.

The third vehicle should send out a message collision notification. It does this with a message collision warning sub-message type 3 or 4. It normally sends this notification message in it own time slot. It is easy to identify the vehicles that need to receive this message because the identification is by time slot, not by vehicle ID.

When a vehicle receives a warning that the time slot it is using is in collision, it should immediately select a new time slot.

Note that in the above scenario, the third vehicle sends the message collision notification very shortly after both vehicles one and two come into its range. Most likely at least one of these two vehicles is at the most distant end of valid range. Therefore, when the message collision warning message is sent, it may be likely that only one of vehicle one or vehicle two is able to receive the warning. Thus, only one of vehicle one or vehicle two will pick a new time slot. This solves the problem, as the other vehicle then continues to use its existing time slot seven. On the other hand, perhaps both vehicle one and vehicle two receive the warning message and choose a new time slot. This also solves the problem. Thus, it is not critical which vehicle, or both vehicles, receive and respond to the message collision notification.

If neither vehicle one nor vehicle two is able to receive the message collision warning, then they will both continue to broadcast in time seven. The third vehicle will detect this and will again send out the notification. At this time, at least one of the vehicle one or vehicle two, or both, are closer to vehicle three and are more likely to receive the message. Also, it is likely that by now additional vehicles are in both the range of vehicle one and vehicle two and they also are sending message collisions notifications. Since these notifications normally occur at the outermost reaches of range, immediate receipt and response is not critical. A few notification messages to achieve the necessary result is tolerable and represents no significant loss of safety messages.

Receiving vehicles need to be able to distinguish between weak transmissions, that may therefore have errors and fail to validate with the FCS, and messages that are corrupted due to message collisions. Such discrimination is not normally a problem for a receiving radio. There are several known methods of discrimination. Weak signal strength is an indication of excessive distance, rather than message collision. Failure to sync, high receive signal strength, a very high error rate, invalid symbol timings, and frames that start early and end late are all indications of message collisions. Two antennas and two radios on a vehicle is a very good way to distinguish between weak transmissions and message collisions. Say the antennas are three meters apart. If there is only one transmission, they will receive almost exactly the same information in a frame, even it fails to pass a FCS validity test. On the other hand, if two frames are being received from opposite directions, the radio signal at the two antennas will be shifted by approximately nine nanoseconds. Typically, this means that the decoded data at the two antennas will be significantly different. Generally, a high error rate in conjunction with reasonable signal strength is an indication of a collision. Another indication is that as the signal strength in that particular time slot increase (as the distance to the transmitting vehicle decreases), and the error rate in the frame goes up instead of down, that is also an indication of a message collision. If the signal strength in a time slot is weak, but as the signal strength increases the error rate in the frame goes down, that is an indication of merely a distant transmitter, not a message collision.

A V2V transceiver must reach a "message collision threshold" number, such a two, message-colliding transmissions in the same time slot in contiguous basic time intervals before it sends a message collision notification. This means that a few isolated cases of apparent message collisions will not result in a message collision notification being sent.

V2V transceivers are encouraged to implement their own means of detecting message collisions in their transmitting time slot. For example, they may use a second antenna and radio. Another way to detect collision is to skip a basic time interval and see if anyone else is transmitting in that time slot. Another way to detect message collisions is to see if anybody else is transmitting in the same time slot after you stop transmitting. This is particularly effective when a short message is sent.

A useful hybrid of these means is to occasionally, such as once per second, send the shortest possible message, such as only core data, then listen after transmission stops. If the basic time interval within a one second window is picked randomly, there is a very high chance that a message collision will be detected early. Using this means, only a single radio and single antenna are needed.

Table 7 below shows the two sub-message formats for message collision warning sub-messages. If the location of at least one of the message colliding transmitters is known, the message type 4 which includes that location is preferred, as it is less likely that one V2V transponder selecting a new time slot will create a new message collision that if two V2V transponders both select a new time simultaneously. All of the fields in these two sub-message types are discussed elsewhere herein. Four bits are reserved in the last field.

Receive signal power level uses the same 14-level scale as transmit power. However, the units are different. This scale goes from binary 0001 to binary 1110 where each step represents an approximately equally spaced receive power level using a logarithmic (db) scale. The value of 0001 is set to the lowest typical usable receive power level and the value of 1110 is set to the highest typical expected receive power level. A value of zero in the sub-message means that the receive power level is not included in the sub-message. The power level field should be the average power received during the applicable time slot.

TABLE 7

Message Collision Warning Message Formats

| Field Name | Size in bits | Format |
|---|---|---|
| Message Collision Warning - Time slot Format | | |
| Sub-message type | 6 | value = 3 |
| Message collision time slot | 12 | time slot no |
| Number of detected collisions | 4 | integer |
| Receive signal power | 4 | power level |
| Reserved | 4 | |
| subtotal bits in sub-message | 30 | |
| Message Collision Warning - Location format | | |
| Sub-message type | 6 | value = 4 |
| Message collision time slot | 12 | time slot no |
| Target location: offset N-S | 24 | location |
| Target location: offset E-W | 24 | location |

TABLE 7-continued

Message Collision Warning Message Formats

| Field Name | Size in bits | Format |
|---|---|---|
| Message Collision Warning - Time slot Format | | |
| Sub-message type | 6 | value = 3 |
| Number of detected collisions | 4 | integer |
| Receive signal power | 4 | power level |
| Reserved | 4 | |
| subtotal bits in sub-message | 78 | |

Message Classes
Message Formats

A preferred embodiment uses most of IEEE 801.11p for the physical and a portion of the data-link layer definition. In particular a frame format for a 100 μs time slot is shown in FIGS. 2 and 3. All frames in these embodiments use the SIGNAL, SERVICE, TAIL and FCS fields substantially as defined in 802.11p. The SIGNAL field includes modulation and rate information that describes how the subsequent 802.11 DATA field is encoded. There are reserved, currently unused, bits in the SIGNAL field. The 802.11 DATA field is required to be an integer number of symbols. At our preferred most reliable data encoding and rate of 3 mbit/sec, using the preferred 100 μs time slot and a 4 μs guard at the end of each time slot, the 802.11 DATA field is 56 μs, or 7 symbols, or 168 bits. The OFDM convolution decoder requires a portion of the 16-bit SERVICE and the 6-bit TAIL fields to work optimally. We include a Frame Check Sequence, or FCS field of 32-bits, as described in 802.11 to provide a high level of validation of frame data. This leaves, at this data rate and time slot, 114 bits for the V2V message.

V2V messages, in our preferred embodiment, do not use internet protocol. That is they are free from MAC addresses and IP addresses. A primary function of MAC addresses is to provide a unique hardware identifier for source and destination of frames. Our preferred protocol does not require MAC addresses because the vehicle location is its unique transmit identifier, and all messages are broadcast, so no destination identifier is normally used. For directed messages, the message contains information, such as vehicle class, or location ID, as the directed target for that particular message. Our preferred embodiment does not use IP addresses because there is no routing. Forwarding is discussed elsewhere in this document. However, forwarding does not function similarly to routing.

Thus, our message formats are free of the IP frame header, and all the bits associated with IP headers. Compatibility with IP networks is achieved in at least four ways. First, the V2V spectrum in the US and many other countries is reserved for V2V functionality, thus within these reserved bands there should be no general use of wireless IP packets. Second, all V2V messages are easily encapsulated as the payload for IP packets, and thus may readily be moved over an IP network. Third, V2V messages in time interval B may easily incorporate IP packets within the V2V data area, should it be appropriate to ever move IP packets over this preferred V2V network. Fourth, unused bits in the SERVICE field may easily be used to distinguish, should this feature be desired, between our preferred V2V message protocol and IP packets sent in the same spectrum.

V2V messages, in our preferred embodiment, comprise two basic formats. The first format is referred to as a Type 0 message. It is the most basic message within this embodiment. It comprises all of the key fields to implement a fully functional V2V system, as described herein. A Type 0 message is 114 bits, fitting neatly in the preferred time slot and data rate. The second format provides for vast number of different sub-messages. In this format, each V2V message comprises one or more sub-messages, permitting a mix-and-match capability of varying message payloads, priorities, and lengths. When sub-messages are used, the V2V message header comprises two fields that describe the operating V2V protocol revision level and the message length. All sub-messages comprise a 6-bit sub-message type field that describes both the format and length of that sub-message. One or more sub-messages are consecutive within the message. Since sub-messages are all fixed length, as determined by the sub-message type, the message length field is used to determine if there are more sub-messages following the first and subsequent sub-messages.

FIG. 22 shows some key message and sub-message fields, which we now discuss. The V2V revision level is 4-bits. If set to zero, this indicates a Type 0 message. Any value other than zero indicates a message containing sub-messages, with the value indicating the particular V2V revision level of the V2V transmitter. Initially, this value is one.

The Flags field comprises four, 1-bit flags. These are: Emergency, Final, Forward, and Proxy, in positions B0 through B3 respectively. The Emergency Flag, if set to one, indicates the transmitter is an emergency vehicle; otherwise it is set to zero. The Final Flag, if set to one, indicates that this frame is the final frame in a chained series of frames; most V2V messages are in a single frame, and thus the Final Flag is normally set to one. If the Final Flag is set to zero, it means that the message is incomplete, and should be interpreted after future frames and been received and appended; this is used for chained messages. Chained messages permit the transmission of large messages that do not fit within one frame, such as audio and video. Vehicle ID is used to identify which frames should be chained to build a complete, chained message. The Forward Flag, if set to one, indicates that this message is being forwarded; that it, the current transmitter is not the original transmitter of the message. Originators of V2V messages set the Forward Flag to zero. The Proxy Flag, if set to one, indicates that this message is being sent by a proxy transmitter for a subject vehicle, where the message concerns the subject vehicle.

The Message Size field indicates the total length of the message in symbols. At the most reliable encoding, at 3 mbit/sec, symbols are 24-bits each. At other encodings, symbols are longer. Pad bits are used at the end of the last sub-message to make up an integer number of symbols. All sub-messages are at least 24-bits, and 24-bit null sub-messages may be used as padding, when 24 or more padding bits are needed. Coding the message length in symbols is more bit-efficient that using other units, such as bytes, or 32-bit words. The Message Size field is not used for Type 0 messages.

At 3 mbit/sec, using 100 μs time slots, the message length is fixed at 114 bits. Longer messages are sent by at least four methods. First, faster encoding rates may be used. For example, as shown in FIG. 3, at 6 mbit/sec, 282 bits are available. Data rates up to 27 Mbit/sec are supported by the Standard. Second, interval class B may be used to send much longer frames. Third, messages may be broken up in to smaller messages, with each component sent in a different basic time interval. Fourth, additional time slots may be used. These methods may be combined. The choice of method depends in part on the priority of the message(s) being sent, as well as other factors, such as available bandwidth and the likely ability of the intended recipients to decode reliably a faster data rate.

Message sizes of zero and 255 are invalid. If the carrier of the message does not use wireless, then the symbol size is assumed to be 24-bits for the purpose of this field.

Every sub-message begins with a six-bit Sub-message Type field. See below for a list of defined sub-message types. Each sub-message type indicates specific fixed-length fields in the sub-message, and thus the sub-message length is fixed for each sub-message type. A few generic sub-message types are defined permitting variable and future-defined contents. Such generic sub-message types may be used to encode, for example, IP packets, audio, and video information.

Final Risk is a 4-bit field that encodes an integer value of zero through 15. Final risk is explained elsewhere in this document. Defined values are shown in FIG. 14. Note that a value of zero means, "risk value not defined in this message." A value of two means, "zero or minimal risk currently identified." Note that this final risk value is a field in nearly every message; this is an important element of most embodiments.

The 6-bit Vehicle Type field identifies the type of the vehicle transmitting. See below for a table of defined vehicle types. If a proxy is sending for a subject vehicle, then this field defines the vehicle type of the subject vehicle. If a message is forwarded, the vehicle type field is the vehicle type of the original message. The vehicle type is important for several reasons. First, just common sense, it is important to know WHAT is moving—a car, truck, bicycle, pedestrian, or deer, for example. Or not moving, for example, a traffic signal, bridge abutment, detour diverter, location calibrator, or dead end. Second, the Vehicle Type field encodes the maximum size of the vehicle. Since the transmitted location of a vehicle is the front center of the vehicle, the maximum size is important in order to know the maximum bounds of the vehicle. The Vehicle Type MUST BE at least as large as the actual vehicle. Third, the Vehicle Type field encodes the maximum weight of the vehicle. The Vehicle Type MUST BE at least as heavy as the actual vehicle. The Vehicle Type field is an efficient way to encode 99% of the critical information about a vehicle with respect to V2V collision prevention. Other message types may be used to accurately describe a vehicle, such as its number of axles, exact dimensions, exact weight, or dangerous cargo. Vehicles such as bicycles, pedestrians, and animals should generally include a vehicle type encoding that most accurately describes the characteristics of that vehicle. For example, a runner pushing a stroller may chose to be coded a "bicycle," because that encoding more closely represents the behavior than "pedestrian." As another example, a motorcycle pulling a trailer may decide to encode as "small vehicle," rather than "motorcycle." An embodiment of the Vehicle Type coding is shown in a Table, below. Exact dimensions and weights of the vehicle types in the table may be determined from published tables or Standards, or may be based on statistical distribution. For example, "small size" may be the smallest 10% of motor vehicle on the road. "Large size" may be the largest 20% of private cars, pickups, SUVs and vans, on the road.

TABLE 8

Vehicle Type Coding

| Vehicle Type | Code value |
|---|---|
| no vehicle type in message | 0 |
| fixed road-side, collision n/a | 1 |
| fixed center of intersection | 2 |
| fixed center of intersection w/ signals | 3 |
| fixed location calibrator | 4 |

TABLE 8-continued

Vehicle Type Coding

| Vehicle Type | Code value |
|---|---|
| fixed road-side, collision possible | 5 |
| temporary road-side, normal | 6 |
| temporary road-side, abnormal | 7 |
| road-side, other | 8 |
| private car, pickup, or van, typ. size | 9 |
| private vehicle, small size | 10 |
| private car, pickup, or van, large | 11 |
| motorcycle | 12 |
| limousine - long or stretch | 13 |
| commercial pickup or van, large | 14 |
| medium size commercial truck | 15 |
| stopped medium size delivery vehicle | 16 |
| semi tractor only | 17 |
| semi, one trailer | 18 |
| semi, two trailers | 19 |
| semi, three trailers | 20 |
| semi, oversize width | 21 |
| short bus | 22 |
| full-size bus or RV | 23 |
| emergency vehicle, small or medium | 24 |
| emergency vehicle, large | 25 |
| farm vehicle | 26 |
| oversize vehicle | 27 |
| in roadway still equipment | 28 |
| in roadway still obstruction or barrier | 29 |
| in roadway debris | 30 |
| accident | 31 |
| bicyclist | 32 |
| bicyclist, double or trailer | 33 |
| pedestrian, upright | 34 |
| pedestrian, high speed, e.g. runner | 35 |
| handicapped person, e.g. wheelchair | 36 |
| person down on roadway | 37 |
| crowd on roadway | 38 |
| event on roadway, e.g. crafts fair | 39 |
| domestic animal, e.g. guide dog | 40 |
| non-domestic animal, e.g. livestock | 41 |
| wild animal, e.g. deer | 42 |
| other tiny (size TBD) | 43 |
| other small (size TBD) | 44 |
| other medium (size TBD) | 45 |
| other large (size TBD) | 46 |
| other very large (size TBD) | 47 |
| other oversize (size TBD) | 48 |
| reserved | 49-62 |
| unknown vehicle type | 63 |

The purpose of the vehicle type code is not to create a comprehensive list of vehicle types, but rather to provide approximate size and capabilities of vehicles, people and objects. The different types are specified when there are important attributes for quick recognition or that should change a driver's (or automatic) response, based on vehicle type. If a V2V transmitter is unsure of a vehicle code or vehicle size, it should broadcast the next larger size. Detailed size limits will be determined later.

A key advantage of providing vehicle type is the type defines the approximate size of the vehicle so that receivers of the message can make reasonable, conservative estimates of where the four corner of the vehicle are based on a single location, such as the front center of the vehicle.

A second advantage of providing vehicle type is that audio messages to drivers are particularly effective. For example, "avoid pedestrian ahead," or "caution: bicycle on right," or, "slow farm equipment ahead," or "debris in lane ahead." In some cases the vehicle type will determine the level of automatic response appropriate. For example, avoiding a pedestrian is extremely important, even at the risk of a minor collision with another similar-sized vehicle. As another example, a car should avoid a collision with a semi, even if it means emergency braking which might result in a rear-end impact. As another example, debris in any lane ahead may cause drivers to swerve at the last second. Therefore, a defensive measure is to position and maintain the message receiving vehicle so that there is no front-to-back overlap with vehicles in the lanes left and right, thus avoiding a sideswipe in the case of a sudden swerve by one of those vehicles. As another example, consider that fully loaded semi tractor-trailers have a typical stopping distance significantly longer than automobiles. Thus, either a driver or an automatic system should take into account the probable stopping distance of a semi. As another example, consider an animal or wheelchair in an intersection, where the view of that is blocked to a driver. That driver may honk or try to move around a view-blocking vehicle that is stopped for no apparent reason. Knowledge of the hidden animal or wheelchair avoids frustration, a possible horn honk or unnecessary courtesy message, improper warning transmission, or dangerous go-around maneuver.

An excessive number of defined vehicle types is inappropriate as adding unnecessary complexity, inconsistency, and confusion of purpose into a V2V system.

Note that the case of a vehicle moving slowly, the speed of traffic, high-speed or stopped is handle by the velocity information in the packet. Thus, there is no reason to code a stopped emergency vehicle differently from a moving emergency vehicle in the vehicle type field. Stopped delivery vehicles are coded differently because the typical behavior of a stopped delivery vehicle is different than most other stopped vehicles. Here, code 5 means a vehicle making a delivery, such as pulled to the right of a traffic lane, with blinkers on. This code is not for a "normal stop," such as at a stop sign.

The 4-bit Collision Type field encodes sixteen possible values. These are defined in FIG. 23. A value of zero means that no collision type is included in this message. A value of 15 means that the collision type is unknown. Over 95% of collisions are one of four types: rear-ender, sideswipe, side-impact, or head-on. Thus, this four-bit field is contained in nearly every message and covers the vast majority of collision types. There are also defined values for pedestrian or bicycle collisions, and single-vehicle collisions. More detailed information about a collision is available in another sub-message type. Values of 11 through 14 are reserved.

Note that the final risk transmitted in most messages is the general risk for the entire range of the transmitting vehicle. It is up to individual vehicles, generally, to assess their own role in causing or preventing a collision. If a transmitter has clear information about which vehicle is the cause (or primary cause) of a potential collision, it may proxy that particular vehicle, using that vehicle's location, speed and direction. Any V2V transponder receiving this information will compare the location speed and direction of the subject vehicle with it's own location, speed and direction. Along with the Collision Type field it will be quite clear to the vehicle that it is about to be hit, from which direction, and by what. If, alternatively, a vehicle notes from a message that its own location is being transmitted in a proxy, along with a collision type and a non-low risk, then it is the presumed cause of the potential collision and should change its behavior immediately.

Because a number of collisions are, "no fault," or "shared fault," or are multi-vehicle collisions, the use of a generalized risk value and collision type for a range is the most broadly useful embodiment. As discussed above, there is specificity to identify the causal vehicle and the non-causal, most-at-risk vehicle, with no loss of generality. As a specific example, suppose two vehicles were about to sideswipe each other. Independent of the fault or cause, a V2V transponder aware of this risk is able to transmit two proxy messages, one for each of the two vehicles, with the risk set to a high value and the collision type as "sideswipe." The transmitter may optionally use two additional time slots for these messages, one for each proxy, if the risk is high enough. Thus, within a single basic time interval, any V2V receiver within range, which might be in one, or both, or none of the to-be-involved vehicles will receive two vehicle locations, direction and speeds, along with risk and collision type. Thus each V2V receiver within range will have knowledge of the impending collision without any reliance on its own sensors, other than it's own, potentially crude, location. Note that the transmitting vehicle will be using its own location coordinates, suitably offset as discussed herein, for both proxies. Thus, there will be zero relative location error between the two proxy messages. If one of the two involved vehicles, for example, were to have a relatively large location error at the moment, and that location error is contributing to it's lack of knowledge about the impending collision, the receipt of the two proxy messages will be sufficient to inform that vehicle that it is about to be involved in a collision and needs to take immediate corrective action. Note that all of the necessary information fits within one or two Type 0 messages, and thus may be sent highly compactly and reliably.

A 4-bit Risk Source Field comprises four, 1-bit flags. The four flags are: Vehicle, Local Conditions, Traffic, and Location History, on bits B0 through B3, respectively. When a flag is set to a value of one, it means that the final risk value comprises a significant portion from that source. A Vehicle flag means that the source of the final risk comprises the real-time behavior of one or more vehicles. This is the most common and obvious source of vehicle collisions. Local Conditions comprises road conditions and weather conditions. A slippery road surface, a detour, or thick fog, are examples of local conditions. The Traffic flag refers to overall traffic, rather than to one or two specific vehicle behaviors. Stop and go traffic is an example. Location History flag refers to a particular location, such as an intersection or mountain road as having a history of accidents or close calls.

The exact selection of one or more Risk Source flags is up to each implementation of a V2V transponder. One possible implementation is as follows: A single flag is selected if no other source contributes more than one third to the final risk value. Two flags are selected if the remaining two sources each contribute less than ¼ to the final risk value. All four flags are selected if they each contribute at least 20% to the final risk value.

Understanding risk source is valuable to both a human driver and an automatic collision avoidance system in deciding what defensive mechanisms to implement. In particular, warnings, such as audio warnings to a driver, are often based on the risk source, rather than potential collision type.

Another advantage of communicating primary risk source is that it strongly supports audio warnings to a driver. For example, "watch traffic," or "dangerous driver approaching from right," or "unsafe roadway," or "dangerous intersection ahead."

While it mean seem unnecessary to inform a driver about "poor visibility," or "heavy traffic," many sources are in fact not obvious to drivers, such as an icy spot in a road, or an intersection with a history of bicycle collisions. Poor visibility may become a risk source quite quickly, such as being blinded by high beams.

Sharing location history sub-messages are low priority. These are sent in interval class B.

Continuing with the Fields in FIG. 22, we now see in Rows 9 and 10 two Location Fields. Location coding as here described applies to all 24-bit location fields. As discussed elsewhere herein, vehicle location is coded as a hybrid of both geographical latitude and longitude grid points (on a ½° grid), plus surface-of-the-earth (not straight line) offsets in distance. The offsets are 24-bit signed integers that encode the number of cm from the nearest (or almost nearest) grid point on a one-half degree latitude or longitude grid line. The range of these fields is approximately ±83.89 km. The worst-case spacing between any two adjacent grid points on a single latitude or longitude line is approximately 56 km. The two Location Fields generally encode the current distance of the subject vehicle to the nearest grid point. Positive refers to North or East. Negative refers to South or West. Measurement is on the surface of the ideal earth model, using the same geodesy model of the earth as used by the GPS system, currently WGS 84. Compass headings are absolute, not magnetic.

Generally, each V2V transmitter selects the nearest grid point to use as its location reference. There is no chance of confusion in the V2V receiver as to which grid point has been chosen by a transmitter, due to the spacing of grid points in the tens of km range. V2V receivers must be able to process V2V messages using different grid reference points. The grid consists of the intersection points of 720 longitude lines with 179 latitude lines (89.5° S to 89.5° N), plus the two poles, or 1,381,882 grid points.

There will be boundary zones, where some vehicles are using one grid point and other vehicles are using another grid point, as their reference. This should not generally be a problem, as changing grid points should not generate any computation, alignment or rounding errors. Nonetheless, it is desirable to have all vehicles in range using the same grid reference point. Therefore, vehicles should continue to use the same grid reference point they were using previously, until the following occurs: (a) another grid point is closer, or less than a predetermined distance; and (b) a majority of vehicles in range are using a different grid reference point; and (c) there are no known risks at the moment. In general, this will cause groups of vehicles to switch grid reference points as a group. In the example case of a boundary within and near the edge of an isolated town, generally the resident vehicles in the town will be using a single grid reference point. An appropriate overlap distance where a non-nearest grid point may be used is ten percent of the grid point spacing.

The Angle of Travel Field is 10-bit unsigned integer in the range of 0 to 1023. This integer represents the 360° compass heading, using true North, divided into 1024 equal parts, starting from zero. Each consecutive integer represents 360/1024 degrees. The V2V transceiver chooses the nearest heading for this field.

The Speed of Travel Field is an unsigned integer that represents the forward speed of the subject vehicle in units of 0.1 m/s. (about 0.2 mph), with an offset of 10 m/s. Thus the range of this field is −10 m/s (field value of 0) to +92.3 m/s (field value of 1023). A stopped vehicle uses a field value of 100. Speeds in the range of −10 m/s to −0.1 m/s represent a vehicle backing up. For a vehicle backing up at a speed greater than 10 m/s, the vehicle should be "turned around," that is, the reference point should be moved to the center of the back of the vehicle and the speed now encoded as positive. This field has an approximate range of −22 mph to 206 mph.

Lane Designation is an 8-bit field that encodes one of approximately 254 defined lane types. A value of zero means that the message does not contain a lane type. A value of 255 means the lane type is unknown. Assigned values for one embodiment are shown below in the Table below—Lane Designation Field.

TABLE 9

Lane Designation Field

| Lane Type | Value |
|---|---|
| lane information not in message | 0 |
| Indeterminate - not intersection | 1 |
| Indeterminate - intersection | 2 |
| Intersection - shared | 3 |
| Intersection - reserved | 4 |
| Turning right at intersection | 5 |
| Turing left at intersection | 6 |
| changing lanes leftward | 7 |
| changing lanes rightward | 8 |
| merging lanes leftward | 9 |
| merging lanes rightward | 10 |
| Lane 1 | 11 |
| Lane 2 | 12 |
| Lane 3 | 13 |
| Lane 4 | 14 |
| Lane 5 | 15 |
| Lane 6 | 16 |
| Lane 7 | 17 |
| Left shoulder | 18 |
| Right shoulder | 19 |
| Center shared left-turn lane | 20 |
| Left-side off-road | 20 |
| Left-side off-road | 21 |
| Right-side off-road | 22 |
| Merging lane on left | 23 |
| Merging lane on right | 24 |
| Right lane must exit | 25 |
| Left lane must exit | 26 |
| Shared merge on-off lane | 27 |
| Short merge | 28 |
| Lane or road classification change | 29 |
| Left-turn lane 1 | 30 |
| Left-turn lane 2 | 31 |
| Left-turn lane 3 | 32 |
| Right turn lane (farthest right) | 33 |
| Right-turn lane (2nd from right) | 34 |
| Right-turn lane (3rd from right) | 35 |
| Traffic lanes with no lane markings | 36 |
| Shared bicycle lane straight ahead | 37 |
| Shared bicycle lane left | 38 |
| Shared bicycle lane right | 39 |
| Clover-leaf section | 40 |
| Traffic circle | 41 |
| Traffic circle - entering | 42 |
| Traffic circle - leaving | 43 |
| Two-way driveway, right side | 44 |
| Two-way driveway, left side | 45 |
| One-lane driveway, proper direction | 46 |
| One-lane driveway, improper direction | 47 |
| Unpaved, unmarked | 48 |
| Construction detour | 49 |
| Accident detour | 50 |
| Contradictory lane information | 51 |
| One-way lane, two-way traffic | 52 |
| Bridge lane | 53 |
| Cul-de-sac | 54 |
| HOV | 55 |
| HOV+ | 56 |
| Bicycle parking | 57 |
| Crosswalk | 58 |
| Sidewalk | 59 |
| Single parallel parking space | 60 |
| Single diagonal parking space | 61 |
| Parking on non-standard side | 62 |
| Parking lot, set spaces | 63 |
| Parking lot, open parking | 64 |
| Oversize vehicle parking space | 65 |
| Valet parking pickup/drop-off space | 66 |
| Red parking zone | 67 |
| Yellow parking zone | 68 |
| Green parking zone | 69 |
| White parking zone | 70 |
| Ferry or elevator parking space | 71 |
| Farm or construction equip parking | 72 |
| Handicap parking space | 73 |
| Private garage | 74 |
| Motorcycle parking | 75 |
| Off-road bicycle path | 76 |
| Off-road pedestrian path (paved) | 77 |
| Off-road pedestrian path (unpaved) | 78 |
| Off-road animal path | 79 |
| reserved | 80-254 |
| unknown | 255 |

A lane type of zero means that no lane information is included in the message or sub-message. Two indeterminate lane types of 1 and 2 are used when the lane is not in an intersection or is in an intersection, respectively. If no information about a lane is available, then a lane type of 255 is used. A line type of 3 refers to part of an intersection that is shared between multiple lanes.

The beginning and end of a lane definition is determined by each V2V transceiver, then improved and perhaps discarded as lane information is shared. In general, lanes start and end at intersection boundaries. Thus, the pavement within the intersection proper may be encoded simply as an "intersection," or a more definitive lane type may be used. Lanes longer than 100 meters are typically broken into multiple lanes. These "short lanes" typically allow a lane to be encoded with a small number of points, such as two endpoints, or small number of b-spline points. Short lanes facilitate coding of turn lanes, driveways, shared center-lanes, and the like. Short lanes also facilitate relatively accurate accident and near-miss history recording.

Lane types 11 through 17 number lanes from the center, outward. For drive-on-the-right regions, Lane 1 is the left-most lane.

A substantial number of lane types are defined for parking. This is because parking information, and avoiding parking lot and parking in/out scrapes is a major advantage of some V2V embodiments in this invention. For example, lane types 57 through 75 define various types of parking, low-speed, or specialty locations for vehicles.

The "Lane or road classification change," value 29, is appropriate when the prior lane purpose, such as a freeway lane, changes at this location to another purpose, such as a signal-controlled city street lane. This designation is not meant for common configurations, such as a merging lane ending A number of lane types are defined for pedestrian, bicycle and animal lanes and paths. These lane types facilitate using V2V embodiments for safety involving pedestrians, bicycles and animals. These lane types also facilitate uses of V2V data for benefits in addition to anti-collision. For example, V2V messages could be used to assist in emergency rescue on a hiking trail.

It is possible that two equipped vehicles will not agree on a designation for a lane. Thus, they may transmit conflicting lane information. Generally, detection of conflicting lane information should be regarded as a risk condition. Note that not all lane designation values are contradictory. Multiple lane designations may be sent by using more than one sub-message in a message containing a lane designation.

It is desirable for a government, Standards body, de facto or pseudo standards organization to define a comprehensive and structured lane classification system. Such a system should include the specific physical boundaries, entry and exit points, and permissible behavior for each vehicle type for each lane.

A relatively large number of parking lot situations are encoded. Although usually minor, parking lot, low-speed collisions are extremely frequent. Therefore, there is significant advantage to V2V users of having good encoding for this information. For example, if two vehicles are next to each other in diagonal parking, and one vehicles is backing out at an angle such that a scrape is a neighboring vehicle is likely, it is useful to code both vehicles as being in "diagonal parking spaces," with a "side-swipe collision" coded in a message, to communicate exactly what the problem is. Compare this with one car backing out while another car approaches at an excessive rate of speed. Now, the two lane encodings will be "diagonal parking space," "parking lot," with a "rear-ender" as the collision type.

Message Types

The 6-bit sub-message type field at the start of all sub-messages provides up to 63 sub-message types, in one embodiment. Some of these sub-message types are reserved for future definition. There are many more than 63 actual message types, because some types indicate a "sub-message category," where additional information in the sub-message selects different formats of data within that sub-message. Some sub-message types define only a fixed length, permitting a wide range of information within the sub-message, as further defined by fields within the sub-message.

XML, for some sub-message types, provides a general-purpose method to add information to V2V messages.

TABLE 10

Sub-message Types

| Sub-message Type | Value | Bit Length |
|---|---|---|
| Type 0 Message | n/a | 114 |
| Null message | 0 | 24 |
| Vehicle position | 1 | 64 |
| Vehicle core data | 2 | 112 |
| Message collision warning - time slot | 3 | 30 |
| Message collision warning - location | 4 | 78 |
| Data request | 5 | |
| Signal power | 6 | |
| Risk detail | 7 | |
| Vehicle size detail | 8 | 74 |
| Vehicle identity detail | 9 | |
| Traffic detail | 10 | |
| Conditions detail | 11 | |
| Location detail | 12 | |
| Accident detail | 13 | |
| Detour detail | 14 | |
| Forwarding detail | 15 | |
| HOV detail | 16 | |
| Calibration beacon | 17 | |
| Emergency message type | 18 | |
| Roadside message type | 19 | |
| Traffic signal detail | 20 | |
| Courtesy message | 21 | |
| Parking detail | 22 | |
| Location history | 23 | |
| Lane data sharing | 24 | |
| Message encryption and signing | 25 | |
| Audio data | 26 | |
| Video or image data | 27 | |
| Commercial information | 28 | |
| Network Warning | 29 | |
| IP embedded | 30 | |
| 200 bit | 31 | 200 |
| 400 bit | 32 | 400 |
| 800 bit | 33 | 800 |
| 1600 bit | 34 | 1600 |
| 3200 bit | 35 | 3200 |
| 6000 bit | 36 | 6000 |
| 12000 bit | 37 | 12000 |
| Reserved | . . . -62 | |
| Test - ignore message | 63 | |

Table 10, above, identifies some sub-message types. This table provides examples of sub-messages. Some of these sub-messages are described in more detail elsewhere in this document. The Type 0 message is not a sub-message; it has been described extensively, above. The Type 1 Vehicle Core Data sub-message provides essentially the same fields, as a sub-message as the basic Type 0 message. Type 63 is a Null message, used as filler or pad. It contains two fields: the sub-message type and a length field.

The Type 62 is a test message; it is to be ignored. It may contain whatever data is desired for system testing; actual V2V transponders should ignore the contents past the length field.

The two message collision warning sub-messages are described in detail below. The Vehicle size sub-message is described in detail below. The Data request sub-message type 5 is shown below in Table 11. Following the sub-message type field is n 8-bit Flags field. Each of these eight bits, it set to one, indicates to what type of V2V transponder the request is directed. The General flag indicates that any V2V transponder may respond. The Location flag indicates that the vehicle identified by the Location fields should respond. The Vehicle type flag indicates that vehicles matching the Vehicle type field should respond. The Lane field indicates that vehicle in the lane identified by the Lane designation field should respond. The Roadside flag indicates that Roadside V2V transceivers should respond. The last three flags are reserved. The Location, Vehicle type, and Lane designation fields indicate the identity of one or a class of V2V transponders to respond. The Request bit field comprises a 64-bit field where each bit corresponds to a sub-message type desired in the response.

TABLE 11

Data Request Sub-message Fields
Data Request Sub-message

| Field | Length in Bits | Value |
|---|---|---|
| Sub-message type | 6 | 5 |
| Flags (General, Location, Vehicle Type, Lane, Roadside, reserved[3]) | 8 | |
| Request bit field | 64 | |
| Location: offset N-S | 24 | |
| Location: offset E-W | 24 | |
| Vehicle type | 6 | |
| Lane designation | 8 | |
| Reserved | 16 | |
| Subtotal | 154 | |

The Signal Power sub-message is described below in the Power Level section of this document.

The Risk detail sub-message describes risks in more detail.

The Vehicle size sub-message is described below in Table 12. The Vehicle length, width, corner radius, projections, and height are in units of cm are the maximum, such that the plan-view shape defined by these fields fully encompasses the vehicle. The shape is fundamentally a rectangle, with the corners removed by the corner radius. The Projections field defines projections outward from the rectangle; this field is specifically for rear-view mirror projections. Other types of projections from the vehicle must be within the defined rectangular shape. The remaining fields are defined in the table. The Vehicle number of trailers and Vehicle number of axles fields contain unsigned integers. A vehicle that weighs more than 65,535 kg must use this value in this field. The hazardous material flags field comprises 16 flags; each flag identifies one type of hazardous material. Definitions for this field should be developed by appropriate government agencies, such as the US Department of Transportation and the US EPA, in the US. Typical flags are: explosives, corrosives, fuel, oxidants, poisons, liquid, bulk, radioactive, refrigerated, pressurized, animals, etc. Flags may be reserved to indicate spill response requirements or transport regulatory agency.

TABLE 12

Vehicle Size Sub-message Fields
Vehicle Size Sub-message

| Sub-message Fields | Bits | Max | Units |
| --- | --- | --- | --- |
| Sub-message type | 6 | n/a | value = 8 |
| Vehicle length | 12 | 4096 | cm |
| Vehicle width | 10 | 1024 | cm |
| Vehicle corner radius | 6 | 64 | cm |
| Vehicle projections | 8 | 256 | cm |
| Vehicle height | 10 | 1024 | cm |
| Vehicle number of trailers | 2 | 3 | trailers |
| Vehicle number of axles | 4 | 15 | axles |
| Vehicle gross vehicle weight (kg) | 16 | 65535 | kg |
| Hazardous material flags | 16 | | flags |
| Total bits | 90 | | |

The Vehicle Identity sub-message is defined below in Table 13. The identification flags, when set to one, are used to indicate which of the following fields are applicable to this vehicle. Each flag corresponds with one field, respectively. The 102-bit VIN number uses a 6-bit modified ASCII code, with 17 character positions. Each symbol is from the ASCII table, minus 0x020 (hex 20). This provides for space, punctuation characters, digits, and upper-case Roman alpha characters. The license plate field uses seven 7-bit ASCII characters. License plates shorter than seven characters are left justified with spaces following. The two DOT fields are six, 4-bit digits each. These maybe used for USDOT and State DOT numbers, or other gov't issued DOT numbers. The State ID field comprises three 7-bit ASCII characters to identify the US State or country code that issued at least one of the DOT numbers. US State abbreviations begin with a space. Country codes are left justified. A 56-bit reserved field is defined. If a vehicle comprises more than one portion with applicable ID, it may send more than one Vehicle Identity sub-message, in the same order as the vehicle portions. For example: cab, first trailer, and then second trailer. The two DOT fields may be merged if necessary for longer IDs. For example, a toll transponder ID. If a toll transponder is used, the State ID field indicates the issuing authority for the transponder. The reserved field may be used for ISO 6346 reporting mark for intermodal containers, using the format of four 7-bit ASCII characters followed by seven, 4-bit digits, for example. Alternatively the ISO 6346 reporting mark may be placed in the two DOT fields, using four 6-bit ASCII characters (7-bit ASCII—0x20) and six, 4-bit digits. The number of occupants field is a 6-bit unsigned integer. This field may be used in conjunction with HOV lanes, bus passenger counts, or other similar purposes.

Vehicles should generally send Vehicle Identity sub-messages once every five seconds. Such sub-messages may be sent more often based on a request or a special situation, such as approaching a garage, scale, or checkpoint.

TABLE 13

Vehicle Identity Sub-message Fields
Vehicle Identity Sub-message

| Sub-message Fields | Bits | Format |
| --- | --- | --- |
| Sub-message type | 6 | value = 9 |
| Identification flags | 8 | flags |
| VIN | 102 | ASCII-0x20 |
| License Plate | 49 | 7-bit ASCII |
| DOT 1 | 24 | digits |
| DOT 2 | 24 | digits |
| State ID | 21 | 7-bit ASCII |
| Number of occupants | 6 | integer |
| Reserved | 56 | |
| Total bits | 296 | |

The Roadside message type is reserved for transmissions from roadside equipment. The Traffic Signal detail message type is reserved to hold information relating to traffic signal timing. We have already discussed Courtesy messages. The Parking detail message type is reserved to contain information about parking lots or parking spaces. We have already discussed parking messages. The Reply message type is reserved to contain information in response to a Request. The Location history message type is reserved to contain more detailed information about the accident history of a location. The Clear data message type is reserved to clear data already received or already stored. The Audio message type contains digitized audio. A preferred embodiment has a field at the start of this message type indicating the type of audio encoding used in the remainder of the sub-message. Other fields may also be included, such as a sequence number. The Video or Image data message type contains video or image data. A preferred embodiment has a field at the start of this message type indicating the type of video or image encoding used in the remainder of the sub-message. Other fields may also be included, such as a sequence number. The Commercial information message type is reserved to hold information about nearby commercial product or services available. For example, gas stations may be advertised using this sub-message type. The IP embedded message type indicates that the sub-message contains an IP packet.

The network warning sub-message indicates an accidental or intentional violation of V2V protocol. This warning serves two purposes. First, it cautions all vehicles in range that V2V messages are possibly invalid, and therefore caution in interpretation should be used. Second, it requests all vehicles in range to capture information that may be used immediately or subsequently to identify the cause and source of the network problem. Typically, vehicles receiving a Network warning sub-message record a number of received messages, possibly for further analysis. Also, vehicles use their other sensors, such as radar and cameras, to record information. Vehicles receiving a Network warning sub-message may respond with some or all of the recorded data. For example, if cameras are used by all vehicles in range, most likely at least one license plate capture of a causing vehicle will be captured. If a V2V transponder is transmitting properly in a time slot, then the delay of the message in the time slot may be used to triangulate the position of the transmitting vehicle, if at least three vehicles participate in the triangulation. Received power level of the causing transmissions also provides for crude triangulation. Directional antennas, or phased array antennas, if available, also assist in locating the causing transmitter. Network warning sub-messages are forwardable. Examples of reasons to transmit a network warning sub-message include: invalid core vehicle information, jamming, denial of service attacks, excessive transmissions, gross failure to follow protocol, grossly inappropriate messages, and other reasons.

Message encryption and signing sub-messages may comprise public PKI keys.

Audio information may include voice data from one driver or authority to one or more other drivers. Such information may be safety related or may be a courtesy message or may be a social message. Message priority varies by purpose. One example is parking instructions for an event.

Video information may be still image or moving images. One example is nearby image capture by vehicles in range in response to a network warning sub-message.

Video and audio typically includes the format of the information in a field following the sub-message type. One example is a four-character 8-bit ASCII field that mimics a file type suffix, such as "way" or "jpg" for a .wav or .jpg file format. A field should be included that indicates the nature of the message. Fields should be included that indicate the intended recipients of the message. Such fields might be location, vehicle type, or lane.

Some sub-message types, such as types 33 through 39 merely encode a sub-message length. Additional fields within the sub-message are required to indicate contents.

Risk Determination

Figure 6:
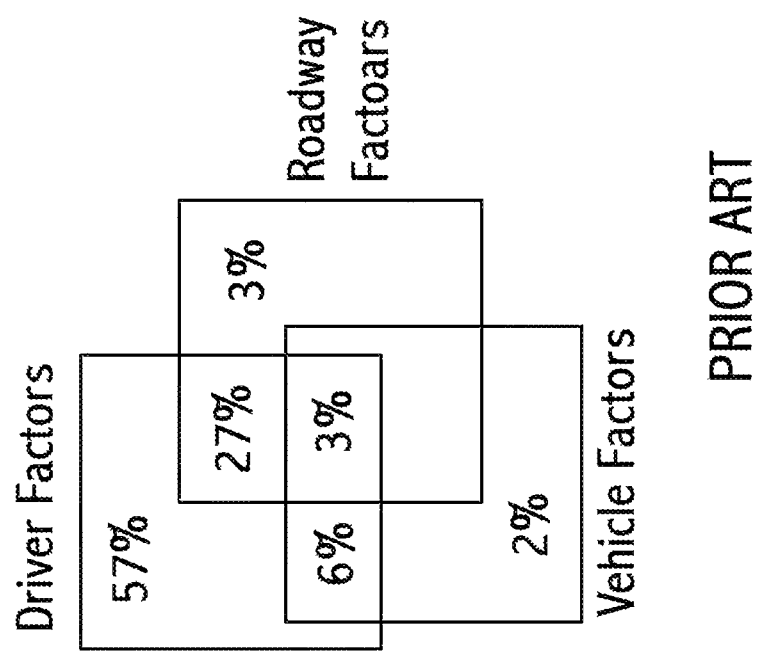
FIG. 6 shows prior published factors that contribute to vehicle collisions.
Figure 7:
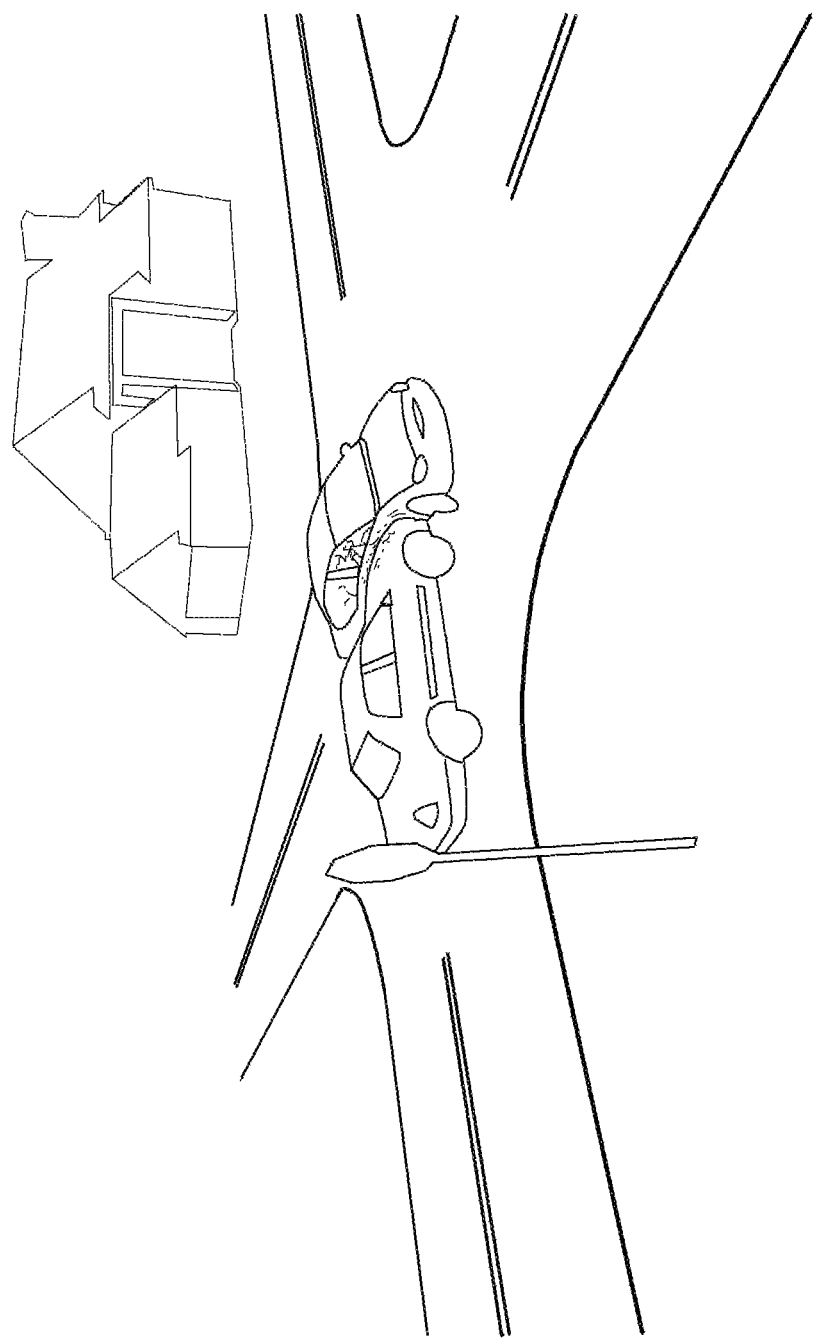
FIG. 7 shows an exemplary vehicle collision.
Figure 8:
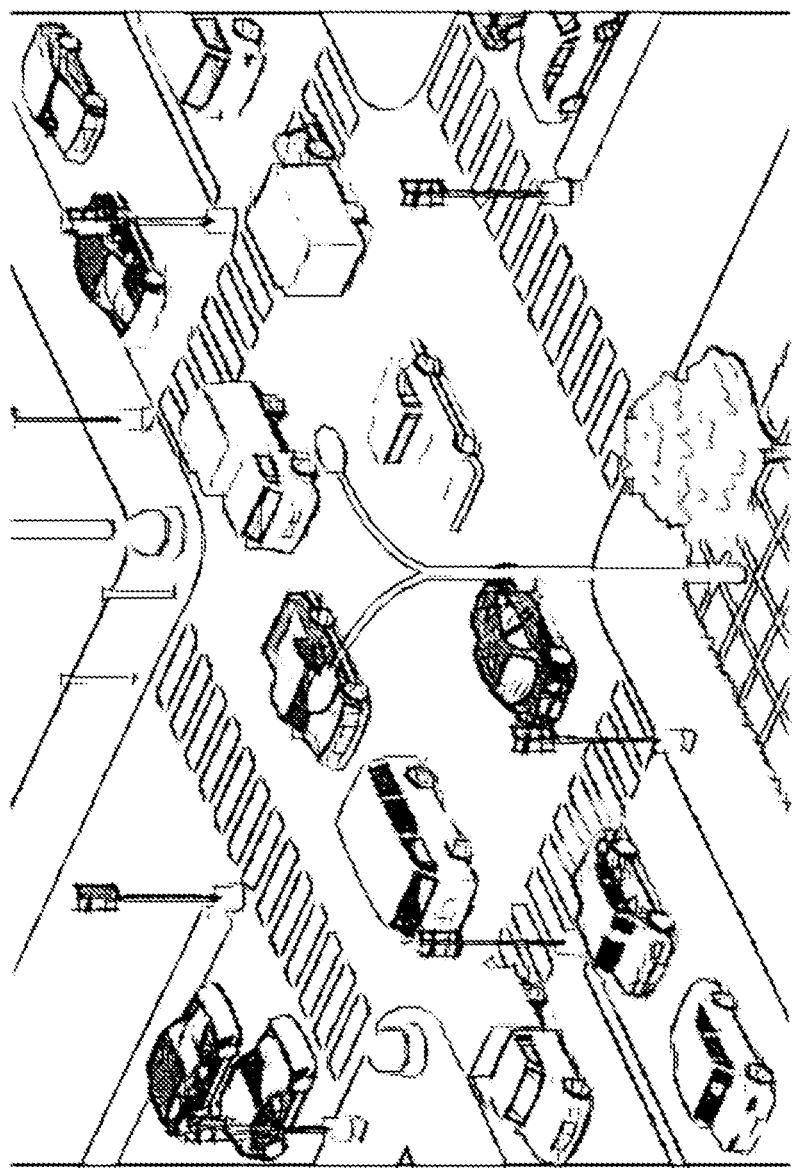
FIG. 8 shows exemplary heavy traffic at an intersection.

A 1985 study by K. Rumar, using British and American crash reports as data, found that 57% of crashes were due solely to driver factors, 27% to combined roadway and driver factors, 6% to combined vehicle and driver factors, 3% solely to roadway factors, 3% to combined roadway, driver, and vehicle factors, 2% solely to vehicle factors and 1% to combined roadway and vehicle factors. A chart showing this is in FIG. 6.

Computation of risk for every message is an important embodiment. The ideal risk value is an integer in a fixed range, say zero to ten. It is important that the risk vale be fine-grained enough (have enough possible values) to be useful as a gradual priority determinator, yet not have so many values that it is difficult to create a simple, understandable standard.

The use of the risk value had many applications within this invention. For example, it is ideally used to prioritize messages. It is ideally used for the allocation or de-allocation of bandwidth. It is ideally used to select an appropriate response in a receiving vehicle. It is ideally used as a determinator for forwarding of messages and storing of messages. Risk value may be used in selecting a message encoding format, where high risk value messages use a more reliable encoding that contains less information.

The risk value should be on a scale with human-understandable meanings. It is important that the "false warning" rate of a V2V system not be excessive, or drivers will become annoyed and turn it off. It is important that drivers understand the decisions of their V2V system and so come to trust it. The computation of a risk value may be complex, but the final value should be simple. The ideal computation of a risk value comprises both the addition of sub-risk values from various computations and parameters, and also the selection of the highest sub-risk value when that sub-risk value exceeds a threshold.

A preferred 11-point scale is shown in FIG. 14. Generally, high numbers mean higher risk and lower numbers mean lower risk, with some exceptions. A final risk value of zero means that this message or sub-message does not contain any risk value. A final risk value of one means that the transmitting vehicle is not aware of any risks at this time. A final risk value of two has similar meaning to a final risk value of one, with a subtle difference. The final risk value of two means that the transmitting vehicle has made an assessment of the current situation and has determined that the situation comprise no risk or a minimal risk. The difference between the final risk values of one and two is that the value of two implies a more comprehensive situational assessment; and thus communicates a higher confidence level than a value of one.

A final risk value of three indicates that some caution is appropriate. This final risk value should be transmitted no more than 10% to 20% of the time. One appropriate response might be a caution light.

A final risk value of four indicates that drivers should definitely exercise caution. An appropriate response would be to indicate at least one nature of the risk, such as slippery streets, unmarked lanes, an historically dangerous intersection, stop-and-go traffic, or a tailgater.

A final risk value of five implies a specific risk and that drivers should modify their behavior accordingly. A driver warning is required at this final risk value.

Final risk values of six and seven are currently undefined, but represent risks in between the severity of level five and level eight.

A final risk value of eight represents very high risk. Drivers should immediately initiate defensive driving based on the nature of the risk. Automatic vehicle collision avoidance measures, if available, are recommended.

A final risk value of nine indicates that a collision is predicted. Automatic avoidance and mitigation measures, if available, are mandatory.

A final risk value of ten indicates that a collision has occurred. This is not a risk level per se, but rather a notification. A final risk value of ten may be used alternately with other final risk. Final risk values of eight and nine have higher priority as messages than a final risk value of ten.

When a vehicle receives a message with a final risk value of ten it is mandatory that it record in its memory situational information, which should include all recent messages sent and received, as well as any available and appropriate sensor data, including still or video images. Note that such data is generally stored encrypted and signed, as discussed elsewhere.

Messages with a final risk value above five should include or be accompanied by a second message that identifies a location of highest risk, such as a predicted point of impact, if known. Not all high risks have such a determinable specific location. Message formats permit an area of risk to be broadcast, such as area on a street with slick ice.

Note that final risks are computed for the entire area within range, not just for the transmit vehicle and a proxy subject vehicle. Sometimes, more than one vehicle in a range may detect and therefore transmit a high-risk message. This is desirable, as it increases the likelihood that a such a high risk messages will be received.

If a first V2V transponder detects a particular risk, and then hears that risk being transmitted by a second V2V transponder in a message prior to its own similar transmission, the first transponder may choose not to transmit the risk. This avoids an unnecessary flurry of similar messages, which might result in message collisions. A V2V transponder should ideally consider the proximity of the risk to itself and the likelihood of its own involvement in the risk in making such a determination. If the first V2V transponder is directly involved in the risk it should always transmit the risk. If the first V2V transponder is in the first or second range circle transmission is advisable.

V2V transponders are permitted to "borrow" their own (or proxy) time slot for a single time interval in order to transmit a high-priority message. When such borrowing is done, the basic interval before and after the borrowed basic time interval must contain the usual core data for the transmitting or proxy vehicle.

Note that risk values transmitted in messages are computed generally for a situation, not for a specific vehicle. Each receiving vehicle is responsible for computing its own risk, which may be significantly different than the risk value received in a particular message.

A preferred method of computing final risk value is to add the sub-risk values from four sources: (a) specific vehicle behavior; (b) weather and road conditions, collectively called "local conditions;" (c) current traffic conditions; (d) location history. Although generally the sub-risk values from these sources are added, there may be a cap on the final value, unless specific conditions are met. For example using the above final risk value table, a cap of 8 is appropriate unless the specific conditions for 9 (accident predicted) or 10 (accident occurred) are met.

FIG. 15 shows one embodiment of a vehicle behavior sub-risk value table. For a given observed vehicle behavior in the right column, the appropriate sub-risk value to use in a final risk value calculation is shown in the left column. Observed vehicle behavior may be via local sensors or via V2V messages received.

One method to convert from quantitative metrics to the vehicles behaviors in this Figure is to use focus groups, where group consensus on a term, such as "very unsafe vehicle behavior," is used for this conversion. The focus group may be looking at videos, or may be driving, wherein cumulative driving and rating experiences makes up the database for this conversion. An alternative method is to simply assign behaviors as a percentage of all observed behaviors. For example, 98.0% of vehicle behavior is classed as safe; 1.2% is classed as slightly unsafe; 0.5% is classed as somewhat unsafe; 0.2% is classed as definitely unsafe; 0.09% is classed as very unsafe, and 0.01% is classed as extremely unsafe. Characteristics such as exceeding average vehicle speed, deviation from the center of a lane, failure to use turn signals, violating traffic laws, tailgating, and other behaviors are used in this determination.

FIG. 16 shows one embodiment of a weather and road condition sub-risk value table. For a given observed weather and road condition in the right column, the appropriate sub-risk value to use in a final risk value calculation is shown in the left column. Observed weather and road conditions may be via local sensors or via V2V messages received, or via another source, such a weather or road conditions service.

One method to convert from quantitative metrics regarding weather and road conditions to the textual descriptions in this Figure is to use focus groups, where group consensus on a term, such as "poor visibility," is used for this conversion. The focus group may be looking at videos, or may be driving, wherein cumulative driving and rating experiences makes up the database for this conversion. An alternative method for conversion is to have experts in this field provide the conversions. An alternative is for drivers of passengers to dynamically indicate to the V2V system their assessment of the weather and road conditions. V2V broadcasts could be used to determine a "weather and road condition consensus," so that vehicles with a range or area predominantly use the same weather and road condition rating.

FIG. 17 shows one embodiment of a braking sub-risk table. For this table, the sub-risk value to assign to a specific observed braking behavior depends on the current traffic conditions. Current traffic conditions are first ranked as "light," "moderate," or "aggressive or challenging." Then for each traffic condition ranking, that column is used to determine the sub-risk value for the observed braking behavior shown in the left column.

One method to convert from quantitative metrics to the vehicles behaviors in this Figure is to use focus groups, where group consensus on a term, such as "strong braking," is used for this conversion. The focus group may be looking at videos, or may be driving, wherein cumulative driving and rating experiences makes up the database for this conversion. Similar to classifying driving behavior, percentages of all observed braking behavior may be used in the classification.

FIG. 18 shows one embodiment of a turning sub-risk table. Similar to the braking sub-risk table, the sub-risk value depends on traffic conditions. Categorizing turning behavior as one of the descriptive terms in the left column may be accomplished using similar methods as for the other sub-risk tables discussed above.

A camera may be used to identify and monitor road and traffic conditions. The distinction we make is that "road conditions" are relatively static, while "traffic conditions" are relatively dynamic. There is not a bright line distinction between the two. For example, a stalled vehicle may be considered either a road condition or a traffic condition. Similarly, observing cars sliding on a slippery road may be considered either a road condition or a traffic condition. Also road conditions include the state of fixtures such as the current or predicted state of traffic lights.

Such road and traffic conditions include but are not limited to: identifying an intersection; identifying a red light at an intersection; identifying a stop or yield sign; identifying merging traffic lanes or merging traffic; identifying cross traffic; identifying a crosswalk or a pedestrian; identifying a driveway or a car positioned to leave a driveway; identifying a stopped vehicle; identifying an emergency vehicle; identifying a road hazard; identifying lane markers; identifying signage.

Such identification is highly useful in optimal identification of a risk condition. For example, the V2V system may now identify a vehicle about to run a stop sign or red light. The V2V system may be able to identify a vehicle not obeying legal signage, although otherwise driving what appears to be safely. The V2V system may be able to identify a vehicle not responding appropriately to road or traffic conditions.

Thus, one embodiment uses observed road or traffic conditions as part of risk assessment.

Note that the inclusion of collision type information in a message is generally non-required information, but information that may be helpful in creating a response. Indeed, the appropriate response in most cases to an increased likelihood of each of these collision types is significantly different. Consider the appropriate response that most drivers would take given only this limited information. If warned of a possible "two vehicle collision," most drivers would slow considerable, and watch carefully for oncoming or cross traffic, focusing on other vehicles. If warned of a possible "pedestrian or bicycle involvement," most drivers would driver over a crosswalk with substantially increased vigilance, look carefully at sidewalks and the space between moving traffic and parked vehicles, and be extremely cautious making a right turn. If warned of a "single-vehicle accident," most drivers slow considerably (unless on a slippery road), and look for what road-risk might be difficult to see. If warned of a "rear-ender," most drivers would look in front and in the rear-view mirror, and then attempt to gradually increase the space both in front and behind them. If they notice a tailgater, they would slow very slowly and change lanes or pull over. If a V2V system included automatic vehicle responses, those responses would be similar to the human responses discussed above.

Location History

Historical location risk is an important embodiment. Experts in traffic safety are aware that some road locations represent a far higher statistical risk of accidents than other locations. Making drivers and automated vehicle systems aware of these historical risks permits the driver or the vehicle to exercise additional caution at high risk locations with a negligible impact on overall trip travel time.

The sub-risk value to use for a given location depends on the current risk level from other factors. The reason for this is that the actual total risk may already be determined from other factors. Adding in a high historical risk may overstate the risk.

FIG. 19 shows one embodiment of an historical sub-risk table. The historical risk for an area of a road, such as an intersection, a turn on a mountain road, or an entire length of road, is ranked on a scale of zero to five, where zero is no historical risk and five is the highest possible historical risk. The current risk level from other considerations is first determined. This is shown in the left column. Based on the historical risk and the current risk level, the value table is the current historical sub-risk level to be used in computing the final risk value. For example, is the current risk level is zero (the bottom row), then the full value of the historical risk level is used for the historical sub-risk value. However, for higher current risk levels, the historical sub-risk value is "de-rated" so as to not overstate the total, final risk.

Instead of a table, a formula may be used. Fractional sub-risks are not a problem because fractions are rounded prior to create an integer valued final risk value.

Historical risks are best determined solely by accident history for that location. A percentage ranking may be used, first ranking all locations by accident history (which should first be normalized), then assigning the top x percentage of the list, such as 1.0%, a risk level of five. This process continues for historical risk values four through one, until all locations on the list are assigned. Locations not on the list receive a historical risk level of zero.

Eventually, the V2V system will update the historical risks based on sharing data on collisions and high-risk incidents at each location. High-risk incidents may also be called, "near misses."

Generally, the preferred embodiment is to add the various sub-risk values to produce a final risk value for each message. The final risk value may be capped, subject to one or more specific events. For example, our preferred embodiment caps at eight unless an accident as actually predicted (great than 50% probability unless immediate action taken) or has occurred.

There are two underlying concepts to support this approach. The first concept is that, in most cases, there is a single dominant risk, such a vehicle about to run a red light, or an icy street, or a lane blockage. Adding sub-risk values simply selects that dominant source. The second concept is that in some cases an accident results from a number of less-than-ideal factors. This second concept is what is behind most major man-made disasters, such as most airplane crashes, and the high loss of life from the sinking of the Titanic. For example, an icy street, poor visibility, a traffic light that is out, a detour, and a non-attentive driver all at the same time, is a clear recipe for an accident. The preferred embodiment properly handles these situations. Also, as the system matures and more sources of risk are identified, these new sources are simply added into the final risk value with minimum other changes to the system, parameters, or architecture. Also, adding multiple sub-risk values minimizes the error from any one sub-risk having a less than ideal weighting value.

Note that it is appropriate to use more fine-grained values for sub-risks than integers. The use of fractional sub-risk values permits small, continual adjustments to these values as experience and more data is available. Again, a suitable initial method for assigning values to specific sub-risk sources is by the use of focus groups.

In one embodiment drivers or owners of vehicles may select a threshold for driver notification of received risk messages. Below this threshold a driver will not be notified. At or above this threshold the driver will be notified. Beginning drivers, insecure drivers, or drivers in an unfamiliar environment may wish to set a low threshold. Owners of rental vehicles or business vehicles may wish to set a low threshold.

In one embodiment drivers or owners of vehicles may select a threshold for automatic vehicle response to received risk messages. Below this threshold the vehicle will not take automatic protective, mitigation, or avoidance action. At or above this threshold, the vehicle will. Beginning drivers, insecure drivers, elderly drivers or drivers in an unfamiliar environment may wish to set a low threshold. Owners of rental vehicles, business vehicles or parents with teenage drivers may wish to set a low threshold.

Insurance rates may be a function of set thresholds.

Both the driver warning threshold and automatic vehicle response thresholds should be subject to both minimums and maximums. Exceeding maximum values diminishes or the effective value of the aggregate V2V system. Below minimum values produces a large number of false or unnecessary warnings, not only diminishing the value of the system, but also creating negative impressions of V2V.

For a V2V system to be aware of historical risk value in a location is a valuable feature. Often, certain intersections have a much higher accident rate than would be predicted by simple factors such as traffic volume. Adding in the sub-risk value based on this history is a critical way to more accurately communicate risk to the driver of a vehicle.

One method of placing location historical sub-risk values into a V2V transceiver is by loading a table from a source, such as the manufacturer of the V2V transceiver, a government agency, or a third party. A second method of obtaining location historical sub-risk values is for a V2V transceiver to accumulate this information based on its own operating experience at this location. A third method of obtaining location historical sub-risk values is for V2V transceivers to exchange information from the second method via use of V2V messages. All three methods are the preferred embodiment of this invention.

Another method of obtaining V2V location historical sub-risk values is from a roadside transmitter. While this may be viewed as a specific subset of the third method above, a potential distinction is that a government agency (for example) may place a roadside transmitter at a high-risk location where that transmitter has the primary purpose of informing vehicles of the location historical risk of that location. Such a transmitter might be temporary. For example, a city might place such a transmitter at one intersection for a week, then move it to a different intersection. Because a large fraction of vehicles that are "educated" during that week are habitual users of that intersection, those vehicles will continue to inform other vehicles of this location historical sub-risk value each time (generally) they pass through the intersection.

Another method of receiving location historical sub-risk values is from satellite radio.

The proper place and time for vehicles to share location historical sub-risk values is for the location where the vehicle is currently located, within some range. This method has the advantage that no additional complexity is required to specify location. The message essentially says, "here" is where this historical average location-based sub-risk applies. The range should be a reasonable range applicable. For example, collisions that are intersection related usually happen within three vehicle lengths of any approach to the intersection.

The described "here" approach to identifying a location permits "advance" locations to be broadcast simply by changing the location in a message to be, for example, the center of the intersection prior to the transmitting vehicle reaching that point. Because the message content (message type) is communicating an historical risk, there is no confusion that the transmitting vehicle is describing its own location. In such a message the usual risk value field in message should be zero.

One metric of location history is the number of prior accidents at a location. Another metric of location history is the number of prior accidents as a ratio of accidents per vehicles passing through this location. Another metric of location history is the number of accidents per unit time, such as one year. Another metric of location history is a factor normalized to risk associated with all similar locations. The preferred metric is an "absolute," rather than relative metric, as drivers are not experienced at judging risk based on intersection or road type. For example, most drivers do not know if a four-way stop or a signalized intersection is more dangerous. The preferred metric is accidents per year in this location. The metric should be weighted to count more serious accidents more heavily than minor accidents. For example, a minor accident has a weight of 1. A major accident with no injuries has a weight of 3. An accident with minor injuries has a weight of 5. An accident with major injuries has a weight of 10. An accident that resulted in a death has a weight of 15.

Another method to determine weighting of accident seriousness in generating a location history metric is to use the ratio of the number accidents at each seriousness level. For example, if accidents causing death are one-fifth as many as accidents causing a major injury, then the weight of accidents involving death is five times the weight of accidents causing a major injury. These ratios may be from data for a large area, such as a state or the US.

If more than one collision type is applicable to a particular situation, then additional messages may code for different collision types. For example, two different collision codes may be broadcast in alternating messages. If significantly more information about a possible or actual collision is available, a "collision detail" message may be sent.

These collision types are also appropriate for coding most historical accidents at a location.

Drivers falling asleep at the wheel is a major cause of vehicle accidents, particularly among truckers. A proper V2V system will detect a likelihood that the driver of a vehicle has or is about to fall asleep at the wheel and take active steps. One such step is a subtle warning or request communication to the driver. This warning is not sufficient to wake a sleeping driver. The warning must be cleared within a minimum period of time, say five seconds, or the system assumes that the driver is in fact asleep or drowsy and takes action to slow and stop vehicle automatically. In addition, both the warning and any subsequent action send V2V messages so indicating the appropriate risk.

Note that when a V2V equipped vehicle encourages a driver to move out of a lane (or location) with a high accident (or near miss) history, that vehicle is not only operating more safely for itself, but also for other vehicle, including in particular non-equipped vehicles in the vicinity. By moving vehicles out of a high-risk lane, the vehicles remaining in the lane have improved sight lines and increased vehicle spacing, reducing the chance of future accidents. This is one example in which V2V equipped vehicles increase the safety of non-V2V-equipped vehicles. This is one example of why governments, vehicles manufacturers, and insurance companies should encourage the rapid adoption of V2V technology.

Time Slot Assignment and Message Collisions

Position Determination

Location is determined more accurately than GPS by the use of a novel algorithm called "location consensus."

Note that as used herein the terms, "location" and "position" are similar. Generally, the term "location," is preferred when the context refers to a more global use of the term. Generally, the term, "position" is preferred when the context refers more to the relative position of two or move vehicles.

One of the most ingenious aspects of this invention is a preferred embodiment for dynamic calibration of location information. As currently implement in most GPS receivers, absolute geolocation is accurate to roughly plus or minus 15 feet, or about 3 meters.

Typically, raw position information into the V2V transceiver comes from a local or embedded GPS receiver, although other sources of position are possible. The actual position of the vehicle as calculated may include corrections, calibrations, adjustments, and the incorporation of other information. There are many known methods of improving on the accuracy of a single GPS receive position. Differential GPS is one method. An inertial navigation system may provide improved accuracy or provide all of the location information. Roadside markers, such as still images or video images taken to the side from a vehicle, forward or backward road images, road signage, beacons, targets, and other physical, detectable from the roadway, identifiable objects may be compared with a map or database to determine or improve position.

Location determined from the use of cellular telephone or data communications may also be an appropriate source of location data, if and when such data is both sufficiently accurate and widely available (for example: without a fee).

Note that preferred embodiments improve on GPS (or other source) geolocation data with inertial navigation. In the short to intermediate term, inertial navigation is quite accurate. For example, a vehicle at a particular heading, moving in a straight line, will not "jump sideways" as might be indicated by a received GPS coordinate set. Similarly, if a vehicle knows its speed within, say 1%, its range of possible locations may be considerably smaller than received GPS coordinate sets. Algorithms are well known in the art to average multiple received GPS coordinates with inertial information to provide improved geolocation position. The sources and nature are GPS errors are well known in the art.

It is important for a V2V system to not generate location or velocity artifacts. Such artifacts could make a vehicle appear to be operating in a very unsafe way, when in fact it is being operated safely.

Thus it is important and preferred embodiment that inertial navigation be used to assure that sudden, improper vehicle locations shifts are not transmitted. A suitable integration period is ten to thirty seconds.

Using position information as data to compute possible vehicle collisions requires that the position data for the vehicles in the computation be "aligned" in the sense that any absolute position errors are far less important than the vehicles having the same error. Thus, the ideal "calibration" for vehicle position is not so much accuracy compared to a geographic ideal, but rather that nearby vehicles agree with each other.

The preferred embodiment involves all vehicles making continual, small corrections in order to reach close agreement. We refer to this process as "consensus" of location.

We use the term "location alignment" to indicate that multiple vehicles are in "consensus," in that their relative locations to each other are in agreement. In a perfect system all vehicles within range are "perfectly aligned," meaning there are no residual errors or disagreement about the relative locations of each vehicle in this set. Note that this theoretically "perfectly aligned" coordinate system typically will not be in perfect alignment with the reference geolocation model. Note also that each vehicle on the road is likely to have a different set of other vehicles within its range, and also that the set of vehicles with range is constantly changing. Thus, one set of vehicles could be perfectly aligned while an overlapping set is not.

We introduce the term "offset" which means the difference between the reference geolocation model coordinates and the location a vehicle is currently transmitting. If the transmitted location is precisely the position provided by the geolocation input to the V2V transceiver, such as GPS coordinates, the offset would be zero. Offset applies to both latitude and longitude, and possibly other parameters such as elevation and time. We use the term offset to include all of the offsets for all possible individual parameters.

There are numerous ways to use local sensors to improve position matching, or calibration. Consider, for example, a situation with a first vehicle stopped at a light in a lane, with a second vehicle directly in front, a third vehicle directly behind and a fourth vehicle directly to the left. Using local sensors such as sonar, radar, and video, it is easy for vehicle one to compute the position of vehicles two, three and four, with respect to vehicle one, within a few cm or better. Each of these four vehicles, if equipped, is regularly transmitting the location of each respective vehicle. By comparing the V2V received locations from vehicles two, three and four and comparing these locations to the locations observed by the local sensors, it is possible to achieve with 100% confidence a one-to-one relationship between the received messages and the locally observed vehicles, even though the locations in the received messages are not precisely the observed locations of the vehicles.

The preferred embodiment algorithm to achieve location consensus uses the previously discussed "offset." One embodiment of the algorithm works as follows. (a) The first vehicle determines its absolute geolocation using the best means available to it, such as GPS coordinates. (b) It records the location in received messages from all vehicles in its range. (c) It makes its best determination of the relative location to itself of every vehicle within sight or sensor distance (the vehicles "in sight.") (d) It compares the data received in (b) with the data computed in (c) to map the equipped vehicles in range to the vehicles in sight, where possible. Note that not all vehicles in sight may be equipped, and vice versa. Vehicles that may be so mapped are called the "consensus building set." (e) It then compares, for each vehicle in the consensus building set, the absolute geolocation as computed in (c) with the location in the received message received in (b). (f) These differences, as determined in (e), are the offsets for each vehicle in the consensus building set. (g) All of the offsets in (f) are averaged. This is called the "average offset." Note that there is an average offset for every parameter in the offsets, such as latitude and longitude, or N-S and E-W distance. (h) The average offset is multiplied by an offset weighting factor, such a 99%, to produce a "weighted average offset." This step moves the average offset closer to zero, where zero is the absolute geolocation. (i) The weighted average offset is now compared to the first vehicle's current offset. If there is no difference, this iteration of the algorithm is complete. If there is a difference, the first vehicle's own offset is increased or decreased to be closer to the weighted average offset. (j) The new own offset is used when computing the next location transmitted by the first vehicle. The own offset is added to the absolute geolocation determined in (a) to generate the actual transmitted location. (k) This algorithm is repeated every basic time interval, such as 0.1 seconds, by all equipped vehicles. (l) The maximum amount that the own offset may be changed each iteration is set by an offset drift factor. The preferred offset drift factor is ±0.1 m/s per second in both the N-S direction and the E-W direction, each. For a 0.1 s basic time interval, this is ±0.01 m/s per iteration.

The effects of the above algorithm are now discussed. The algorithm averages the offsets of all the vehicles surrounding the first vehicle, for which the algorithm can be computed. This average is then used by the first vehicle. Note that ALL vehicles are doing the same averaging, every basic time interval. Thus, all the vehicles are going to converge on a consensus, so that the relative positions of all the vehicles in the consensus building set are in agreement. Note that the value of the offset is computed for each vehicle relative to its own perception of its absolute geolocation. Thus, even when all the vehicles in range are in perfect match, they will still have (possibly considerably) different offsets. Nonetheless, the locations as transmitted will provide highly accurate relative position between all the vehicles.

The computation of this averaging is done only for vehicles whose position relative to the first vehicle may be determined by local sensors, such as radar, sonar or video. (Other sensors specifically adapted to this task may also be used, such as lidar or magnetic sensing.) The decision of which vehicles pass this test is simple: the first vehicle determines for each vehicle it can see not only its relative position but also the accuracy of that determination. For example, a stopped vehicle in the next lane, using side-looking sonar, the relative position of that vehicle may have an accuracy of 10 cm. For a vehicle approaching head-on at high speed on the other side of the street, the accuracy might be 2 meters. For each vehicle, and for each parameter in the offset, if the accuracy of the relative position determination from local sensor is better than the computed offset for that vehicle, then that vehicle is included in the consensus building set for that parameter. If the accuracy of the relative position determination is worse than the computed offset then that vehicle is not included in the consensus building set.

Note that this algorithm, and the creating of consensus building sets is done separately for N-S and E-W position. (Or, latitude and longitude, if those are the parameters used for transmitted location). This is because, often, one of these positions may be accurately determined while the other cannot be. Consider, for example, the situation of a vehicle approaching at high speed on the opposite of a road that runs North-South. Using a vision sensor, it is determined that the vehicle is in the middle of its lane. The location of the lane, at the location of the approaching vehicle is known, perhaps from an internal lane map or from another source. Thus, the E-W location of the vehicle may be determined quite accurately. The distance to the approaching vehicle along its N-S axis of approach is much harder to determine. Also, the vehicle is moving quickly so there be additional error from its speed.

There is a maximum convergence rate for alignment. We prefer 0.1 m/s per second, which is about 0.2 mph. This may be viewed as offset "drift." For example, a stopped vehicle may appear to be drifting sideways at 0.2 mph, as it continually adjusts its offset, and thus transmits slightly different locations each basic time interval. However, note that it is "drifting" into the proper advertised relatively location compared to its closest neighbor vehicles. Note, too, that all of the nearby vehicles are also drifting, as they too attempt to align by consensus their advertised locations.

This maximum convergence rate means that it takes about 10 seconds for a vehicle change its advertised position (relative to its best absolute location) by one meter. It takes about a minute to shift 5 meters, which a widely used estimate of average consumer-grade GPS accuracy.

Note, however, that a 5-meter shift in consensus should occur rarely. First, by averaging a number of vehicles the GPS error rate is considerably reduced. The GPS error is improved for two reasons. The first is simple arithmetic averaging. The second is that the different GPS paths to the different vehicles actually improves the accuracy of the GPS.

This algorithm uses an "offset weighting factor," such as 99%. The effect of this factor is to subtly but continually "add in" the absolute location of the vehicle, as it can best determine it. This step in the algorithm tends to slowly drive the converged offsets to zero. After 100 iterations, the weighted offset will move to within 37% of zero, assuming there are no other inputs to the averaging equation. What this means if a vehicle is completely by itself, with no other vehicles around, that within a few minutes its own offset will essentially reset to zero. It also means, that if a set of 50 vehicles in range and within sight of each other, but in sight of no other vehicles, has fully converged on an offset that is not zero, that they as a group will slowly shift their consensus offset to zero, too. This step in the algorithm prevents a group of vehicle moving together in a range to have a "stuck" non-zero offset.

There is an additional means for improving positional accuracy, and that is lane maps. Vision system, in the current art, are well capable of determining painted lane lines under a wide variety of circumstances. A V2V equipped vehicle may have a lane map of high confidence. Its local vision system is able to determine the position of lane lines relative to the vehicle with high accuracy. This determination, in conjunction with the lane map provides a high-accuracy location source. When such a high accuracy location source is available, it should be weighted with the location consensus algorithm. Consider the embodiment where the lane-map-determined location is averaged with the location consensus location, each with 50% weighting. If the other vehicles do not have a high-confidence lane map, then the continual location consensus algorithm will converge towards the lane-map-determined locations.

Our preferred embodiment is to use lane map weighting in proportion to the confidence level of the lane map and local sensor lane determination.

Figure 5:
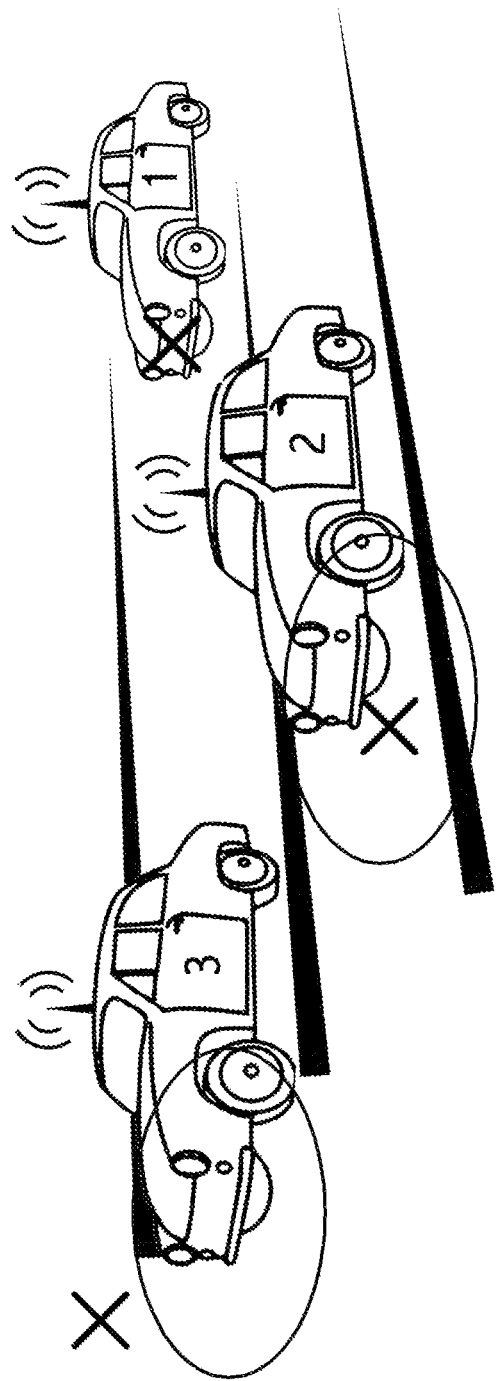
FIG. 5 shows three V2V equipped vehicles, where vehicle 1 is using location consensus with vehicles 2 and 3. Vehicle 3 is in the consensus set while vehicle 2 is outside the consensus set.

FIG. 5 shows how location consensus works. What is important to prevent vehicle collisions is the relative positions of vehicles. GPS in the current art typically does not provide sufficient accuracy to implement usable V2V. The solution is for vehicles to improve on the GPS accuracy by a process we identify as "consensus." Each equipped vehicle, here shown as vehicles 1, 2 and 3, has what it thinks is its best geolocation, perhaps from GPS. However, it does not broadcast this exact location. Rather, it constructs its "own offset" in two axis (such as N-S and E-W), and adds that offset to its believed exact location to create the transmitted position. Each basic time interval, each vehicle recalculates its own offset. A preferred algorithm is provided elsewhere herein. In summary, each vehicle compares the broadcast location of every vehicle it can also "see" (with local sensors such as video, sonar, radar or lidar) with its transmitted location. It then computes the offset being used by each of these vehicles in this consensus set of vehicles. It averages these offsets, and uses that average as its next own offset. The rage of change of each own offset is ideally limited to a maximum "drift" rate, such as 0.1 m/s. Since ALL vehicles in the consensus set are also averaging, the offsets of all the vehicles in the set converge to a consensus value. By having the same consensus offsets (each relative to each vehicles own believed "exact" geolocation), highly accurate relative position information is used in V2V messages.

FIG. 5 shows how one vehicle is include in a consensus set and one is not. Vehicle 1, whose broadcast position as the front center of the vehicle is shown as an "X," can both see vehicles 2 and 3, both of which are equipped. For vehicle 2, vehicle one computes the relative position using its local sensors. It determines the accuracy of the computation, here shown as an ellipse near the front center of vehicle 2. (This Figure is shown in a bird's eye view, although the ellipses are more accurately though of as being in on the plane of the surface of the earth, with no height.) The transmitted position of vehicle 2 (as perceived by vehicle 1) is shown by the "X" near the front of vehicle 2. The transmitted position is MORE ACCURATE than the locally determined position, and so vehicle 2 is NOT included in the consensus set. For vehicle 3, vehicle 1 has also computed the position and the accuracy of that computation, as shown by the ellipse near the front of vehicle 3. Vehicle 3 is transmitting a location outside of this error-limit ellipse. Thus, vehicle 3 will be included in vehicle 1's consensus set. It is necessary to correct offsets so that transmitted position of vehicle 2 more accurately aligns with its actual, relative position. Note that all three vehicles are running the location offset consensus algorithm every basic time period.

FIG. 11 show in an overhead view the results of before (FIG. 11A) and after (FIG. 11B) location consensus algorithm is run. In FIG. 11A, vehicle 1 observes the apparent X- and Y-errors in vehicle 2's transmitted location relative to its known position relative to vehicle 1 by vehicle 1. The solid vehicle outlines indicate the each vehicle's ideal location, as perceived by vehicle 1. The dotted outlines indicate the locations as transmitted. Vehicle 2 sees a similar error for vehicle 1, from its point of view. As both vehicles average their own "ideal" location with the observed other-vehicles' errors, they arrive at a consensus offset, shown in FIG. 11B as X-error and Y-error, now the same for both vehicles. These "errors" represent the offsets as transmitted in vehicle locations by each vehicle. There relative position errors to each other are now zero, or close to zero. Note that only two vehicles are shown, although in many cases more than two vehicles will be participating in location consensus. As shown in FIG. 11B vehicle 1 moved its transmitted position up and to the left, while vehicle 2 moved its transmitted location down and to the right.

Lane Maps

Lane information is accumulated, computed, and shared entirely within the V2V system, not requiring outside maps that currently do not exist.

A unique feature of embodiments of this invention is the ability to create detailed and accurate lane information internally in the overall system, without the need for external data sources. As discussed elsewhere herein, while the V2V system is functional without lane information, lane information is highly desirable. Embodiments use location history to build lane information. Note that location history is different that location risk history.

Location history tracks all nearby vehicle location transmissions. It is useful to think of these individual transmissions as dots on a map. As a vehicle traverses the same road day after day, it accumulates a large number of map dots. Vehicles exchange map dot data. After a while, those recorded dots connect, or nearly connect, to form the history of all equipped and proxied vehicle travel on that roadway. The lines formed by the dots are the effective lanes. In some ways, they are better than painted lane lines, as this history shows how vehicles actually use the road, which is more effective than how they are supposed to use the road, for anti-collision purposes.

The type of lane is generally discernable from this history information. For example, traffic lanes v. parking lanes, and north-bound lanes v. southbound lanes, by examining average speed and direction. Merging lanes and new lanes (when a single lane becomes two lanes) are easily determined by observing the intersection points of distinct lanes. Left and right turn only lanes may be identified by the fact that nearly all vehicle in this lane turn. Because V2V messages include the vehicle type, exceptions for "must turn" for busses and bicyclists are easy to determined, too.

One method of lane identification comprises the following steps. (a) connect adjacent map dots; (b) determine lines from connected map dots; (c) break up lines into regions 100 meters (for example) long; (d) use the statistics of the map dots in that region and of the vehicle reports that provided the map dots in that region to assign a lane identification; (e) improve the exact location of key road features (such a merge point, or an intersection, or a stop sign) by examining the data in the region more carefully; (f) assign a confidence level to the derived lane identification based on (i) the number of distinct vehicles that made up the underlying data, and (ii) the number of distinct map dots that made up the underlying data; and (iii) the statistics, such as mean deviation and non-compliant map dots, of the underlying data. Reasonable thresholds for a "moderate" confidence rating might be a minimum of 10 different vehicles and a minimum of 100 distinct map dots with no more than 2% of map dots deviating from the determined lane designation.

Map dots should only be placed into the map dot history when there is high confidence in the accuracy of the transmitted location for that map dot. There should be a 90% confidence in a location accurate to 50 cm, for example.

Certain types of classifications, such as parking spaces and driveways, use a different standard. For example, a single vehicle turning into or out of a driveway should be sufficient to classify that line as a "private driveway." More vehicles suggests a better designation as a "public driveway." Similarly, a single parked vehicle in the history is sufficient to tentatively identify a parking space or a shoulder.

FIG. 20 shows one embodiment of lane data confidence levels, on a four-bit scale: 0=not determined; 1="in flux;" 2="possible;" 3="low;" 4="moderate;" 5="high;" 6="very high." A value of 0 means "no determination." A value of 7 means "confirmed," such as data from a government source that also matches an actual history confidence of "very high." A value of 1 means "in flux." This value is used when recent data is not consistent with a confidence level or "moderate" or higher.

A key embodiment is the method of increasing confidence level by the continual sharing of lane data. For example, each confidence level from one through 6 requires a minimum of five received instances of "original" data. Suppose a range confidence of two, "possible," requires twenty unique vehicles to have participated in transmitting V2V messages comprising a location in that lane. These message may have been accumulated by a single V2V transceiver. That transceiver may then assign a confidence level of "possible" and share that original information using a confidence level of two. If that vehicles then receives four other, original sets of lane data that are consistent, each with a A series of map dots may be readily transmitted in compressed form by first grouping the map dots into speed ranges (0 to 2, 2 to 5, 5 to 10, 10 to 20, 20 to 40, m/s, for example), then ordering the dots in each speed group by location, then using Huffman Coding.

Lane designations determined by a V2V device may be readily transmitted by including two end points, or a set of way-points, the lane designation, and the confidence level. Efficient encoding of digital map data is well known in the art. B-splines may be used. Specific features, such as the location of a stop sign, the corners of an intersection, or a lane merging area may readily be sent by sending the location of the feature and the feature type. See method of identifying geographical locations elsewhere herein.

Lanes should most generally start and end at intersection boundaries, or when the lane itself starts or ends. Lanes longer than 1 km should be cut into additional lanes whose length is in the range of 0.1 km to 1 km. For most under- and overpasses, a lane should be defined for each lane on the road(s) that starts and ends at approximately where the slope of the road starts to change from the primary road grade.

The preferred embodiment for lane data representation includes a two-bit field, coded effectively as follows: (00) means there are no known under- or overpasses that intersect with this lane; (01) means there is at least one overpass that intersects with this lane; (10) means there is at least one underpass that intersects with this lane; (11) means there is at least one underpass and at least one overpass that intersects with this lane. By underpass and overpass we mean a non-grade-level crossing that supports a V2V vehicle type (including animals, pedestrians, bicycles, etc). The preferred embodiment is that lanes be shorted so that there is never more than a single overpass and a single underpass intersecting with the lane. In a few cases, this restriction may be impossible.

A preferred embodiment is a special sub-message for under- and overpasses that describes the type of the under- or over-pass in more detail. If equipped vehicles are aware that they are such a lane segment they should transmit such a sub-message. These sub-messages substantially improve the ability of the V2V system in distinguishing traffic at different grade levels, and may also assist in safety response and navigation information. Such sub-messages should include: type of vehicles permitted; surface type; curvature direction; safety rail information; lighting; special risks (ice, flooding, glare, extreme height, etc.); toll information; and lane width. Bridges qualify for this type of sub-message.

Effective sharing of lane data requires a novel algorithm. One such embodiment is shown by example in FIG. 21. For each lane, three different counts of the unique vehicles whose V2V location points make the lane are kept. These are: (a) Total Internal Count; (b) Total Internal+Original Count; and (c) Total Shared Count. These counts are shown in three respectively labeled columns in the Figure. Lane map data is generated in one of three classes: (a) internal; (b) received as original; (c) received as shared. Transactions representing various combinations of generated or received data are shown in the respectively labeled columns in the Figure. Internally generated map data comprises locations determined by the vehicle itself, including the use of various sensors in addition to the internal V2V system; V2V messages sent, including proxy messages; and V2V location messages received in real-time. Internally generated lane map data comprises individual location points, which are "connected" to create lanes. Received as original lane data comprises data received from other V2V transceivers, (which may be communicated by various means other than V2V transmissions), wherein the data was internally generated data from that V2V transceiver. Received as shared lane data is lane data marked as "shared."

When lane data is received by a V2V transceiver, the actual lane information is compared with the internal lane information. If the lane information reasonably matched, the lane data is accepted and counts are increased, as discussed below. If there is no comparable internal lane, a new lane is created in memory or an accessible database. If the lane information does not match, counts are generally cleared and the lane confidence is changed to "in flux."

Ideally, but not necessarily, the exact locations that comprise the lane are averaged, using the various sources of lane data. Also, the averaging is based on the respective counts. Thus, in an internal count is 30, and lane data received as original has a count of 100, the weighting of the locations would be 30/130 and 100/130 respectively to determine the new "average" locations, for the end points of the lane, for example. Such averaging is not done if end points or lane data is "locked," due to its source being a calibrated and trusted source, such as government entity or formal, appropriate, lane map provider.

When lane data is shared by a V2V transmitter, it is marked by the transmitter as one of two of above named classes, either "Original" or "Shared." The "Total Internal Count" is transmitted as "Original." The "Total Shared Count" is transmitted as "Shared."

The three counts, as discussed above, are maintained as follows. Only Generated Internally Counts are accumulated as Total Internal Counts. The Total Internal+Original Count contains the sum of the Total Internal Count plus received Original counts. The Total Shared Counts contains the larger of the prior Total Shared count or the Total Internal+Original Count. Thus, to simplify: Both Internal and Original counts are accumulated, while Shared counts are not accumulated, but are maintained as a "maximum" field.

The reason for this is so that shared counts, moving repeatedly between multiple vehicles are not generally counted more than one. Original counts are assumed to generally comprise actual data from unique vehicles. This is because most vehicles within range are unique, within a moderate time period.

To avoid having original data get counted more than once (at least in a short time period), there are some restrictions. First, original data for a lane should only be transmitted once for that lane, while the transmitting V2V transmitter is within range of that lane. An exception to this rule is that a V2V transmitter may transmit such lane data twice, if it has not changed location between the first and second transmission. (Thus, a vehicle stopped at a light may transmit lane data to vehicles moving on a cross street, more than once.) Second, original data should not be used when received at a common location, such as at home and work. This is because at those locations, nearby vehicles in range will frequently be the same, day after day. Since these locations are well known, there is no reason to accumulate additional lane counts.

This algorithm is best understood by the examples shown in the number rows in FIG. 21. These counts are for a single lane. In row 1, we start this new lane with all zero counts. In row two, our vehicle has recorded locations for this lane from 20, presumably unique, vehicles. Note that each vehicle has likely produced a significant number of location points for this lane. For example, a vehicle in a one km long lane, traveling at 40 k/h, will generate approximately 900 location points. If each location "dot" is about 100 cm in diameter, these 18,000 (900*20) location points will effectively merge into a single, nearly contiguous, "lane." Simple curve fitting will provide an excellent "average" lane line.

Thus, in row 2 in FIG. 21, we see a first transaction of recording an Internally Generated count of 20 vehicles, as the lane definition is first created. Note that in the last column the confidence level is set to "2," based on the count. There may be other embodiments that use other methods to provide a confidence level.

Note that the three Count columns each now contain a value of 20. The Total Internal Count holds that total. The Total Internal+Original Count holds the same value, an no Original data has yet been received. The Total Shared holds a value of 20, as it maintains the maximum of the prior two Counts.

In the next transaction row 3, a count of 10 is received from another V2V transponder. The Received as Original count is set to 10. The lane data received is compared against the internally created lane map created in conjunction with the transaction in row 1. They reasonably match, and so they are averaged, using weighting as discussed above. The Total Internal+Original count is increased to 30, and the Total Shared shows the new maximum as 30.

In row 4, we again record another 20 internally generated counts, from presumably 20 more unique vehicles. Perhaps, we have just driven on the same lane the next day. Note that it does not matter if these vehicles are the same as the prior vehicles, because their motion in the lane is unique, as they, too, must be on a different trip. The Total Internal Count increases to 40. The Total Internal+Original count increases to 50, which is also reflected in the revised Total Shared count.

In row 5 in FIG. 21, we now receive a count of 150 marked as "Shared." We set out Shared count to this new maximum of 150. We also average the lane data between what was received and what was stored internally, because we increased the Total Shared count. We again weight the averaging appropriately. The Confidence Level is now raised to "3," because the Total Shared count has reached the necessary threshold for this confidence level.

In row 6 we receive 60 more counts as "Shared." We do not increase the Total Shared and do not perform averaging. The received data may be a copy of data we have already used.

In row 7 we receive 190 as shared. We increase the maximum Total Shared to this 190. We average, but weight the received data only as 40 (=190−150), because much of this data may already have been used in our current average lane locations.

In row 8 we again record 15 real-time vehicles' transmissions. This increased out Total Internal Count to 55 and our Total Internal+Original to 65.

In row 9 we receive a count of 70 as Original. We average this data using the count of 70, because this represents 70 unique vehicle trips. The Total Shared Count does not increase.

In row 10 receive an Original count of 100. This increases the Total Internal+Original count to 235. Since this is larger than 190, the Total Shared count increases to match this.

In row 13 we receive a count 650 as Shared. This increases our Total Shared count to 650, and also now raises the Confidence Level to 4, as that threshold has been reached.

In row 14 we receive as Original a count of 10. However, the lane data received with this count does NOT match our internal lane data. As the V2V transceiver would not transmit this lane data unless there was a level of consistency among the 10 vehicles making up this count, clearly something about the lane has changed. Perhaps there is a detour. We reset all of our counts to zero; set our Total Internal+Original Count to 10; and change the Confidence level to "1," or "In Flux."

Note that detours and accidents will have a tendency, using this embodiment, to reset high-count, confident lane information back to zero. This is appropriate, as we wish to have the most current information in our lane maps. When the detour or accident is cleared, it will not take long to re-establish the prior lane. This time, too, is appropriate, because some drivers, unfamiliar with the recent reconfiguration, may not follow the new lane boundaries. Thus, it is appropriate to keep the lane data as low confidence for a time.

Note that such changes to lanes D0 reset "high confidence" lane information that comes from an institutional source, as such lane data is likely far more current, perhaps within minutes or seconds, of the lane change.

Low confidence or "in flux" lanes increase computed risk values by increasing the risk in the "weather and road conditions" sub-risk.

When we transmit, that is, "share," lane data, we transmit our lane coordinates and the Total Shared count. If we have recently accumulated data points Generated Internally, we also merge those points into a valid lane (if possible), and send that valid lane data tagged as "Original."

In generally, we keep our lane data from internally generated location points separate from lane data that has been received as shared. This is necessary to avoid having the V2V system constantly re-average old, previously used data. However, the buffers for the internally generated lane data does not typically need to be very large. A few days worth, for example, provides a highly effective V2V map generation capability. Note that shared lane data is kept continuously, until overwritten or deleted due to a lane reconfiguration.

A V2V transceiver may send out regular, unsolicited lane map data, once per lane. These messages are low priority interval class B messages.

A V2V transceiver may send out lane data in response to a request for such data. The response to such a request is a regular priority interval class B message. In response to a request, a power and encoding should be chosen to reasonably assure that the requestor receives the requested data.

Note that for unsolicited lane data transmissions, a higher density encoding may be used; the general goal is for as many receivers to receive valid data as possible, not that the messages are widely received as valid. Using shorter messages, with the overall system sending more, may be preferable to sending longer, fewer messages, even if fewer recipients of the shorter messages are able to receive them due to the higher density encoding.

In one embodiment a vehicle desiring a lane map or a more confident lane map may request from other vehicles their confidence level for one or more lanes. Then, the requesting vehicle may direct a request to the vehicle that responds with the most confident lane map, or, in the case of a tie, the lane map from the closest vehicle, or a vehicle that will be closest in the future.

As shown below in Table 14, a 3-bit confidence level may be used to compactly describe the confidence in a current lane map. The number of vehicles shown in the third column in the Table is one suggested embodiment. A lane map is not considered usable until it reaches a confidence level of two or higher. A level of seven indicates that the lane map comes from a government or other reliable, well-calibrated source. A value of zero indicates that no confidence level for the lane has been determined. When a V2V transceiver receives conflicting lane information it must place the lane confidence at one, "in flux."

TABLE 14

Lane Map Confidence Levels

| Meaning | Confidence Level | Min. Number of Vehicles |
|---|---|---|
| Not determined | 0 | n/a |
| In flux | 1 | n/a |
| Possible | 2 | 20 |
| Low | 3 | 100 |
| Moderate | 4 | 500 |
| High | 5 | 2500 |
| Very high | 6 | 12500 |
| Confirmed | 7 | n/a |

Figure 9:
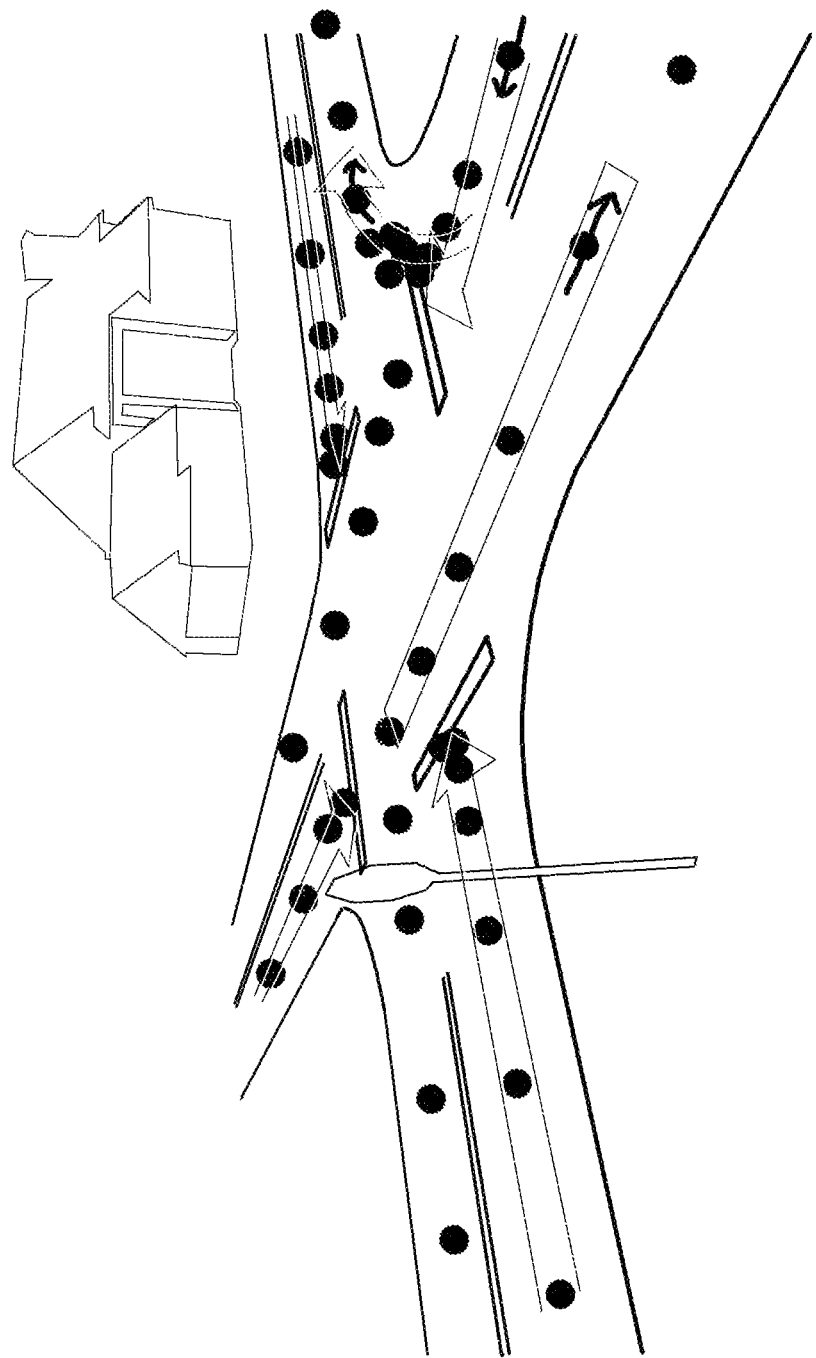
FIG. 9 shows an example of how location dots are be used to create lane maps.
Figure 12:
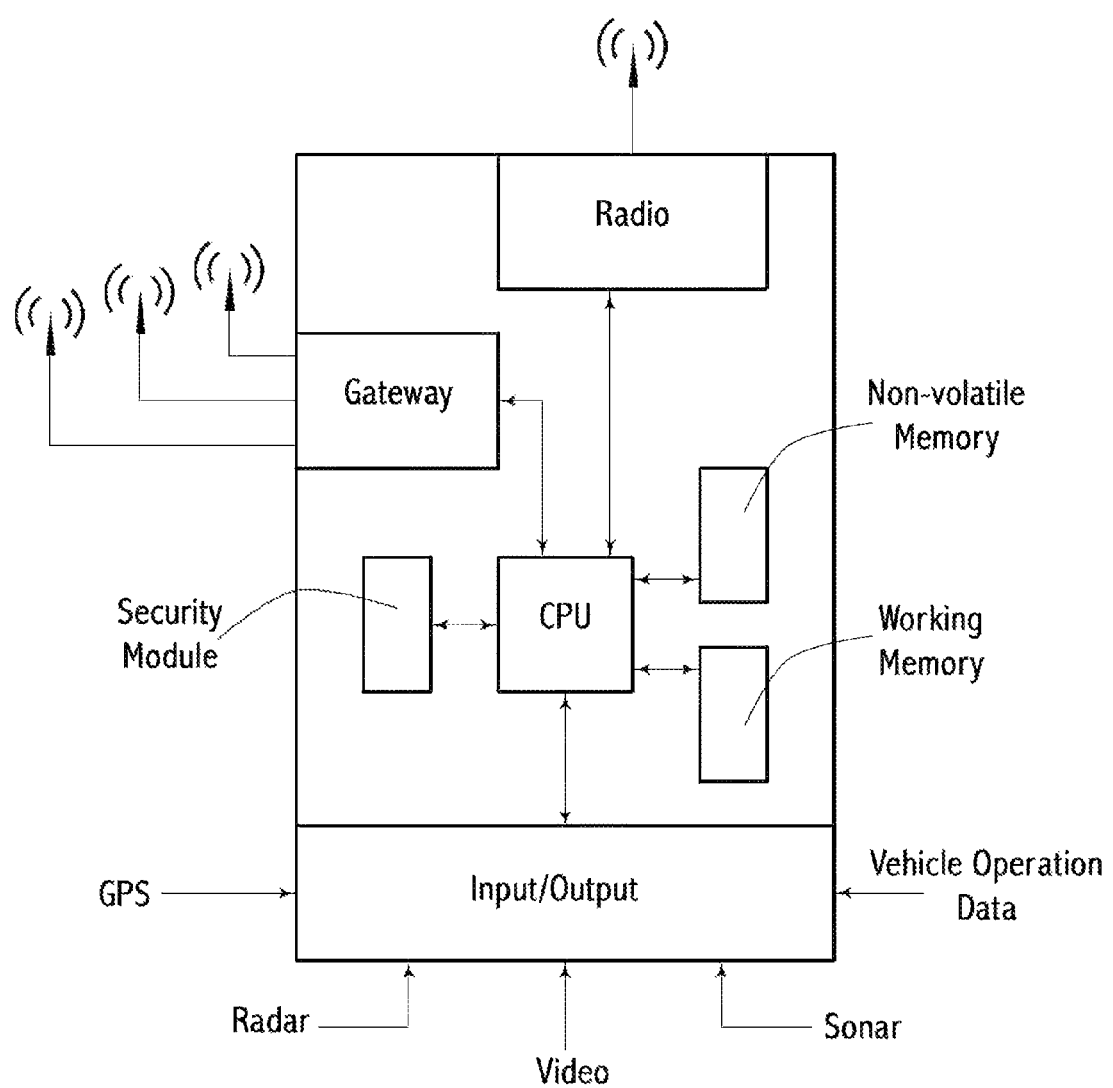
FIG. 12 shows an exemplary embodiment of a V2V transceiver.
Figure 13:
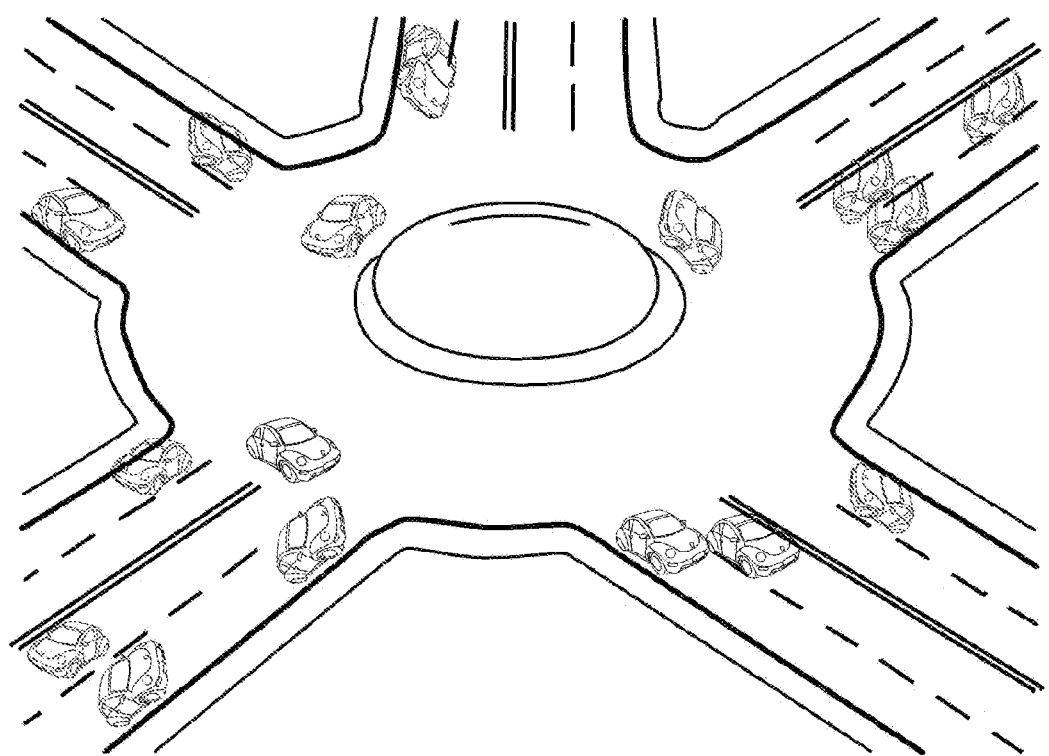
FIG. 13 shows an exemplary large traffic circle or roundabout.

FIG. 9 shows how transmitted location points may be built up to create a lane map. The dotted outlines with the arrows show potential lanes.

V2V transceivers constructing lane maps from vehicle locations in received V2V message should also record the speed and heading of each vehicle. A vehicle at a different heading than most other vehicles may be changing lanes or turning, and thus its transmitted locations, most likely, should not be used to define the lane.

As part of constructing the locations of lanes, maintaining average speed and speed distribution provides significant value. For example, this information allows a V2V transceiver to determine if a vehicle is travelling outside of a typical speed in a lane. Such a determination is an important factor in determining vehicle behavior sub-risk. Such information also is assists the V2V system in making lane recommendations. Some portions of some lanes may have a higher average speed, or generally more consistent speeds. For example, on some roads, the left lane may have to stop for vehicles waiting to make an unprotected left turn. On other roads, the right lane may slow frequently for vehicles to make right turns, such as into driveways. A large variation in speeds suggests increased vehicle spacing and increased vigilance. An example V2V recommendation is an audio recommendation to a driver to move into a faster lane; another example is a visual recommendation to a driver to move out of a slower lane. It the driver's goal, at the moment, is to conserve gas, an appropriate recommendation would be to move into the lane with the most consistent speed, on average.

Vehicle Elevation

There is a necessity for some vehicle elevation information to be present in the system. If all locations or positions were merely projected on to a surface of the earth ("a" surface, rather than "the" surface, because more than one geodetic model is possible, thus there might be more than one "surface") then on any type of non-grade-level crossing, such as an overpass, the vehicles would appear to be passing through each other. Clearly, a V2V system must be able to distinguish non-grade-level traffic from grade-level traffic. Note that this applies to train, bicycle and pedestrian overpasses and underpasses, too.

There are two specifically defined embodiments herein that address this issue. The first is to add vehicle elevation to position messages. Because elevation changes much slower than horizontal position, such message information does not need to be sent ten times per second. The recommended time interval is once per second. A specific "elevation" message is provided for this purpose. The preferred format for this message is to provide a signed 10-bit number that represents the elevation of the transportation surface (e.g. street or path) in units of 10 cm from the nearest 100 m interval above mean sea level, using the same geodetic system as for location. Thus, this number has a range of −51.2 to +51.1 meters.

A preferred embodiment is for vehicles to use a "consensus based" averaging for elevation, similar to the consensus based averaging use to achieve consistent position coordinates. For those vehicles within range of a local sensor, a vehicle averages its own best computation of "true" elevation with the transmitted elevation of nearby vehicles (corrected for detected relative elevation differences in the surface), then uses this average in future transmissions. Vehicles should minimize the rate of change of elevation broadcasts due to consensus adjustments to avoid an artifact of apparent climbing or descending. The preferred maximum rate of elevation change due to such consensus adjustments is 0.1 m/s/s.

The location on the transportation surface should be the same location used for position. For example, the elevation of the street under the front center of a vehicle.

Receiving vehicles should maintain a rate of rise (or fall) for each vehicle, as in the short term, this provides the best predictor. Also, at a critical distance for worrying about possible collisions, a street slope is in place for most under- and over-passes. A receiving vehicle may also wish to average or consider the elevation received by vehicles in front of and to the sides of a given vehicle as a way of judging the elevation or elevation change of a transportation surface.

Vehicles should use an accelerometer, inclinometer, or other inertial navigation sensors to maintain a smooth continuum of elevation changes while moving.

A second preferred embodiment is to include elevation in lane information. For relatively linear lane (segments) a starting and ending elevation may be used, although a Bézier or B-spline point at each end is preferred. For most under- and over-passes, a small set of Bézier of B-spline curves in the vertical plane are preferred. Typically three such points (each with a center location and two control points), one at the maximum (or minimum) of the overpass (or underpass), plus one each at appropriately chosen side locations are adequate. The data in the Bézier of B-spline curves should use the same 10-bit format described above.

Note that the preferred embodiment for elevation is sufficient to indicate curbs, potholes, speed bumps, and other permanent, temporary, intentional or accidental variations in surface height. For the purposes of safety, high precision (say, 1 cm) in not necessary in representing these objects, only that that exist. Thus, identifying an object (by type, such as curb, pothole or speed bump), or simply as a lane discontinuity, using described data formats for either vehicle height or lane elevation, is supported in the described embodiments. For example, if a vehicle hits a pothole (recognizing that the pothole is most likely under a wheel, not in the center of the lane), it might choose to broadcast three elevation messages in succession (say, 0.1 s apart) indicating the effective elevation change. Even with a single bit change (10 cm) receipt of such a message sequence is a clear indication of the object.

Similarly, as a pedestrian steps off of a curb, a mobile device (a smart phone, using, for example, its internal accelerometer) could broadcast that elevation change, allowing V2V equipped vehicles (and mobile electronic devices receiving V2V messages) to record the curb. In this way, "curb maps" could be created easily, without the need for a government entity or third party to create and distribute such a database.

The most preferred embodiment is the use of both elevation messages every second from vehicles plus elevation information included in all lane descriptions.

Note that the "once per second" transmission rate (or other predetermined rate) should have some dither imposed on the time interval, or at least randomly selected initial transmission time (within a one second window), so that such elevation messages to not tend to "clump" in time.

Note that vehicles may generate their own, internal, stored, set of non-grade-level crossings, in a minimal case, by observing that a number of vehicles appear (using surface of the earth locations) to be passing through each other.

Forwarding

In some embodiments, a message is "forwarded," that is retransmitted by a recipient. When a message is forwarded, the Forwarded Flag in the Flags field of the message header is set to one. There are two basic modes that limit the extent of forwarding: hop count and geographical distance. When a message is forwarded, the hop count is increased by one. When the hop count reaches a threshold, forwarding is stopped. Ideally, the hop count threshold is a function of the risk value and the message type.

The second mode to limit forwarding extent is use of geographical distance. When the distance between the location in the message and the location of the potential forwarder exceeds a threshold, forwarding is not done. This mode has an advantage over hop count. Consider the case of an accident at the side of the road. There is oncoming traffic from both directions. Suppose the forwarding threshold is one kilometer. The approaching traffic is continuously reducing its distance to the accident, while the receding traffic is increasing its distance. Therefore, there are likely to be more hops in the direction of the approaching traffic than in the direction of the receding traffic. This is appropriate, as the "one kilometer range" is relevant for its distance, not the arbitrary number of hops it took a caution message to reach a vehicle.

This example brings up another aspect of forwarding. The value of some messages is direction dependent. For a problem in a fixed road position, the value of a warning message is particularly relevant for approaching traffic, and less relevant to receding traffic. Note, however, that receding traffic serves a function as forwarding the message to oncoming traffic, which otherwise might not receive the message at all.

However, if the warning is of a vehicle exceeding the average speed of vehicle, such as might occur with an emergency vehicle, or a high-speed chase, the warning is particularly relevant to vehicles ahead of the message origination location.

Thus, a key embodiment is the use of direction-dependent forwarding where the forwarding threshold is a function of the message type. We define "forward-flow forwarding" as forwarding in the direction of traffic flow, and "reverse-flow forwarding" as forwarding in the direction opposite traffic flow. Similarly, we define "side-flow forwarding" as forwarding that is neither forward-flow nor reverse-flow. Originally, the direction of traffic flow is defined by the nature of the problem or the direction of the original sender (or proxy subject vehicle). Generally, this directionality should be preserved. However, forwarding by a vehicle moving in a different direction than the original transmitter may serve to effectively change the effective base direction of traffic flow for these labeling purposes. As core information includes velocity, it is normally a simple matter to determine direction of forwarding.

All message forwarding introduces a potential problem of exponential growth. If all vehicles that receive a forwardable warning retransmit the message, the number of retransmissions could grow rapidly. Thus, a mechanism needs to exist to limit the number of retransmissions.

The preferred embodiment for this mechanism is particularly elegant in the context of V2V. Forwarded messages should generally include the current location of the transmitting vehicle. The original message being forwarded contains the original location. Each vehicle listening to the forwardable or forwarded message knows its own location. Each listening vehicle computes the distance from the transmitting vehicle to the message origination location. Each listening vehicle also computes the distance between itself and the message origination location. Finally, each listening vehicle also computes the angle formed by the forwarding vehicle to the originating location to the listening vehicle. If the forwarding vehicle is farther than the listening vehicle from the originating location, and the computed angle is less than a fixed threshold (such as 30°) then the listening vehicle does not forward. In this sense, the forwardable message has already "passed by" the listening vehicle. If the computed angle is more than the threshold, and there is no vehicle that has already forwarded the message farther away within (less than) the angle, then the listening vehicle forwards. This allows the message to be forwarded along each road leading to an intersection.

In addition, a listening vehicle may not forward if the number of copies of the forwardable message heard within a single basic time interval exceeds a threshold, such as three.

Consider the case of collision that just occurred in an intersection. The collision is detected by at least one vehicle (which may or may not be involved in the collision) and a message is sent with risk value 10 ("accident occurred"). This is a forwardable message. Say that there are fifteen cars within range of the transmitting vehicle. As the message has not yet been forwarded once, many of these vehicles will start to forward. Thus, the next basic time interval is likely to have multiple copies of the original message. This is appropriate both because of the urgency of the message and the fact that each of the forwarding vehicles has a slightly different range. However, some of the close-in vehicles notice that the there are more than four copies in the basic time interval, so they do not need to "add their voice to the fray." The forwarded messages are then used to compute distances and angles by all the vehicles in range of the all vehicles that generated the first forward. This might now be 25 vehicles. The message will quickly propagate, with a minimum number of duplications, up each road leading to the intersection.

Note that each message being forwarded has a limited lifetime. For example, suppose a message has a forward limit of one mile and 15 hop counts (the limit could be either the lessor or the greater of these two limitations). If it is retransmitted 15 times, with a spacing of one basic time interval of 0.1 seconds, the message likely dies after 1.5 seconds (assuming 15 forwards). However, the accident is still in the intersection, and is likely to be there for some time. As new vehicles approach the intersection, observe the obstruction, and do not detect any messages being broadcast about this obstruction, they will initiate an appropriate message, which depending on the risk value in the message, will again be forwarded. Thus the overall system of this embodiment has a limited life for forwarded messages, but provides for regeneration of messages broadcasts risk using rapidly updated information.

Emergency vehicles have slightly different rules. For example, an emergency vehicle on a scene may continually broadcast warning messages, the same way that a roadside barrier may continually transmit a warning.

There is an embodiment that uses a third method of limiting the lifetime of forwarded messages. This method uses time. If a message is time-stamped its forwarding life may be limited by age. A typical maximum age of a forwarded message is two seconds.

There is an embodiment that uses another method of limiting the number of duplicated forwarded messages. This method calculates a probability that other vehicles in range of the original transmitter are capable of forwarding. Then the vehicle chooses a random number threshold so as to reduce its own odds of forwarding, in order to achieve an overall average duplicate forwarding percentage. Each equipped vehicle is aware of the number of other vehicles within range. This number is used to create a probability of retransmission. For example, if there are ten vehicles in range, a reasonable estimate of the number of possible forwarders is ten. Suppose the target number of duplicate forwarded messages is four. Therefore, on average, four of the ten possible forwarders should actually forward in the next basic time interval. If a random number range is between zero and one, a retransmit threshold of 0.4 accomplishes this goal. Note that no forwarders are detected in the next basic time interval, the process is repeated. Thus the odds of no transmission of a forwarded packet for any length of time are small.

Distance based forwarded packet lifetime limitation is the preferred embodiment, with hop-count the second preferred, and age-based the third. Note that all thresholds should be (but do not need to be) both risk-based and message-type based and may also be based on other factors. A system may use hybrid lifetime limitation methods.

A preferred method of limiting duplicate forwarded messages is to the previously described first message in the basic time interval method, with the above statistical method less preferred.

Forwarded messages ideally contain both the original information and information about the forwarding vehicle. However, that is not required. The information in the forwarded message may be far more urgent than a transmission of core information with a low risk value about the forwarding vehicle. The forwarding vehicle may "borrow" its own time slot to send the forwarded message.

Forwarded messages are usually sub-messages. Additional sub-messages may be included with the forwarded sub-message to identify forwarding information, if appropriate, such as hop count.

Hacking and Security

Hacking of any electronic V2V system is inevitable. Preferred embodiments include methods to identify improper use and record such use in order to discourage, catch and prosecute hackers. We refer any abuse of a V2V system, any intentional false information or blocking of valid information as hacking.

One possible form of hacking is to hide a transmitter near a roadway that transmits invalid information. It the transmitter broadcasts its correct location, then presumably finding and stopping the hacker is straightforward. Vehicles could record the location of a possible hacker and forward that information to authorities. Such activity is ideally completely automatic and involves no actions, knowledge or approval of the vehicle's occupants.

Thus, it seems unlikely that hackers wish to broadcast their correct location. Radio waves travel about one meter in 3 ns. The GPS time base is generally considered accurate to about 14 ns, but many V2V implementations will improve on this accuracy. Because the start of each time slot is fixed by the GPS time base at the transmitting vehicle, the distance from a transmitting vehicle to the receiving vehicle may be determined by timing the message frame within the time slot as seen by the receiving vehicle. For example, if the distance from the transmitting vehicle to the receiving vehicle is 200 meters, the frame will be delayed about 667 ns.

By timing received frames within the receive time slot, V2V receivers will generally be able to determine the approximate distance to the transmitter. If this distance is not within tolerances to the location being transmitted, there is a problem. The problem may be a hacker, or a failed V2V transmitter. Either way, this represents a significant risk to the network and information should be recorded and the risk broadcast.

A hacker may be sophisticated enough to also spoof the GPS time base, essentially setting his own transmit time. However, he can make this spoof work with receivers at disparate locations. For example, as a receive vehicle passes by a transmitter, the delay of the received frame in the receive time slot should get shorter until the two V2V transceivers are at a minimum distance, then get longer. Thus, even if a sending time is spoofed, unless they are random, a receiver will be able to tell the "closest point" to the hacker. The sending of random or arbitrary time delays is essentially a smoking gun of hacked transmissions.

Wide spread alarm by all receivers that a hacker is within range should bring authorities, with directional receive antennas and other tools, quickly to the scene.

In a denial of service (DoS) attack, once vehicles are out of range of the hacker, they may easily send appropriate alarm messages.

Some people are concerned that a V2V system should be immune to hacking and provide some level or sender confidentiality. Such concerns are seriously misplaced.

First, any electronic communication system is subject to abuse. We have email and phone spam. We have vehicles on the road today that are neither safe nor legally compliant nor insured. There are a great many ways to hack, spoof, or misuse ANY V2V system. Even if the communication protocol were bulletproof, which it cannot be, sensor input to the V2V systems is nearly trivial to spoof. Everything from GPS position to information from radar detectors to video feeds is easy to alter. Denial of service attacks and just plain jamming are trivial to implement.

The basis of public usability will be both legal ramifications to abuse; public acceptance of the system; and an understanding of the risks of abuse. People can now throw rocks at cars, dump nails on the street, or shoot out signal heads. Yet, these events are quite rare. Therefore, it is not reasonable to expect that complex electronic protection will be either required or effective against intentional abuse designed to cause harm.

Vehicles are not anonymous. They are large, visible, and have license plates. Considering that every usable and valid V2V packet has a transmitter's location in it, it is a simple matter to identify the transmitting vehicle through visible means. Other means, such as directional antennas or crowd-based or statistical identification may be used for a transmitter who attempts to illegally be invisible. Thus, there no little reason to add attempted anonymity into a packet. In fact, a sender ID may be highly valuable. The ID is easily done in a way that provides some control against abuse, such as using hashed VIN numbers, or assigned ID numbers from a gov't agency, or using a built-in transmitter ID. Such identification numbers are difficult for a general consumer to trivially trace back to a specific individual.

Using the vehicle's location as its ID provides adequate ID for V2V application purposes.

Recording and Encryption

In some embodiments, all messages transmitted or received are stored. In some embodiments, a fraction of all such messages are stored. A preferred embodiment is storing a fraction of all transmitted and received messages that exceed a risk threshold.

In some embodiments, deletion of stored messages may be blocked except by a qualified technician or by the entering of a special code. For example, if an accident is detected, the storage of messages around the accident (both temporally near and spatially near) may be valuable in determining fault. Government based roadside transmitters or emergency vehicle based transmitters may instruct equipped vehicles, via a transmitted V2V message, to both store messages and to block deletion.

In order to maintain privacy of vehicle operators, stored messages may be encrypted. Public key cryptography may be used so that either the owner's private key, or a government entity's private key, or both, are required to recover the cleartext messages.

It is sometimes valuable to send a message via the V2V system that the sender wishes only one particular recipient, or one particular recipient class, to be able to read. There is an encrypted sub-message to support this. The preferred embodiment is the use of intended recipient's PLI public key to encrypt the message. Then, only the recipient (or the recipient class, such as a police department or public works), is able to decrypt the message using the recipient's private key.

It is sometime valuable to send a message than may be authenticated. A signed message sub-message format is available for that. The preferred embodiment is for the sender to generate a hash of a message combined with the sender's private PKI key. A recipient may use the sender's public key to authenticate the message.

Messages may be both encrypted and signed.

Note, however, that the primary purpose of a V2V system is safety. The use of secret or private messages rarely contributes to public safety. PKI keys may be used directly with V2V messages, rather than the more complex, bi-directional steps used typically to implement virtual private networks (VPN), because the size and quantity of the messages is highly limited. The sub-message formats for encryption and signing may be used in one-way and one-time transmissions, with no advance activity between the parties required. PKI certificates are widely available.

Encrypted and signed messages, due to their necessary length, should be sent class B messages. They may be linked to a class A or class C message by the use of vehicle location as an identifier.

Having access to information about the vehicles involved in a collision is valuable in determining fault, or relative contributory fault, and also in shaping future safety elements and laws to improve future driving and road safety.

However, privacy concerns cause drivers and vehicle owners to wish to not have information about their driving history available to others.

A preferred embodiment provides a solution. Information available to the V2V device is stored in encrypted form, using public key infrastructure (PKI), where the information is encrypted using the public key of a law enforcement agency and the private key associated with the V2V device or its owner. This information may only be decrypted using the private key of the law enforcement agency. This means that the stored information is (a) only available to selected government parties and only after due process or suitable regulations restricting and controlling such activity; and (b) the information is "signed" by the private key, reducing the chance that the information has been placed in storage fraudulently. For example, it would be difficult for police or a hacker to "plant" information in memory unless they had access to the associated private key.

Additional assured privacy is available if the information encrypted is also encrypted by the public key of a third party, such as an automobile manufacturer, an association representing the interests of drivers, or the driver's insurance company. To then decrypt the stored information requires the private keys of both the law enforcement agency and the third party. Such a process would generally be available only via a court order, assuring both full due process and additional safeguards against inappropriate decryption.

Traffic Signal Optimization

A V2V system, in embodiments described herein, has the ability to dramatically improve traffic flow in congested area without the expense and land needed to build additional lanes or expensive air structures.

The basic operation consists of traffic signal controllers ("signals") listening to V2V messages of vehicle approaching the intersection, then altering its timing for improved or optimized performance. Improved performance criteria may comprise (i) minimizing total vehicle delay; (ii) minimizing total person-minute delay; (iii) minimizing total fuel consumption; (iv) maximizing the total number of vehicles that pass through the intersection in a particular period of time; (v) providing differing quality of service (QoS) to different classes of vehicle; (vi) participating with other signals to optimize traffic flow over a wide area; (vii) combinations of these criteria and other criteria.

Prior art typically consists of a fixed length total cycle with binary lane sensors to control phase timing. While this technology is a large improvement over fixed phase timing, it is simply unable to optimize over a larger area, where the real strength of a V2V based signal optimization becomes significant.

Prior art signal engineering comprises counting vehicles to create a statistical foundation for the intersection design and signal timing. Phase timing is then adjusted by sensor primarily so that a phase does not stay green where there is no vehicle present to take advantage of that phase.

The preferred embodiment of this feature has the signal collect all the V2V messages for vehicles with range that are approaching the intersection. The signal then runs simulations of different timing patterns in order to find an optimum timing, base on the selected criteria for "optimum." One improvement over prior art is variable length total cycle time. Another improvement is arbitrary phase sequencing. Yet another improvement is lower "all red delay" and reduction of other inter-phase delays. The reason that prior art uses certain phase sequences and certain inter-phase delays is to assure that all of the vehicles from one phase have cleared the intersection before enabling ("turning green") the next phase. With V2V messages, the signal considers the location and speed of every vehicle clearing the intersection in order to turn on the subsequent phase with an optimally short delay. In fact, the entire concept of a fixed length total cycle should be abandoned in favor of simulation based timing. A consideration is the "worst case delay" that a single vehicle or pedestrian may have to wait. Such a consideration would be built into the signal-timing algorithm. Note however, that in such an optimized traffic environment people, in general, will be willing to wait longer at a given signal if, overall, their trip time is shortened. Note, also, that through V2V the exact time may be provided to the waiting driver, helping to avoid frustration due to the delay. Yet another advantage is the shortening of the minimum phase time, based on the actual time it takes for vehicles or pedestrians to clear the intersection.

In one embodiment, a signal operates "stand-alone," meaning it considers the V2V messages and optimization in the context of its own intersection.

In a preferred embodiment, adjacent signals communicate with each other their "proposed" upcoming signal timing. Then, each signal re-computes its simulation based planning. It then communicates this revised plan to appropriate adjacent signals. Multiple signals continue to simulate, plan, share, and adjust their proposed, then actual, timing in order to reach a more optimal overall timing than is possible to achieve in any isolated signal-timing scheme.

As people trained in the art will appreciate, such a system will develop patterns. For example, it may be common that a large group of vehicles passes through a series of lights unimpeded, only to be frequently stopped at a particular cross street. Drivers who frequent this area will then adapt their behavior to this pattern. They may slow, speed up, space themselves appropriately, or take different routes to take advantage of an expected pattern.

Thus, in the long run both the signals and drivers will evolve their behavior to provide increasingly optimized overall traffic flow.

The cost of implement V2V electronics, including the necessary software and hardware to implement real-time simulations is very much less than cost of building additional lanes.

Improved traffic flow increases overall productivity in a society, because less time is wasted in traffic.

Improved traffic flow improves the overall GDP of an economy by reducing the total amount of fuel used in that economy.

Proposed signal timing messages may comprise in part lane endpoints and time stamps, both discussed elsewhere herein. For example, one lane endpoint and two timestamps would indicate a proposed green phase for that lane. An additional field may comprise an expected vehicle count for that phase. If the lane enters the intersection the count indicates the expected traffic to move from that lane into the intersection. If the lane exits the intersection the count indicates the expected traffic flow out of the intersection in that lane.

In this way, a signal may communicate to adjacent signals its expected traffic flow for any lane for any period of time in the next 23 hours. Signals, may, if appropriate, forward this information to their own adjacent signals. In this way, traffic at a distance, such as on an expressway, may be forward communicated to signals more than the direct V2V range away.

Time stamps less than an hour in the past indicate past (actual) flow. Time stamps from the present moment up to 23 hours in the future indicate expected flow.

Consider one scenario. A city has extensive cross-town commuter traffic. Much of this traffic commutes to businesses within the city. The city desires to optimize the experience of employees and businesses within its borders. Thus, it implements priorities for the signals on streets and expressways so that commute traffic to work in the morning and from work in the afternoon is provided with a higher QoS than either traffic in the opposite direction or cross-traffic. Considerable time delay and throughput improvement is possible with the embodiments described herein.

Similar scenarios apply to large events such as ball games, or students, faculty and staff entering and leaving a college campus.

Consider another scenario. Traffic heading north is given QoS preference from the hour to half past the hour, such as 8:00 to 8:30. Then traffic heading south is given preference for the second half of each hour. People will learn such QoS preferences, and in many cases be able to adjust their schedule to take advantage of the shorter and more comfortable travel experience. The QoS preference may be substantial, such as no red lights at all, once a vehicle is synchronized with a block of moving vehicles. The additional delays to non-QoS traffic are nominal, because the total phase times at each intersection remain the same—only the synchronization is changed.

Prior art for intersection design uses fixed lane designations, such as straight through or turn lanes. The lane designations are typically designed in conjunction with phase planning. For example, if a particular lane is used for both left turn and straight through, then it is desirable to have a green left turn and a green straight on at the same time.

However, with the V2V-based simulation embodiments as described, lane designations may be variable. Electronic signage may be used to indicate lane function, rather than painted arrows and fixed signs. In addition, V2V messages describing lane functions would be sent regularly (as gov't provided lane maps) by the signal to vehicles, so that equipped vehicles would automatically know lane assignments. In this way, considerably improved signal flow optimization is possible. The cost of electronic signage is far less than the cost of building additional lanes.

In many areas, traffic flow changes dramatically with different times of the day or different days of the week. Earliest in the day are commercial delivery vehicles, then commuters going to work and parents dropping off kids at schools. Then, there is a lull, followed by shoppers, then afternoon rush hour. Then, people go to restaurants or theaters. Prior art intersection design is unable to accommodate these variations in traffic flow. The real-time simulations and optimizations discussed in embodiments herein does adapt to these daily fluctuations.

Signals may request and use predictive movement messages, discussed below.

Table 15 below shows one embodiment of a dataset that describes a planned, current, proposed, or past signal phase for one lane. Typically a message could contain a message length, or number of lanes in the message, then as many of these datasets as necessary. There could be up to one dataset for every lane entering and leaving the intersection. The eight flags are reserved. Flags may be used to indicate protected v. unprotected turns, for example. A flag may be used to indicate a closed lane. For each lane, an end-point, typically at the boundary of the intersection is provided, using the standard two Location fields described above, herein. Two timestamps mark the start and end of a phase, when the light is "green" for that direction, in essence. Then the lane type is provided using standard lane type encoding, and a heading for the lane using standard heading encoding. The lane type and heading are not strictly necessary, but are convenient in removing ambiguity. There is also and advantage to vehicles monitoring these messages, as discussed below. The Vehicle count contains a 10-bit unsigned integer.

TABLE 15

| Dataset for Signal Lane Traffic Flow Signal Lane Traffic Flow Dataset | | |
|---|---|---|
| Field Name | Size in bits | Format |
| Flags | 8 | |
| Location N-S lane end point | 24 | |
| Location E-W lane end point | 24 | |
| Start time stamp | 32 | |
| End time stamp | 32 | |
| Lane type | 8 | |
| Heading | 10 | |
| Vehicle Count | 10 | |
| Subtotal bits per lane-phase | 148 | |

In one embodiment V2V equipped vehicles listen to signals broadcasting the upcoming phase timing, using the above message format. The V2V transponder and the driver use this information to optimize behavior approaching a signal. For example, knowing when the light will turn green allows a vehicle to choose a speed that avoids a stop and then an immediate start. Or, knowing that the light will turn yellow shortly allows a driver to begin slowing. Or, knowing that the light will turn yellow shortly allows a driver to potentially speed up to just make the light while staying with legal and safe speeds. Alternatively, a driver may change lanes into a faster lane in order to make the green light. The V2V system might suggest such actions to the driver, or perform them automatically.

In one embodiment the information in the above Table is also used by vehicle to know the current function of a particular lane. This is particularly valuable for signalized intersections where lane functions are dynamic.

In one embodiment the information if the above Table constitutes lane calibration information. By providing an exact location (the center) of a lane, and the lane type, and exact lane heading, vehicles passing through the intersection may calibrate their own positions. All vehicles will then be fully position calibrated. If V2V equipped vehicles have lane maps, they may fully calibrate at least one end-point of each lane terminating at that intersection, the lane type, and the lane heading.

In another embodiment, the first time stamp may be shortened to 20 bits, encoding tenths of a second from 0:00:000 for the start of the phase; while the second time stamp is shortened to 12 bits, indicating the number of tenths of a second the phase lasts. The message comprises the location in 24-bit/24-bit format for the center of the intersection, then, all lane end-points are offsets from the center point in signed 12-bit format. These two changes for this embodiment shorten the data set from 148 bits to 92 bits.

Predictive Vehicle Movement

In one embodiment, V2V vehicles estimate the future movement of the vehicle. There are two modes for doing this. In one mode, a route or destination has been programmed into the navigation system in the vehicle. Typically, the driver will follow the navigation plan and commands. In a second mode, the vehicle has traveled this route multiple times in the past. The route taken most frequently is then the route predicted. Time of day or day of week may be a consideration in making this determination.

Note that these predicted movements are prior to an intersection, or, typically, prior to entering a turn lane.

There are at least three uses for this predictive movement data. First, other vehicles may take advantage of these predictions to plan their own lane changes or other behavior, such as slowing down (particularly when behind a driver who slows to turn, but fails to signal). Second, vehicles may use these predictions to improve the behavior of the driver of the vehicle, such as automatic deployment of turn signals. Third, signals may use this information to closely estimate the number of vehicles desiring each light phase and the location of those vehicles, in advance of finalizing phase timing.

The data required to predict movement as described in this embodiment is particularly compact. As shown below in Table 16, only 24 bits are required. The Future lane type is selected to pick an appropriate lane for the expected movement, such as a turn lane or straight through lane. Such a lane might not actually exist at the intersection, but intent is clear. The next field encodes the distance from the vehicle to the movement. The units are meters. Up to one km may be encoded. Typically, this is the distance to the next intersection (based on the vehicle location at the end of the basic time interval in which this sub-message is transmitted). However, in some cases, such as a driveway, this distance may not be the distance to an intersection.

Note that such movement of the vehicle is not mandatory—it is merely being predicted by the V2V transponder. Note that the location, direction and speed of the vehicle are known, as these are core vehicle data.

Predictive Movement sub-messages may be broadcast in advance of a turn, or upon request.

TABLE 16

Predictive Movement Sub-message Format
Predictive Movement Sub-message

| Field Name | Size in bits | Format |
| --- | --- | --- |
| Sub-message type | 6 | value = 18 |
| Future lane type | 8 | lane type |
| Distance | 10 | integer meters |
| Total Bits in Sub-message | 24 | |

Vehicles Optimizing to Learned Signal Timing

In one embodiment an equipped vehicle learns the timing of traffic signals. This learned traffic signal timing information is stored. Stored traffic signal timing information may be transmitted via V2V messages. Stored traffic signal timing may be uploaded to an internet cloud using a non-V2V communication means. Ideally, such stored traffic signal timing information is used as part of the V2V transceiver's risk assessment computation. Many modern traffic lights operate on a fixed cycle time using GPS for a time-base and 12:00 am as a starting point for the cycles. By observing one full signal light cycle it is often possible to calculate all of the times throughout the day when the light is going to change. Thus the V2V transceiver will often be able to compute ahead of time if a light is going to change from red to green, or green to yellow. More sophisticated timing parameters of a traffic signal may be determined by observation. For example, the sequence of "phases" in a signalized intersection are usually fixed. This sequence may usually be learned by observing one complete cycle. Knowing the phase sequence allows a more accurate prediction of the next phase. For example, observing a yellow light in a previous phase, or observing moving traffic in that phase come to a stop at the intersection indicates that a green light for the next phase is imminent. As a second example, a minimum green time and a maximum green time for a phase is a common limitation. The minimum green time may be observed if only a single vehicle is available to take advantage of a green light in a phase. The maximum green time may be observed if there is heavy traffic in a phase, but the light changes from green to yellow anyway. The knowledge of maximum green time for a direction that a vehicle is headed may provide a "stale green" warning that permits an accurate computation of the exact time that the light will turn yellow. With this information, the V2V system of this embodiment is able to provide clues to a driver to prepare to stop, speed up to make the green, change lanes to make the green, or other useful information. With this information the V2V system of this embodiment may be able to compute a high-risk situation earlier, such as a vehicle approaching a stale green light at high speed. Similarly, the V2V system of this embodiment may be able to observe a vehicle approaching an intersection at high-speed in a cross street or oncoming lane, with the knowledge that the vehicle will not be able to stop in legal time, even though the signal light(s) visible to that high-speed vehicle are not visible to the V2V system.

Parking, Courtesy Messages and Gateways

Parking lot information is shared between V2V equipped vehicles, adding to the immediate perceived value to owners and encouraging rapid penetration.

"Courtesy messages" are fully supported to add value to the system and support more complex improvements in overall safety.

Courtesy of drivers is a fundamental aspect of safety. Courtesy sets a standard of behavior that other people follow. The courtesy of using turn signals provide an accurate and advance indication of vehicle behavior. The courtesy of not blinding oncoming drivers by failing to lower high beams avoids blinding those drivers. Operating a vehicle in high-courtesy conditions reduces driver stress.

Embodiments of this V2V system provide methods and capabilities of encouraging polite behavior.

"Courtesy messages" are generally in the non-safety message class, even though they contribute to safety. Some behaviors may generate both a courtesy message and increase risk values.

Consumer Reports magazine, in their April, 2012 issue, page 13, identified the top 20 complaints about rude drivers. Having encodings for these 20 complaints and the ones following cover a large fraction of all rude driving behavior. The complaints are, from highest complaint rate to the lowest: texting on a cell phone while driving; able-bodied drivers parking in handicapped spaces; tailgaters; drivers who cut you off; speeding and swerving in and out of traffic; taking up two parking spaces; talking on a cell phone while driving; not letting you merge into a lane; not dimming high-beams when approaching; not using turn signals; slow drivers in the passing lane; jaywalkers stepping in front of your car; excessive horn honking; slowing down to rubberneck at accidents; not turning on lights when it's raining or at dusk; drivers who are indecisive about where to turn; slow drivers who won't pull over on a two-lane road; not going when the light turns green; bicyclists who don't let you go by; cranking up the radio volume. Additional courtesy messages could include: not pulling completely in to parking spaces; taking up more than one traffic lane; stopped in a parking lot isle, rather than moving; vehicles that fail to yield to bicycles; vehicles that do not stay fully within lane markers often driving partially on a shoulder or bicycle lane); passing in the parking lane; non-functioning brake lights; unsafe loads; not moving to the right when moving slower than other traffic; using HOV lanes improperly; using bus lanes improperly; driving too fast in a parking lot; sticking into a traffic lane.

In some embodiments detection of some rude behavior and sending of courtesy messages is automatic within the V2V system.

However, often it is the driver or passenger who detects the rude behavior. Often the decision to send a courtesy message should be up to the driver's discretion, not up to the automatic algorithms in the V2V system.

Thus, it is necessary for the driver to provide two basic inputs to the V2V system regarding courtesy messages. One input is identification of the vehicle that courtesy message concerns. The second input is the rude behavior to be identified in the courtesy message.

Hand gestures of the driver are a preferred embodiment for the first input, such as pointing at a vehicle.

Voice identification of the courtesy message is a preferred embodiment for the second input. The two inputs maybe provide by the driver or passenger in any order, or at the same time.

An alternative embodiment for entering one or more courtesy message inputs is via a touch screen.

An alternative embodiment for entering one or more courtesy message inputs is via an app on a personal mobile electronic device.

Courtesy messages received are stored, in one embodiment. Such messages received may be used for several purposes. One such purpose is feedback to the driver so that the driver may improve his or her future driving courtesy. Another such purpose is to provide a parent with quantitative indications of their child's driving performance. Another such purpose is for use in driver training. Another such purpose is by a court, which may require such information as part of a penalty, or to assure conformance to a court order. Another such purpose is by a court to analyze the recent behavior of a driver just prior to an accident. Another such purpose is by an insurance company, which may provide a preferred rate for drivers that meet certain thresholds as determined at least partially by such stored courtesy messages.

Note that some courtesy messages may be positive in nature. For example, a vehicle in heavy traffic that stops to allow another vehicle to enter a crowed lane. Another example is a vehicle that stops in heavy traffic to permit a turn or cross traffic across his lane. Another example is a vehicle that yields in a situation where the right-of-way is uncertain or unusual. Another example is a vehicle that stops prematurely in order to assure that a cross-lane remains clear, perhaps when a light ahead changes to red.

In one embodiment the driver may signal a warning, called a "driver-initiated warning." This could be via button on the steering wheel, easily accessed like a horn. This warning indicates that the driver sees either a vehicle or road condition that the driver views as risky. In one embodiment, when this warning is initiated by the driver, the transmitting vehicle transmits proxy information on the identified risk-causing vehicle, along with the indication that a driver warning was given. For example, a driver may see another driver talking on her cell phone, or turning away from an observant driving position. A driver-initiated warning may also be "automatically" generated by any emergency action, including but not limited to: using the horn, swerving, sudden braking, unusually fast acceleration, rough road surface, slippery road surface, use of dynamic traction control or anti-skid braking control, detection of an accident, deployment of airbags, or use of emergency flashers. A driver-initiated warning is an example of a courtesy message. The subject vehicle may be equipped. By proxying such a subject vehicle, with the risk identified, constitutes one form of a courtesy message.

In one embodiment, if a receiving vehicle receives a driver-initiated warning from more than one vehicle, the receiving vehicle upgrades its internal risk assessment. This mode is, in a sense, a "crowd-sourced warning" to other drivers of an unsafe local condition.

Several variations of V2V protocol apply to parked vehicles. First, vehicles in a parking lot should generally continue to monitor received V2V messages. When a nearby vehicle is detected that is moving (rather than parked), transmission should resume as normal. If there has been no nearby moving vehicle for a while, such as five or ten seconds, the parked vehicle may change into "parking lot mode." In this mode the vehicle makes an occasional transmission of its location, such as once every five seconds. Interval class B should be used for these parking lot mode transmissions. A reasonable distance for this "nearby" threshold is 20 meters for slow moving vehicles (less than 10 m/s). If there are fast moving vehicles nearby (greater than or equal to 10 m/s) then the "nearby" threshold should be increased to the normal range.

Another change in parking lot mode is reduced power. In a large parking lot, where all nearby vehicle are parked or moving slowly, range may be restricted by lowering power.

Broadcast Versus Point-to-Point

It is worth discussion how the current V2V safety notification system works compared to any proposed V2V safety system.

The current system is based on two communication technologies: the horn and the siren. Both are broadcast: everyone within audible range hears a horn or siren. There is one level of risk. Either a horn is on or not.

There are perhaps two bits of information in such a broadcast. A horn toot may be short, medium or long. In general, a short toot indicates a courtesy; a medium toot indicates a non-critical problem; a long toot indicates a serious safety alert. Sirens often have two modulations: one for when the emergency vehicle is braking, and one when it is not braking.

This prior art system has functioned effectively on every continent for over 100 years.

Some V2V systems proposed are filled with information and features extraneous to the V2V application. Such information as privacy, security, authentication, MAC addresses, IPv6 addresses, and point-to-protocol establishment and tear-down are unnecessary and add overhead, cost, complexity, delay, and obscurity. Such unnecessary and inappropriate features consume important bandwidth, delay receipt of critical messages, are fundamentally neither real-time nor deterministic, and will significantly delay introduction, acceptance, deployment and use, thus negating the entire purpose of V2V systems.

Time Base and Timestamps

The preferred embodiment for a time base is Coordinated Universal Time (UTC). There are known corrections to convert from GPS time to UTC. GPS time is generally considered accurate to about 14 ns.

Zero time of the basic time interval, which also determines the timing for time slots, begins at 12:00:00 am GMT. This resets to zero every 24 hours. Time units for time stamps also reset to zero the same way.

Time stamps, when used, have a resolution of one millisecond (ms). There are 86,400,000 ms in 24 hours. A 32-bit integer is used in a time stamp to represent the number of ms that have elapsed since 12:00:00 am GMT. Note that time stamps are unaffected by time zones and Daylight Savings Time.

TABLE 17

Time Stamp Sub-message Format
Time Stamp Sub-message

| Field Name | Size in bits | Format |
|---|---|---|
| Sub-message type | 6 | value = 25 |
| Time stamp in ms since 0:00:00 | 32 | unsigned integer |
| Total Bits in Sub-message | 38 | |

Most messages to not need a time stamp. There is an "implied time stamp," which is used for all messages that do not contain an explicit times stamp. The preferred embodiment for the implied time is the end of the basic time interval in which the message is sent. The implied time stamp is an important and novel part of most embodiments.

Thus, ALL messages (without different time stamps) received in a basic time interval have data valid at the SAME time. This is a major advantage for computing future trajectories and possible collisions.

There is a second advantage of this embodiment. The core information of location and velocity does not communicate, typically, all of the information available to a transmitting vehicle. For example, it does not include acceleration, braking, or turning. Thus, typically, a transmitting vehicle has "better" information about its own future trajectory than is contained in a core data message. The use of a future time (the end of the current time interval) allows the transmitting vehicle to make a more informed estimate of the likely location, velocity and heading at that future time, and transmit that information.

There is a third advantage to this embodiment. A vehicle will have sensors and processing electronics or software for the raw data from those sensors. Different implementations will result in different delays of this information to the V2V transceiver. By setting a definitive future point in time, each implementation may make its own internal adjustments, compensations, corrections, estimates and computations (collectively, "adjustments") to produce its best possible prediction for the implied time stamp. The ability of the transmitting vehicle to make these adjustments will always be superior to a receiving vehicle attempting to make the same adjustments.

There is yet a fourth advantage to this embodiment. The underlying motion model for the preferred embodiment of this invention is that each vehicle makes a linear motion during each basic time interval. This linear motion is precisely the continuation of the core data, include acceleration (forward or turning) based on recent messages. That is, starting at the location transmitted, at the speed transmitted, at the heading transmitted, for the next 0.1 seconds (or the actual basic time interval), adjusted for constant acceleration. In some cases, the transmitting vehicle knows that this computation model will not produce an accurate result for the next 0.1 seconds. For example, the vehicle is just entering emergency braking mode. A transmitting vehicle has the option of adjusting the core data transmitted so that it will produce the "most accurate" result for the end of the basic time interval FOLLOWING the current basic time interval.

A fifth advantage to this embodiment is that as V2V systems evolve and become more sophisticated, this embodiment permits "better" information to be transmitted in a message with no loss of compatibility to older V2V transceivers, no additional bandwidth, and no changes to the communications specification.

This is the mechanism by which more sophisticated calculations—taking into account acceleration, deceleration, skidding, turning, and other factors may be communicated, while keeping the core transmitted information simple and succinct.

Note the transmitting vehicle is not obligated to make these sophisticated estimates and changes to transmitted core data. It may simply transmit its most accurate location, speed and heading as of the end of the current basic time interval.

V2V transmitters may not change core data to represent "expected" information for more than one basic time interval into the future.

Note that if a V2V transceiver desires to send information that is accurate as of a different time than the implied time stamp, it must include an explicit time stamp in a message.

Note also that a V2V transceiver may adjust its transmitted risk value based on information not contained in the same or related V2V message. One example is that a vehicle is expected to come to a complete stop prior to a near collision. Another example is a vehicle that is not expected to maintain expected motion, perhaps because it is in skid during a sharp left turn. A third example concerns a vehicle that has an immediate vehicle history suggesting a drunk driver. At the moment, the vehicle's core information is low risk. However, the vehicle's immediate history suggests that the driver may not stay the lane, or may not respond properly to a traffic light. Thus, risk value adjustment is another method of transmitting "additional" information over a V2V system.

XML Enhancements

In one embodiment V2V messages are enhanced by using XML to add information. XML consists basically of a field name followed by a field value. In this way, receiving vehicles that "know that field" can use the information and vehicles that "don't know that field" can either ignore the information or put it on a display for the driver or passenger to see.

XML may be used in sub-message types that encode a length. In such messages, an embodiment uses a 28-bit field comprised of four, 7-bit ASCII characters to describe the contents of the sub-message. This field follows immediately after the sub-message type field. For sub-message containing XML, the four ASCII characters in this field are: "XML".

Number of Occupants

In one embodiment the transmitting vehicle transmits the number of vehicle occupants, determined by an algorithm that considers: weight in the seat, change of weight to zero (normalized, for example, because a child car seat may be semi-permanent) when the car is turned off (driver leaves), seatbelt on, and door opened. Also, this number of occupants is displayed to the driver. An alternate method to determine number of vehicle occupants is to use a camera inside the vehicle or to use an IR detector. Number of occupants is useful for determination of HOV+ and carpool lane compatibility and fare computation.

The Vehicle Information sub-message comprises a number-of-occupants field.

In one embodiment roadside V2V transmitters transmit a message requesting that vehicles transmit number of occupants. Such a message is a Data Request sub-message type.

Another embodiment tracks when there is a child in the car, but no adult. If the child is left too long, a high-risk message is sent, asking for assistance. A first message may be a text message, email or phone call to the owner or adult previous occupant of the vehicle (known, because the cell phone was linked to the onboard Bluetooth system), and then after an additional delay, to emergency response personnel. Every year, children are accidentally abandoned in vehicles. This feature significantly minimizes the danger or such an accidental abandonment. This feature provides a V2V purchase motivation.

There is a good reason to have an inside-the-vehicle video camera associated with the V2V system. This video camera may be used to identify hand gestures from either the driver or another occupant, and use those hand gestures to identify a specific vehicle using such a natural gesture a pointing. Such a gesture may be used to identify a particular vehicle engaging in a high-risk activity, such as the driver using a cell phone unsafely, or to identify a particular vehicle for a directed courtesy message, such as "your brake lights are not working," or for another purpose.

Hand gestures may also be used to request a particular action. For example, "follow that car," or "take that parking space."

Location Beacons and Targets

It is possible to have location references that are more accurate than a vehicle with a GPS. As one example, a government agency may place a fixed roadside transmitter with an absolute known location to an accuracy of one cm. This roadside transmitter should not be transmitting an offset—it should transmit its known location, and not participate in the location consensus algorithm. However, its transmitted location WILL be included in the location consensus algorithm of all vehicles for which it is in range and in sight. This will tend to rapidly pull the offsets of all such vehicle toward this highly accurate V2V transceiver. In this instance this V2V transceiver is acting as a "location beacon," broadcasting a true location.

In order for the beacon to work, it has to have a corresponding target that is in sight of vehicles in range. We would ideally like this target to be visible to both vision and sonar sensors. We would ideally like the beacon target be easy to see with these sensors and easy to determine and accurate relative position.

A preferred embodiment of such a beacon target is curved metal sign, up high enough so that many vehicles can see it at once. It is curved that the vector normal to the surface faces each portion of traffic that can see the target. It is metal so that sonar (or radar) will reflect well. The preferred target comprises a set of black and white vertical stripes, where the white is reflective. Such stripes are particularly easy to electronically align when viewed by two or more video cameras so as to be able to compute the distance using parallax. The reflective white stripes permit the sign to be seen by cameras at night. A vehicle video system to determine distance may use an infrared illuminator to assist in seeing the sign. Such an illuminator will not interfere with other driver's vision.

FIG. 10 show two such embodiments. An alternative embodiment is a sphere, or a portion of a spherical surface, not shown in the Figure.

Note that a single target, which might be cylindrical in shape, might be hung near the middle of an intersection. This target in conjunction with its broadcasting V2V location beacon serves to "calibrate" the locations of all the vehicles that pass through the intersection, subject to some consensus drift time. Because it can be seen by many vehicles, it will be included in a large number of match sets, for a relatively long period of time. Thus, it will have a much larger overall impact on improving consensus than a typical single vehicle, even if that vehicle had its own perfect geolocation information.

An alternative place to put a target is on an existing traffic light pole, facing traffic in only one direction. This allows the target to be larger, because the depth of the curve is much less than for a cylinder of the same size.

Consider the situation of a known, very dangerous intersection. A city or state could place a target and beacon on each approach to the intersection, perhaps half a block away. These beacons would serve to "calibrate" all of the equipped vehicles approaching the intersection. All equipped vehicles approaching the intersection from all directions would then be converged (typically) by the time they reach the intersection. This avoids the potential problem of different groups of vehicles that might be converged on different offsets that do not have time to see and converge with each other.

It is worth noting that if a large number of vehicles can see each other, the underlying geolocation system may be quite crude, for example, with worse accuracy that typical for GPS. The vehicles will still converge effectively.

It is also worth noting that if the geolocation system is reasonably accurate and reasonable consistent, that only a few vehicles need to be sight of each other occasionally for the consensus algorithm to be effective. In this case the consensus averaging, when it does occur, may be viewed as "calibration" steps that make occasional corrections to the underlying geolocation data.

It is worth noting, that, in general, the cruder the underlying geolocation system, the faster the convergence rate should be. In some implementations, it may be desired to have no limit offset drift factor. In this case, two vehicles that come into range and sight of each other need only one basic time interval to average their two offsets and reach consensus. In general, such a feedback system with no damping may experience oscillations or other instability.

Consider the following scenario: on a long mountain road that runs roughly north-south, vehicles are moving steadily but sparsely on both directions. For the most part, vehicles traveling in each direction do not see the other vehicles traveling in the same direction. Consider that all the northbound vehicles have a starting offset of zero. Consider that the all the southbound vehicles have a starting offset of 100 (no units). As each northbound vehicle passes each southbound vehicle the two vehicles are in sight of each other long enough to converge on the average value of their two offsets. The lead northbound vehicle will soon have an offset close to 100, because it keeps averaging its increasing offset with 100. The lead southbound vehicle will soon have an offset close to zero because it keeps averaging its offset with zero. The trailing vehicles in both directions will approach an offset of 50.

What is the effect of this scenario? The lead vehicles will have an offset very close to the offset of the vehicles approaching from the other direction. That means that V2V messages suggesting a collision may occur (perhaps because one vehicle has drifted over the center line) will be accurate. The trailing vehicles in both groups, who now both have offsets near 50, will also be in close convergence. Thus, the most dangerous situation—traffic from opposite directions colliding—is avoided to the extent possible due to any V2V system. This is true even though none of the approaching pairs of vehicles has yet to directly converge location with each other! Also consider that the offset differences between sequential vehicles in any one direction are small. Thus, as two such vehicles approach each other, perhaps because the rearward vehicle is being driven faster than the forward vehicle, their initial offsets are small and will quickly converge. Thus, V2V messages in this scenario are effective even though traffic is sparse and vehicles are only rarely in range of each other.

It is a preferred embodiment to improve on GPS coordinates by using the vehicle's heading and speed sensors. Typically, a vehicle's speed information (for the speedometer) comes from wheel rotation. The accuracy of this sensor varies with temperature, tire pressure, and tire wear. However, those slowly varying accuracy shifts may be largely corrected by comparing the speedometer speed to the computed speed over long distances with the GPS coordinates. Thus, the GPS may easily calibrate the local speed sensor.

However, GPS coordinates are subject to relatively short-term, sudden shifts. The use of the heading and now accurate speed from the vehicles local sensors may be used to significantly reduce the effect of the "noisy" GPS coordinates. This may be done via averaging or other well-known means. If a GPS signal is weak or missing, such as in a tunnel, the locally computed speed and heading make an excellent short-term substitution.

Inexpensive digital compasses today have short-term errors of roughly one-half degree. These errors are typically reduced considerably by averaging. The heading of a long road, on a digital map, is effectively far more accurate than one-half degree. Thus, while the local speed sensor in a vehicle may be quite accurate (when calibrated as described above), the use of a known location on a known road most likely provides a more accurate location than using a typical digital compass, for some distances.

Thus, a preferred embodiment is to use map-based location as a way to enhance location computation when GPS signals are unavailable or untrusted.

Position encoding, in one embodiment, is described above. Two, 24-bit fields are used to provide a resolution on the surface of the earth of one centimeter. This position encoding may be use for more than identifying the position of a subject vehicle.

Sets of position points may be used to define a line segment, polygon, or area. A curve line segment may be defined, for a lane as an example, by adding B-spline or Bézier curve information to a set of position points. Areas are useful to define risk areas, intersection boundaries, parking areas, property, etc. Cubic Bézier curves are the preferred embodiment for encoding lanes. A preferred embodiment is to provide a set of points on the lane. For each lane point, a control point is also defined and coded using the same position encoding as for the lane point. The set of lane points and control points may then be Huffman encoded, if desired, for improved data density.

License Plate Recognition and Capture

In some embodiments, it is useful to have license plate recognition. License plate recognition may be use to associate a particular V2V message received with a specific vehicle. License plate recognition may be helpful for authorities in regulating or responding to unsafe or illegal behavior, or invalid use of the V2V system. License plate recognition may be helpful to the authorities in finding witnesses to illegal activity. Please review the section herein on recording and encryption, which relates to the license plate capture.

In one embodiment a vehicle may request to other vehicles in range to capture the license plate of target vehicle at a particular location. This is useful if the first vehicle is not able to see or read the license plate of the target vehicle. In this case, all vehicles in range should use video capture and license plate recognition to attempt to capture the license plate of the target vehicle, and reply with this information, via either a broadcast or a directed message, to the requestor, if such capability is available. In this way, it is likely that both front views and back views of the target vehicle will be captured. The V2V transponders in so responding may, optionally, sign this information with their PKI key to assure authenticity, should this be required.

License plate capture and recognition is also preferred as an automatic response to Network Warning sub-messages.

Visual Enhancements

In some embodiments, a visible light is used, in addition to a broadcast of a high priority message. For example, a roof-mounted strobe light could fire in conjunction with a message being sent at risk value 8 or greater. This light has several advantages. It provides a secondary warning to all drivers who can see the light that a very serious risk is immediate. This warning is visible to drivers who are not in equipped vehicles, providing an additional benefit to society in addition to those people in V2V equipped vehicles. As second benefit is that the light may well be visible as a reflection around corners that block the radio transmission of V2V messages. A third benefit is that this warning works even if the V2V system for some reason is not functioning.

Vehicle Spacing

In some embodiments, under low visibility conditions, such as fog or snow, minimum separation between vehicles, particularly for vehicles in the same lane, is a requirement for minimum risk. Thus, if vehicle spacing becomes less than a computed appropriate minimum distance, risk value goes up, causing first warnings to drivers, then, if necessary automatic defensive action.

In some embodiments, during high vehicle traffic volume moving at less than a preferred speed, a nominal maximum vehicles separation in the same lane is a requirement for minimum risk. Thus, if vehicle spacing becomes greater than a computed appropriate maximum distance, risk value goes up, causing a warning to the driver. This feature helps reduce the number of "slow drivers" who fail to keep up with the speed of traffic in their lane. An appropriate warning may be to speed up or move over. This warning should be postponed in cases where a gap has opened up because of vehicle movement out of a lane. This warning should also be postponed if a vehicle is speeding up to fill such a gap. In some embodiments, a roadside V2V transceiver broadcasts such "speed up or move over" courtesy messages enabling this feature, which may be lane-specific. The intended recipient may be identified by location.

Time Slot Skipping

We have defined embodiments herein that define preferred methods of preserving bandwidth. An alternative embodiment comprises skipping time slots. For example, instead of transmitting once in every basic interval, transmission might be in every other, or every third basic interval. When time slots are used, skipping use of a time slot may result in another V2V transmitter taking that time slot, which would result in message collisions in that time slot. Thus, in embodiments that skip time slots it is necessary for V2V transmitters to first check for skipping before taking an apparently empty time slot. When skipping time slots is being used, another transmitter may share a time slot by aligning its own skipping with that of the current time slot owner. For example, by reducing the basic transmit rate from ten times per second to 3.3 times per second, three vehicle may share a single time slot, resulting in nearly a tripling of available time slots. The algorithm is most appropriate where vehicle density is high, but traffic is either slow or safe. One such example might be a crowd of people or bicycles, most of whom are V2V equipped. Another such example is a parking lot or parking structure.

Ticketing

A V2V system as described herein is ideal for providing speed, convenience and reliability in situations where paid access is used. Such cases including parking, events, ferries, bridges, tolls, and pay-to-use lanes. Prepaid "tickets" or "passes" may be single-use or limited-use numbers. A V2V transceiver owner, for example, might purchase one or a block of tickets, which might be provided out-of-band, encrypted.

Tickets might comprise a 128-bit number, for example. Each time a single-use ticket is used, that is, transmitted in a V2V message, it is used up. As the vehicle location is transmitted along with the ticket, management of vehicle (or people) gating is straightforward. Multiple-use tickets may be transmitted encrypted, for example by the V2V transceiver's private PKI key, to avoid theft (by listening to the transmission) and then use by another party.

Widely deployed V2V systems will largely obsolete other forms of vehicle-based payment, including toll transponders and parking lot manual payments.

Payment messages may be sent in interval class B, at the lowest power level, as the vehicle passes through a payment, ID, or validation portal.

Pedestrians for events and public-transit may also use V2V message-based ticketing. In such a case, the ticketing system may be supplemented by a secondary, "physical" validation, such as NFC, or RFID, or contact or close-in reading of a bar code, which might be displayed on the screen of a personal, mobile, electronic device such as a phone, PDA, tablet, or e-reader.

Vehicle Traffic Information

Vehicle traffic information, such as average speed of vehicle traffic on a section of road, is valuable. Current Vehicle traffic information systems provide a limited amount of data and such data is often too old or too crude to be of maximum value.

V2V systems have the potential to provide much more comprehensive and timely vehicle traffic information. Such information, naturally, has a lower priority, as it is a "convenience" message class rather than a "safety" message class.

Vehicle traffic information is generally forwarded only in the reverse-flow direction, and then side-flow also, in order to pick up feeder roads. Because traffic flow rarely changes rapidly, and is roughly the same for all vehicles on a road segment moving in the same direction, there is no need for every vehicle to transmit nor for such transmissions to be frequent.

In one embodiment, V2V transmitters send vehicle traffic information in the convenience region of basic time intervals, subject to bandwidth availability being above a threshold and traffic problem severity being above a threshold.

Forwarding of vehicle traffic information is also subject to bandwidth availability. Forwarding of vehicle traffic information is also subject to the quantity of duplicate information being forwarded. Forwarding of vehicle traffic information is subject to vehicle traffic information message lifetimes. Lifetimes, like all forwarded messages, may be limited by distance, hop-count or time. Time-to-live is the preferred embodiment for the limitation of vehicle traffic information messages.

Vehicle traffic information may include audio or video data.

The use of a V2V system to send vehicle traffic information, although this information is not strictly and directly safety related, adds to the perceived value of V2V equipped vehicles and therefore encourages more rapid adoption. Minimum penetration percentage is important for overall system performance and thus vehicle traffic information is an important part of V2V design, acceptance and success.

Parking Information

In one embodiment the status of parking space is sent in non-safety class V2V messages. The location of the parking space is encoded and placed in a message the same way that vehicle location is encoded and placed in a message. However, the "vehicle type" field now shows "empty parking space."

In one embodiment the status of a parking space currently occupied by transmitting vehicle may be indicated that it will soon be vacated, as the transmitting vehicle is leaving the parking space, by using a time-stamp in a message where the time-stamp is the future time when the space will be come empty, such as 10 seconds from now.

In one embodiment the status of a group of full parking spaces may be transmitted by sending the location of both ends of the group, such as the first space in an isle and the last space in an isle, where the "vehicle type" field is "full parking space." Normally, there is no reason to transmit information on a single full parking space. Thus the receipt of two such messages is an indication that all spaces in between the two specific locations identified are full.

In some embodiments the information regarding available parking spaces is valuable. This information may be sold, using a number of different models. In one model, such information is bid out to all vehicles within range, with the high bidder winning the parking space information. In another model, a group of drivers belong to a "club," where they agree to share such information. They may pay a fixed club membership fee, or pay according their generation and usage of such information, or this service may come included with some other club membership. In another model, purchasing a piece of hardware (such as a particular vehicle make or a V2V device from a particular manufacturer) provides membership is such a "club." One method of providing information only to a single winning bidder is by encrypting information using the PKI public key of the winning bidder. In this way, the information may be broadcast. One method of providing information only to members of a "club" is to have all members of the club share a decryption key.

Providing parking space information as part of a V2V system has several benefits. First, it provides incentives for people to purchase V2V transceivers, increasing penetration rate of equipped vehicles as previously discussed. Second, it reduces the amount of "hunting" for parking spaces. This reduction in driving in and around parking lots is a benefit to all vehicles in the area, including non-equipped vehicles, or equipped vehicles that have lost a bid, or equipped vehicles that are not a member of the appropriate club. This reduction in driving also eliminates the environmental impact of the extra driving. This reduction in driving increases safety for everyone by reducing the total traffic in and around a parking lot.

Directed Messages and Geographic Polygons

We introduce the concept of a "directed message." This is not a concept with a bright line border. A directed message is intended primarily for one or more vehicles—the target vehicles—identified in the message. Note that the medium is a collision domain, which is sometimes identified in network terminology as a broadcast domain. Every vehicle in range that is able to properly receive a message must receive and process every valid message received, no matter its interval class, time slot, priority or length. Even a directed message intended for a single vehicle, such as a Message Collision sub-message Location Format may be used by other than the target vehicle, for example, to avoid sending a duplicate message, or to avoid choosing a time slot that has just been advertised as having a message collision.

A directed message may be intended primarily of a single vehicle, typically identified by the target location fields in the sub-message.

A directed message may be intended primarily for vehicles transmitting in a specified time slot. It may be directed at vehicles transmitting a particular type of message. It may be directed at vehicles transmitting within a particular power range. It maybe directed at vehicles of a certain vehicle type, such as busses. Thus, the targets of a directed message may be identified in the message by a attribute of the target vehicle, not a unique identifier. Such attributes may change dynamically.

A vehicle may specify a geographic location in a sub-message by one of four primary methods: (a) providing a single location; (b) by providing two location; or (c) providing more than two locations as a sequence of points connected to make a set of connected line segments; (d) providing more than two locations to define the corners of a geographic polygon. Method (a), a single location, is typically appropriate for identifying vehicles, posts, objects in or at the edge of road, the center of an intersection, etc. Method (b), two locations, is typically appropriate for identifying a line as two endpoints. For example, a section of a lane that is closed for a detour; or a section of a lane that is a detour; or a row lane in a parking lot; or a threshold line crossing or at the side of a roadway. Method (c) is used to a connected set of line segments. For example, these could be used to define a non-straight lane. One example is a driving path through a parking lot. Another example is a detour. Another example is how to follow a complex driveway. Another example is instructions for parking at a large facility such as set of loading docks, a music concert, or parking on a field. Another example is directing people in a crowd (where the vehicles are pedestrians), which might be registration at a college or travelers in an airport. Method (d) is typically appropriate for identifying a geographic area. Examples include a construction zone, a military base, the scope of an accident scene, or the scope of slow traffic.

Driver Identification of Other Vehicles

For courtesy message and other purposes, it is useful for a driver or other vehicle occupant to be able to rapidly and easily identify a particular vehicle.

There are three preferred methods of the sending individual to identify the specific receiving vehicle for any purpose. (a) Using a touch screen to touch an icon of the desired vehicle; or (b) physical pointing to the vehicle; or (c) audio cue. For method (a), all identifiable nearby vehicles, or a subset, are displayed in real time on a screen. Their positions and any other identifying information is updated as necessary on the display. For example, a video image, or color, or more informative icon (car, pickup, van, SUV, etc.) may be used. A simulated overhead view, or preferably a bird's eye view may be used. For method (b), pointing by the driver or other occupant is determined by a camera inside the vehicle, in one embodiment. The nearest vehicle that matches the pointed direction is then selected. In some cases, a change in the pointing angle is used to select among multiple vehicles. For example, cross traffic moves left to right (say), while oncoming traffic moves slowly and slightly right to left. By moving a pointing arm or finger left to right or right to left narrows the number of possible choice of vehicles. Another means to select among multiple vehicles is to select the physically closest vehicle. For method (c), an audio cue by the driver or other occupant may be used to identify a vehicle, or to further restrict a set of possible vehicles. For example, a driver might say, "red" to limit choices to a red vehicle, or "SUV" to limit vehicles to those of an SUV type, or "running the stop sign" to indicate a specific vehicle.

Another means, less preferred, is to select among multiple vehicles is to select the vehicle with the highest risk, such as running a stop sign or driving with high beams on.

The vehicle selected by the driver or occupant may be confirmed by highlighting the selected vehicle on a display. The display might be an LCD information screen on the dashboard or console, for example, or may be a head's up display. Highlighting may consist of blinking the vehicle in the display, expanding the vehicle icon, placing a circle around it, dimming other information, etc. For a heads-up display the identified vehicle may be circled, for example. Ideally, the identification is also updated in real time. For example, in a heads-up display, a circle around an identified vehicle should move with the vehicle.

The driver or occupant may further confirm, such as with an audio cue. This method may also be used to identify a single vehicle from a set of vehicles. For example, if the set contains two vehicles in cross traffic, the driver might say, "the leading vehicle."

The selected specific vehicle is identified in the message by location. The future location is estimated based on the end of the basic interval when the message is expected to arrive. Like transmitted locations, locations used to identify a vehicle should be the location of that vehicle at the end of the time slot used for the message. If a message is part of a message chain, the location should be the location for the first message in the chain. The receiving vehicle compares the transmitted location to its current location. If there is reasonable match, the receiving vehicle knows the message is for it.

Alternatively, a message may be addressed to a vehicle using a specific time slot. The disadvantage of this message is that a vehicle may change time slots just before receiving the message, or the time slot may be in a message collision, making unique identification more challenging. Time slot identification may be used, but is still not preferred, when responding to a request.

Note that for most messages intended for a specific vehicle, the priority is low, and therefore there may be a delay in transmission. The transmitted location in the message should take any such delay into consideration, updating the transmitted location prior to transmitting, as necessary.

Both audio and video (including still images) may be sent, intended for a specific vehicle. An audio message may be a courtesy message, such as "your brake lights are out," or a social message, "would you like to go on a date?" A video message may include a video capture of a license plate, for example, in response to a request for such a video capture. A video message may contain traffic information. Such a message of this type is generally broadcast, and may be forwarded, as previously discussed. A video message may contain one or more images with a clear view of an accident scene. While such a message may be broadcast and forwarded, its ideal receiver is an emergency vehicle that requested the image(s).

Interface from the V2V System to the Driver

Although a large number of options exist for the V2V system to communicate with the driver, one preferred embodiment is by the use of visual indicators in the steering wheel. Different colors and different actions or brightness provide different meanings. LEDs are an ideal implementation. For example a row of red LEDs at the top of the wheel indicates a need to slow down. Red LEDs on the left or right indicates that a vehicle is too close on that side. Yellow might be used in place of red to indicate which vehicle is at fault: this vehicle or another vehicle. Or, yellow v. red indicates the severity of the risk.

Indicators in the steering wheel have the advantage over other indicators is that they are always easy to see. As the wheel is turned, the relative location (such as top, left, bottom, or right) of the indicator stays constant, if this is appropriate for the warning. For example, if an encroaching vehicle is drifting into a driver's lane from the left, and the driver responds by turning his wheel to the right, but the encroaching vehicle continues approaching from the side, the lights on the effective left side of the steering wheel continue to indicate the problem.

Such indicators might consist of 24 multi-colored LEDs spaced evenly around the steering wheel, all effectively pointed at the driver's eyes. The LEDs should be recessed so that they are both visually and tactilely invisible or discreet when off. As the wheel is turned, the set of appropriate LEDs for a given warning changes.

Ideally, any visual indicator are combined with both audible indicators, such as a sound or spoken warning, and a haptic indication, such as a vibration in the steering wheel or under one side of the driver's seat.

Such driver indications vocabulary should be standardized early, so that drivers of different vehicles are immediately aware of what any particular warning means. The preferred embodiment is to put the warning towards the direction of the problem, with up meaning in front of the driver's vehicle and down meaning in back of.

Other Forms of Vehicle Identification

We have defined preferred embodiments of vehicle identification herein. In some case it is desirable to have an alternate form of vehicle ID, possibly one derived from Internet Protocol technology. One form is a MAC address. Another method is an IP address, preferable an IPv6 address. Mobile IP is one method of dynamically assigning IP addresses to mobile devices. However, an IPv6 address may also be fixed. Another method is to use the vehicle's license plate. Another method is to use the vehicle's VIN number. Another method is to use the cell phone number (either phone number of SIM card ID number) of one or more occupants of the vehicle. Another method is to use an ID assigned for this purpose. By transmitting one message with such a traditional ID along with current location, all received messages from that vehicle, while it is continuously in range, are easily linked.

Interface with WiFi and Cellular

WiFi and cellular data networks are omnipresent. It is valuable to be able to like to such networks. In an ideal embodiment, such a link is included in a V2V device, subject to security, safety and applicability filters.

An ideal V2V system has an "input API" which allows third party devices and networks, such as smart phones, tablets and the like, to provide data to the V2V system. This input is particularly valuable for courtesy and social messages.

An input API may also be used to provide more accurate location information or traditional ID. This information, however, should be subject to validity and authentication, to avoid incorrect or improper information being placed into the V2V system.

An output API may be used to provide information known to the V2V system to a third party device and network, such as smart phones, tablets and the like. Since almost no transmitted data in the total V2V system is confidential (even encrypted messages, transmitted, may be read by everybody, just not encrypted by everybody), there is little reason to not provide all transmitted information to such a third party device or a third-party network. The wide available of apps on such devices substantially increases the value of the total V2V system.

A particularly valuable use of a linked third-party network, such as WiFi, is the use of a standard consumer mobile device to implement it's own V2V information transmission, particularly for pedestrians and bicycles. An app on such a device may provide a limited transmission. For example, consider a pedestrian on a crowded sidewalk. The pedestrian is using a guidance app that tells the pedestrian in which direction to walk to reach her desired destination. That app, or another app on the device is thus able to predict, in the short term the direction of the pedestrian. In particular, an app on the device is able to transmit a message that the pedestrian is about to, or is in the process of crossing a street. Such a crossing may not be safe, even though the pedestrian is doing it. The pedestrian may not be looking at traffic. She may be looking down at her device. She may be distracted because she is talking on her cell phone. Nonetheless, an app on the device is able to transmit her location and speed (walking speed) as a WiFi or cellular data packet. Such information may be received by a V2V device in a nearby vehicle, and then used to prevent the vehicle from hitting the pedestrian.

Similarly, an app in such a device may monitor V2V transmit traffic, which is at least partially replicated into the wireless network, such as WiFi, of the device and compare it to the location of the device, in order to determine risk to the user of the device and then inform the user of the device of that risk. For example, a cell phone in use might generate a loud warning to its user, about to enter a crosswalk, to avoid having that user (and the phone) hit by an approaching vehicle. As another example, a tablet mounted on a bicycle, currently playing music through an earbud to the rider of the bicycle, might generate an audio message, warning the rider of a specific risk up ahead. For example, "vehicle on left is making a right turn," or "vehicle parked on right may open driver's door."

In one embodiment a V2V transponder connects via Bluetooth, or a cable, to a consumer mobile electronic device. The mobile electronic device provides all of the V2V functionality of which is capable, such as the user interface, GPS, computation, maps, and storage. The V2V transponder provides only those additional functions necessary to implement V2V transponder functionality, such as the physical layer and possibly timing.

Opportunities

A valuable benefit of some embodiments is a feature we call, "short-term opportunity." These short-term opportunities are also, by the nature of the V2V system, local.

One example of a short-term opportunity is a recommendation by a V2V system to take a specific different route, due to traffic congestion or signal timing. Another example of a short-term opportunity is the selection of a nearby gas station based on the number of vehicles currently waiting at different gas stations. Another example of a short-term opportunity is the selection of a nearby gas station based on the price of gas at that station. Another example of a short-term opportunity is a recommendation to change lanes, in order to find a lane with less traffic, a shorter line at the next light, or a better chance of making it through a stale green light ahead in the recommended lane. Another example of a short-term opportunity is the recommendation to change lanes based on the assessed risk, such as currently being in the blind spot of a truck. Drivers find high value in such short-lifetime, local opportunities while driving.

These short-term opportunities are created specifically by, at least in part, the data that comes in to the receiver via the V2V communications. The short-term opportunities may also use, in part, data from local traffic history. The short-term opportunities may also use, in part, data from a third party database.

In one embodiment prices are read from posted prices at gas stations, using optical character recognition of images captured from a vehicle, with at least one price either transmitted or received via a V2V system.

In one embodiment the V2V provides at least one occupant of the vehicle with a game, wherein the game is based, at least in part, on information received or transmitted through the V2V system. As one example of a game, occupants could be asked to find a license plate with specific letters, or from a specific state, where the V2V system is aware of such a vehicle nearby. As another example of a game, an occupant could be asked to name the next cross street. As another example of a game, occupants could be asked to guess how many seconds from now a traffic light will change. As another example of a game, occupants could be asked to guess how many seconds from now a vehicle will change lanes into the occupant's vehicle's lane. As another example of a game, occupants could be asked to guess in competition with each other. As another example of a game, occupants could be asked to guess in competition with the V2V device itself. As another example of a game, occupants could be asked to guess in competition with the occupants of a nearby vehicle. This last example may be identified as a crowd-based game, a multi-player game, or, our preferred term, a "V2V game."

In one embodiment the V2V system provides an open API or software platform. In this embodiment, third parties may create "apps," which may then be loaded or downloaded into the operator's V2V system. The V2V system would provide, via the API to the app, all of the resources of the V2V system. In addition, the V2V system would prevent the app from compromising the critical functions of the V2V system.

In a particularly interesting version of the above embodiment, the V2V system communicates the API via another communications protocol to another computing device. For example, Bluetooth may be used to communicate with a mobile tablet or smart phone. As another example, 802.11 WiFi may be used to communicate with a computing device outside the vehicle. This secondary communication mode for the API allows apps to run on a tablet, for example, being used by an occupant of the vehicle, where now that tablet app has access to all the V2V features and resources.

An example of one such app is a non-driver occupant running an app on a table to communicate socially with other nearby people.

An example of such an app is a non-driver occupant playing a game with an ongoing series of moves, such a checkers, chess, cards, story creation, or a video game, where the opponent(s) of the occupant are occupants in nearby vehicles, and those occupants continually change. Thus, in one sense, in one example, you never know who will make the next chess move against you.

Another example of a V2V game, using V2V as a platform, is a multi-player shooting game where both your allies and your enemies are other V2V entities within range, both continually changing. Note that these are fantasy games.

Conserving Gas

In one embodiment, a V2V system optimizes gas mileage by slowing down in order to later having to accelerate back to speed. Traffic ahead and the signal phase timing of signals ahead are used in these computations.

In one embodiment delivery vehicles dynamical compute alternate routes based on traffic or signal phase timing in order to minimize total delivery time for the vehicle.

Automatic Turn Signals

In one embodiment, a V2V system automatically engages the turn signals of a vehicle. Ideally, the system uses first any programmed route, such as a destination or return on a navigation system. If no such route is programmed or it is not being followed at the moment, the system uses second the history of the driver or vehicle, with the expectation that the same as a previous route will be followed, most likely. Third, the system may use the lane the driver is in, such as a dedicated turn lane. The driver may override the system by simply engaging before or after the automatic operation use of the turn signal indicator. Ideally, some small indication to the driver is provided to indicate automatic operation, such as a louder click for a few seconds. One non-obvious benefit is that if the driver does not wish to make take an indicated turn, such and indication warns the driver that their planned behavior is different than a predicted behavior. For example, they may not be aware or may not wish to be in a turn lane.

The Decision Line

As a driver approaches an intersection with a green light, that may turn yellow, there is a "decision line." When the driver's vehicle is behind the decision line, the driver will stop if the light turns yellow; when the driver is in front of the decision line, the driver will continue through the intersection if the light turns yellow. The location of the decision is affected by several factors; chief among those factors is the speed of the vehicle: the faster the speed, the farther back the decision line. Another factor may be the vehicles in front (or behind) the V2V transceiver. When a V2V transceiver is analyzing whether or not it may be able to "make the light" it should ideally consider all of these factors. In particular, its decision should be based, at least in part, on the speed of the vehicle at the decision line, not at the entrance to the intersection. Thus, the V2V transceiver should compute the location of decision line dynamically as the vehicle approaches any intersection where this situation is applicable. It may be desirable to speed up in order to move the decision line backward, then immediately slow down the moment the decision line has been crossed. In one particular scenario, the V2V equipped vehicle may slow down at a rate such that the (now moving) decision line stays just behind the vehicle, until the vehicle has slowed to the appropriate safe speed.

V2V transceivers may wish to adjust vehicle speed slightly in order to increase vehicle spacing as the vehicle passes through intersections. One method to do this is to first slow slightly, forcing a vehicle behind to similarly slow, and to create a space in front. Then speed up so that the vehicle spacing to the front and to the rear is equal as the vehicle passes through the intersection.

A similar method may be used to assure a safe and smooth transition merging into traffic. On a merging ramp, the V2V equipped vehicle first slows to create a buffer zone in front. Then, the V2V equipped vehicle speeds up in order to match perfectly the speed and position in between two selected vehicles between which the V2V equipped vehicle will now merge. This method has the advantage that generally the vehicle behind the equipped vehicle is far enough back so that it will not attempt to squeeze into the same merge position as the V2V equipped vehicle.

Pavement Quality

Ideally, pavement quality is a consideration for a V2V transceiver to make lane recommendations as well as local condition risk factors. Pavement quality may be recorded by the V2V system and stored along with the internal local history. Such information is valuable to the entities that maintain roads and paths.

Frames, Packets, Segments and Messages

Formal networking terminology distinguishes frames as an ISO model layer 2 link-layer term that including frame synchronization. Formal networking terminology distinguishes packets are an ISO model layer 3 network layer term, such as an IP packet. Layer 3 packets include information to permit "end-to-end" delivery. Formal networking terminology distinguishes segments as an ISO model layer 4 transport layer term, which includes mechanisms for "reliable delivery."

A message is not a formal network term, but when used, often refers to a single logically unified block of information at the ISO model application layer.

None of these terms—frame, packet, segment and message—are directly applicable under the ISO model to this invention. However, they could and can be used.

In particular, embodiments of this invention are readily "wrapped" into any ISO data unit. For example, they could be sent via Ethernet or Frame Relay. They could be sent via TCP/IP. They could be sent via 802.11 wireless protocols, including 802.11a/b/g/n. They could be sent via 802.11p layer 1 and layer 2.

The preferred embodiment avoids the non-optimal overhead many existing protocols, particularly layer 2, layer 3, and layer 4 overheads.

Therefore, we generally use the neutral term, "message" in this document rather than the term frame, packet, or segment. However, these other terms are used in specific contexts where the relationship to a corresponding ISO layer is intentional.

DEFINITIONS

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

May, Could, Option, Mode, Alternative and Feature—Use of the words, "may," "could," "option," "optional," "mode," "aspect," "capability," "alternative," and "feature," when used in the context of describing this invention, refer specifically to various embodiments of this invention. All descriptions herein are non-limiting, as one trained in the art will appreciate.

Driver—A driver of a vehicle may be a human driver, or an automated system performing substantially the same functions as a human driver. For vehicles that are bicycles, the driver is the primary operator of the bicycle. For pedestrians, the driver is the pedestrian. For animals, the driver is the animal.

What is claimed is:

1. A vehicle-to-vehicle (V2V) communication system comprising:
    a V2V transceiver configured to operate in a transmitting vehicle;
    wherein the V2V transmitter is configured to accept as input subject vehicle position and subject vehicle heading;
    wherein the V2V transmitter broadcasts V2V messages, at regular intervals, using a V2V protocol, wherein the V2V messages comprise: (i) the subject vehicle position; (ii) the subject vehicle heading; and (iii) subject vehicle speed;
    a wireless transmit gateway configured to transmit V2V information over at least one the wireless protocols in the Markush group: (WiFi, Bluetooth, cellular phone, cellular data) and wherein the wireless protocol used by the wireless transmit gateway is not the V2V protocol.

2. The vehicle-to-vehicle (V2V) communication system of claim 1 wherein:
    bandwidth used by the wireless transmit gateway is distinct from the bandwidth used by the V2V transmitter.

3. The vehicle-to-vehicle (V2V) communication system of claim 1 wherein:
    data transmitted by the wireless gateway comprises a subset of the data transmitted by the V2V transmitter.

4. The vehicle-to-vehicle (V2V) communication system of claim 1 further comprising:
    a wireless receive gateway configured to receive gateway input information from at least one the wireless protocols in the Markush group: (WiFi, Bluetooth, cellular data).

5. The vehicle-to-vehicle (V2V) communication system of claim 4 further comprising:
    a validity testing module, wherein the validity testing module tests the receive gateway input information for V2V validity;
    wherein the V2V transceiver transmits receive gateway input information only if the V2V validity test is passed.

6. The vehicle-to-vehicle (V2V) communication system of claim 1 further comprising:
    a wireless, mobile, consumer electronic device, "the consumer device," configured to receive data from the wireless transmit gateway;
    wherein the consumer device comprises data comprising its own location;
    an application in non-transitory memory in the consumer device configured to compute a possible collision involving the consumer device, and the computation uses both its own location and received V2V message data transmitted via the wireless transmit gateway;
    wherein the application is configured to generate a warning based on the computation of a possible collision.

7. The vehicle-to-vehicle (V2V) communication system of claim 6 wherein:
    wherein the application executes in the background such that no active involvement of the user of the consumer device is required;
    wherein the computation is performed multiple times using data at least partially distinct from data used in an immediately prior computation.

8. The vehicle-to-vehicle (V2V) communication system of claim 6 wherein:
    wherein the application computes a likely future location of the user of the consumer device;
    wherein the application is configured to compute a risk value of a possible collision involving the consumer device and the computation is responsive to the likely future location;
    wherein the application is configured to generate a warning if the computed risk value exceeds a risk threshold.

9. The vehicle-to-vehicle (V2V) communication system of claim 8 wherein:
    wherein the warning is at least partially a V2V wireless transmission message transmitted to a gateway operatively connected to the V2V transceiver located the transmitting vehicle.

10. The vehicle-to-vehicle (V2V) communication system of claim 1 further comprising:
    a cellular communication device within wireless range of the wireless transmit gateway;
    wherein the wireless transmit gateway is configured to send a notification message via a predetermined emergency cellular number, using the cellular communication device;
    a risk computation module; wherein this module computes a risk value;
    wherein the notification message is sent when the risk value is equal to or greater than a cellular notification risk threshold.

* * * * *